(12) United States Patent
Westerman et al.

(10) Patent No.: US 9,367,235 B2
(45) Date of Patent: Jun. 14, 2016

(54) DETECTING AND INTERPRETING REAL-WORLD AND SECURITY GESTURES ON TOUCH AND HOVER SENSITIVE DEVICES

(75) Inventors: Wayne Carl Westerman, San Francisco, CA (US); Myra Mary Haggerty, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 1059 days.

(21) Appl. No.: 12/753,209

(22) Filed: Apr. 2, 2010

(65) Prior Publication Data

US 2010/0211920 A1    Aug. 19, 2010

Related U.S. Application Data

(62) Division of application No. 11/818,500, filed on Jun. 13, 2007, now Pat. No. 7,877,707.

(60) Provisional application No. 60/879,191, filed on Jan. 6, 2007.

(51) Int. Cl.
*G06F 15/00*  (2006.01)
*G06F 13/00*  (2006.01)
*G06F 3/0488*  (2013.01)
(Continued)

(52) U.S. Cl.
CPC ............ *G06F 3/04883* (2013.01); *G06F 3/017* (2013.01); *G06F 3/041* (2013.01); *G06F 3/0486* (2013.01); *G06F 3/04845* (2013.01); *G06F 2203/04101* (2013.01); *G06F 2203/04104* (2013.01); *G06F 2203/04808* (2013.01)

(58) Field of Classification Search
CPC .............................. G06F 3/04883; G06F 3/017
USPC .................................................. 715/860, 863
See application file for complete search history.

(56) References Cited

U.S. PATENT DOCUMENTS 5,471,578 A    11/1995   Moran et al.
5,483,261 A     1/1996   Yasutake
(Continued)

FOREIGN PATENT DOCUMENTS

EP    0 622 722 A2    11/1994
EP    0 622 722 A3    11/1994
(Continued)

OTHER PUBLICATIONS

Anonymous. (Sep. 1, 1993). "Method for Access Control via Gestural Verification," *IBM Technical Disclosure Bulletin* 36(9B):487-488.

(Continued)

*Primary Examiner* — Kevin Nguyen
(74) *Attorney, Agent, or Firm* — Morrison & Foerster LLP

(57) ABSTRACT

"Real-world" gestures such as hand or finger movements/orientations that are generally recognized to mean certain things (e.g., an "OK" hand signal generally indicates an affirmative response) can be interpreted by a touch or hover sensitive device to more efficiently and accurately effect intended operations. These gestures can include, but are not limited to, "OK gestures," "grasp everything gestures," "stamp of approval gestures," "circle select gestures," "X to delete gestures," "knock to inquire gestures," "hitchhiker directional gestures," and "shape gestures." In addition, gestures can be used to provide identification and allow or deny access to applications, files, and the like.

26 Claims, 44 Drawing Sheets

(51) Int. Cl.
  *G06F 3/01* (2006.01)
  *G06F 3/041* (2006.01)
  *G06F 3/0484* (2013.01)
  *G06F 3/0486* (2013.01)

(56) References Cited

U.S. PATENT DOCUMENTS

| | | | |
|---|---|---|---|
| 5,488,204 A | | 1/1996 | Mead et al. |
| 5,539,427 A * | | 7/1996 | Bricklin et al. ............... 345/622 |
| 5,543,591 A | | 8/1996 | Gillespie et al. |
| 5,590,219 A | | 12/1996 | Gourdol |
| 5,612,719 A | | 3/1997 | Beernink et al. |
| 5,825,352 A | | 10/1998 | Bisset et al. |
| 5,835,079 A | | 11/1998 | Shieh |
| 5,880,411 A | | 3/1999 | Gillespie et al. |
| 6,188,391 B1 | | 2/2001 | Seely et al. |
| 6,222,465 B1 | | 4/2001 | Kumar et al. |
| 6,252,598 B1 * | | 6/2001 | Segen ........................... 715/863 |
| 6,310,610 B1 | | 10/2001 | Beaton et al. |
| 6,323,846 B1 | | 11/2001 | Westerman et al. |
| 6,690,387 B2 | | 2/2004 | Zimmerman et al. |
| 7,015,894 B2 | | 3/2006 | Morohoshi |
| 7,084,856 B2 | | 8/2006 | Huppi |
| 7,170,496 B2 | | 1/2007 | Middleton |
| 7,184,064 B2 | | 2/2007 | Zimmerman et al. |
| 7,312,785 B2 | | 12/2007 | Tsuk et al. |
| 7,345,671 B2 | | 3/2008 | Robbin et al. |
| 7,460,690 B2 | | 12/2008 | Cohen et al. |
| 7,663,607 B2 | | 2/2010 | Hotelling et al. |
| 7,877,707 B2 | | 1/2011 | Westerman et al. |
| 8,479,122 B2 | | 7/2013 | Hotelling et al. |
| 9,158,454 B2 | | 10/2015 | Westerman et al. |
| 2002/0036617 A1 | | 3/2002 | Pryor |
| 2004/0189720 A1 * | | 9/2004 | Wilson et al. ................. 345/863 |
| 2005/0003851 A1 * | | 1/2005 | Chrysochoos et al. ..... 455/550.1 |
| 2005/0052427 A1 * | | 3/2005 | Wu et al. ........................ 345/173 |
| 2005/0063564 A1 * | | 3/2005 | Yamamoto et al. ........... 382/104 |
| 2005/0114788 A1 | | 5/2005 | Fabritius |
| 2005/0162402 A1 * | | 7/2005 | Watanachote ................. 345/173 |
| 2005/0162407 A1 * | | 7/2005 | Sakurai et al. ................. 345/173 |
| 2006/0026521 A1 * | | 2/2006 | Hotelling et al. .............. 715/702 |
| 2006/0026535 A1 | | 2/2006 | Hotelling et al. |
| 2006/0097991 A1 | | 5/2006 | Hotelling et al. |
| 2006/0129948 A1 * | | 6/2006 | Hamzy et al. .................. 715/790 |
| 2006/0161871 A1 * | | 7/2006 | Hotelling et al. .............. 715/863 |
| 2006/0197753 A1 | | 9/2006 | Hotelling |
| 2006/0238522 A1 | | 10/2006 | Westerman et al. |
| 2007/0046643 A1 | | 3/2007 | Hills et al. |
| 2007/0150826 A1 | | 6/2007 | Anzures et al. |
| 2007/0247435 A1 | | 10/2007 | Benko et al. |
| 2007/0262964 A1 | | 11/2007 | Zotov et al. |
| 2008/0005703 A1 * | | 1/2008 | Radivojevic et al. ......... 715/863 |
| 2008/0013793 A1 * | | 1/2008 | Hillis et al. .................... 382/114 |
| 2008/0168403 A1 | | 7/2008 | Westerman et al. |
| 2008/0244465 A1 | | 10/2008 | Kongqiao et al. |
| 2010/0031203 A1 | | 2/2010 | Morris et al. |
| 2010/0083111 A1 | | 4/2010 | de Los Reyes |
| 2010/0192109 A1 | | 7/2010 | Westerman et al. |

FOREIGN PATENT DOCUMENTS

| | | |
|---|---|---|
| EP | 0 622 722 B1 | 11/1994 |
| EP | 0 626 636 A2 | 11/1994 |
| EP | 0 626 636 A3 | 11/1994 |
| EP | 0 626 636 B1 | 11/1994 |
| EP | 0 667 567 A2 | 8/1995 |
| EP | 0 667 567 A3 | 8/1995 |
| EP | 0 667 567 B1 | 8/1995 |
| EP | 0 689 124 A1 | 12/1995 |
| EP | 0 689 124 B1 | 12/1995 |
| EP | 1 517 228 A2 | 3/2005 |
| EP | 1 517 228 A3 | 3/2005 |
| JP | 2000-163031 A | 6/2000 |
| JP | 2002-342033 A | 11/2002 |
| WO | WO-92/08183 A1 | 5/1992 |
| WO | WO-98/19292 A1 | 5/1998 |
| WO | WO-2008/085788 A2 | 7/2008 |

OTHER PUBLICATIONS

International Search Report mailed Jan. 15, 2009, for PCT Application No. PCT/US2007/089171, filed Dec. 28, 2007, 11 pages.

Minsky, Margaret R.; Manipulating Simulated Objects with Real-world Gestures Using a Force and Position Sensitive Screen; Computer Graphics, vol. 18, No. 3, Jul. 1984; Copyright 1984 ACM 0-89791-138-5/84/007/0195.

Paradiso, J.A. (Jul. 2003). "Tracking Contact and Free Gesture Across Large Interactive Surfaces," *Communications of the ACM* 46(7):62-68.

Rekimoto, Jun; SmartSkin: An Infrastructure for Freehand Manipulation on Interactive Surfaces, Sony Computer Science Laboratories, Inc.; CHI 2002, Apr. 20-25, 2002, Minneapolis, Minnesota, Copyright 2001; ACM 1-58113-453—Mar. 2, 2004.

Varenhorst, C. et al. (Jul. 27, 2004). "Passdoodles: A Lightweight Authentication Method," located at <http://people.csail.mit.edu/emax/papers/varenhorst.pdf>, last visited Sep. 10, 2008.

Wu, M. et al. (Nov. 2, 2003). "Multi-Finger and Whole Hand Gestural Interaction Techniques for Multi-User Tabletop Displays," *Proceedings of the 16Annual ACM Symposium on User Interface Software and Technology*, Vancouver, Canada, Nov. 2-5, 2003, 5(2):193-202.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action mailed Sep. 3, 2013, for U.S. Appl. No. 12/753,754, filed Apr. 2, 2010, 37 pages.

Final Office Action mailed May 7, 2014, for U.S. Appl. No. 12/753,754, filed Apr. 2, 2010, 35 pages.

Notice of Allowance mailed Jun. 12, 2015, for U.S. Appl. No. 12/753,754, filed Apr. 2, 2010, 5 pages.

* cited by examiner

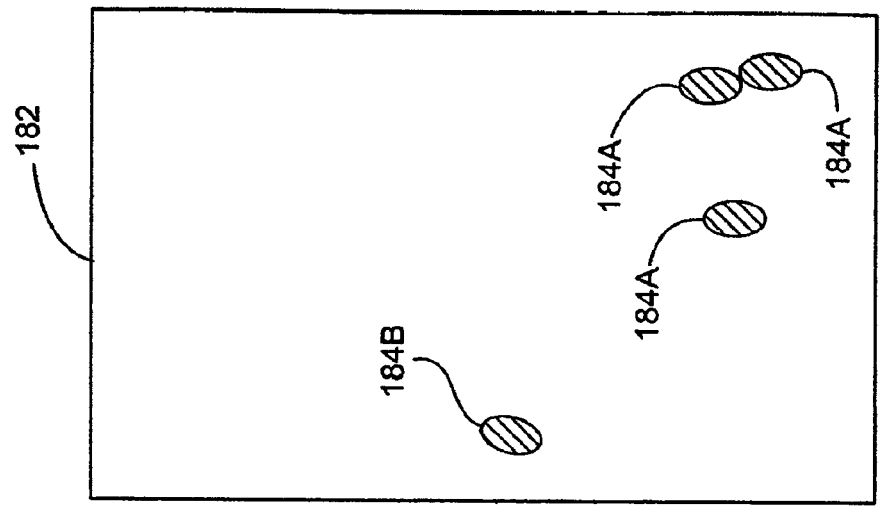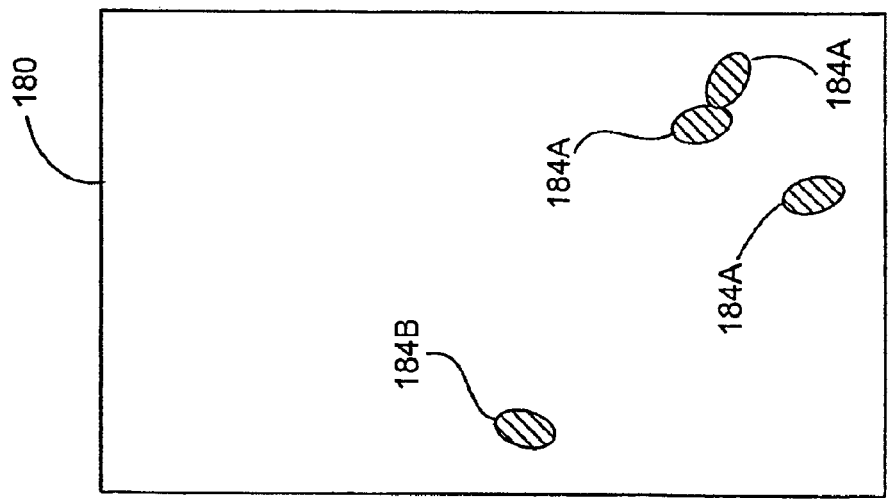
FIG. 8B

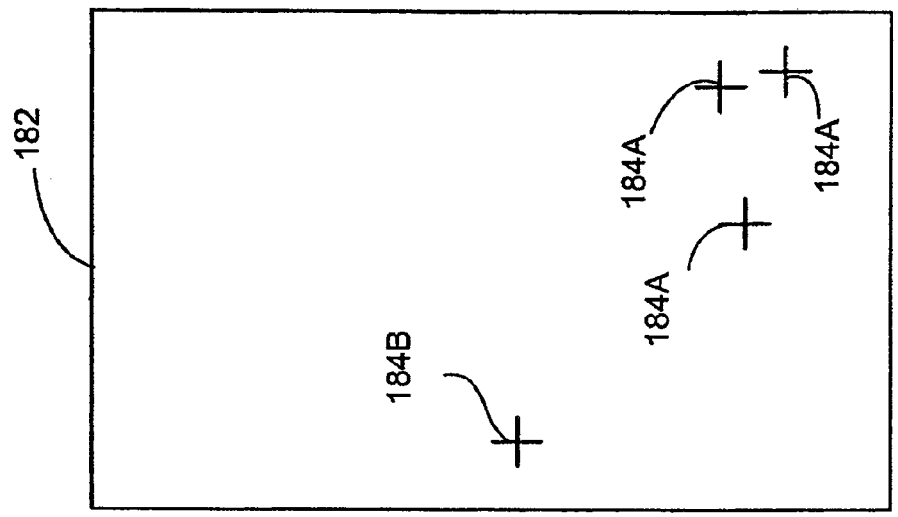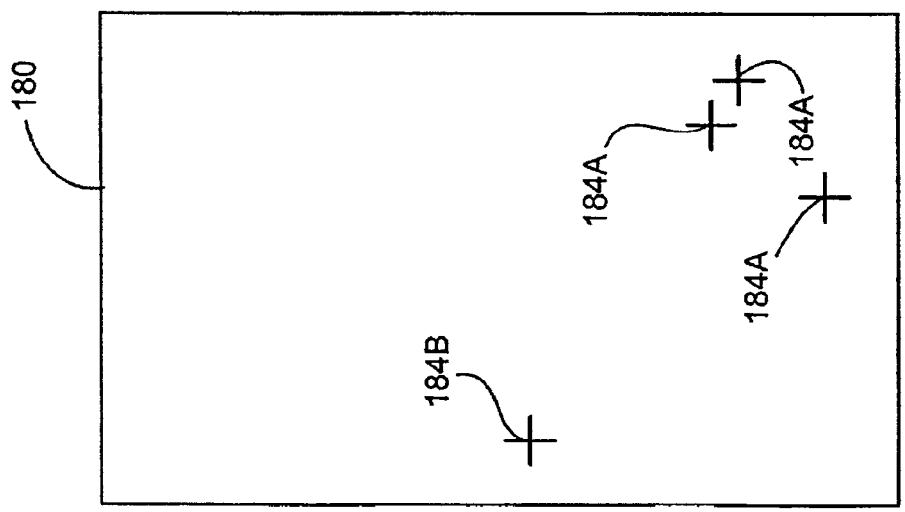
FIG. 8C

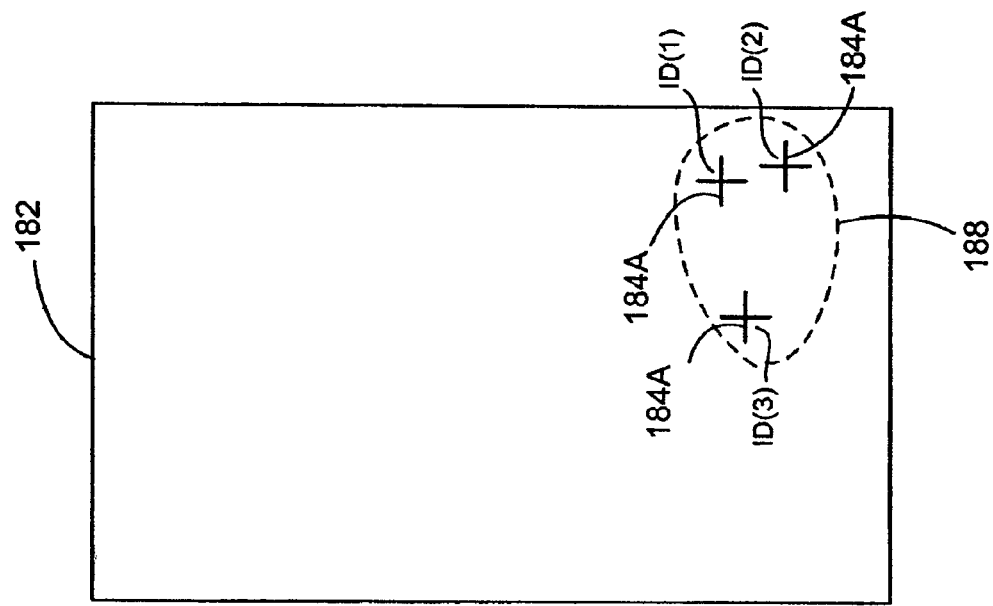
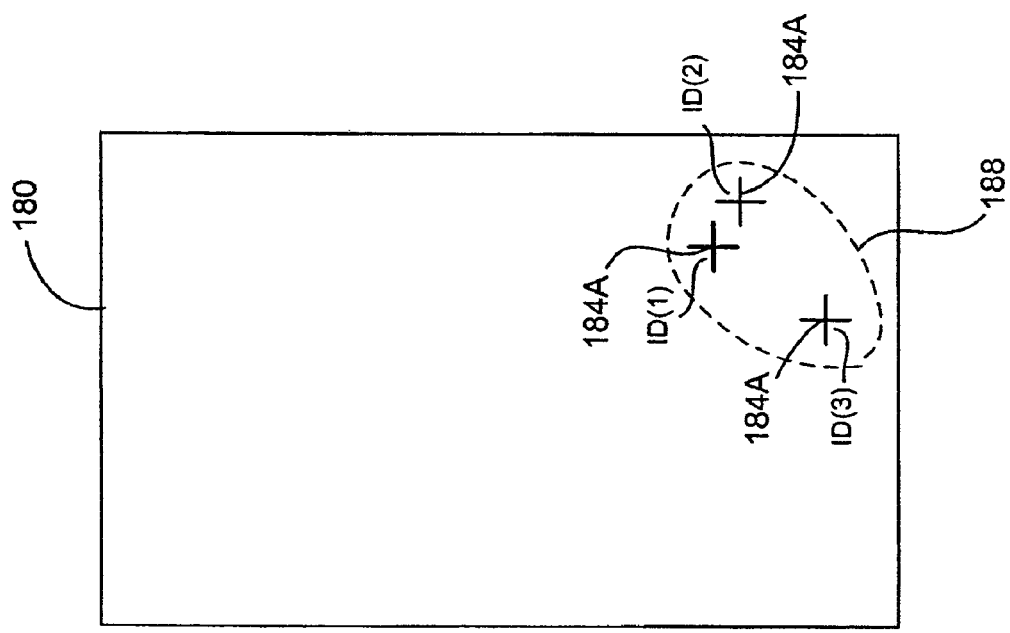
FIG. 8D

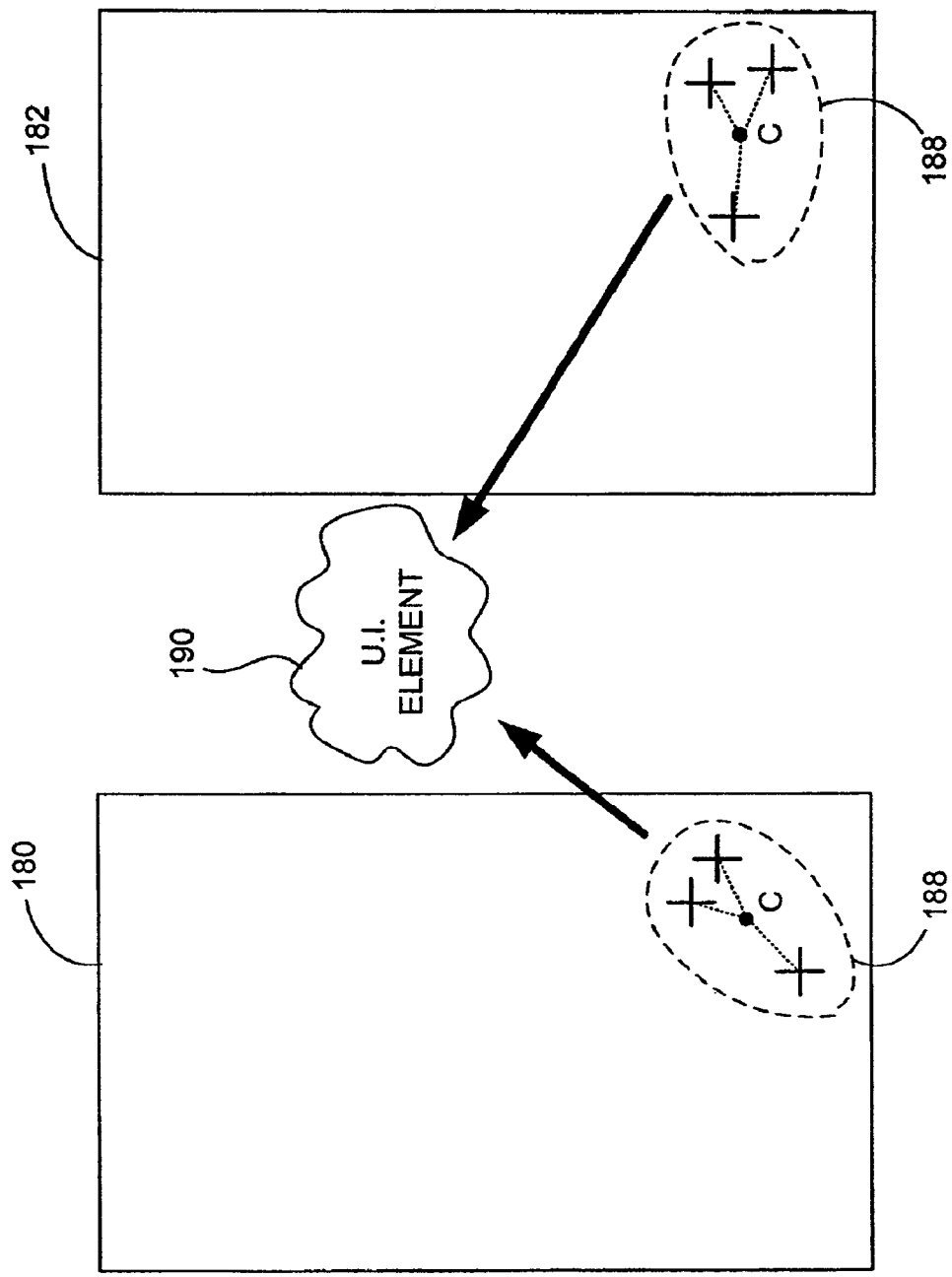

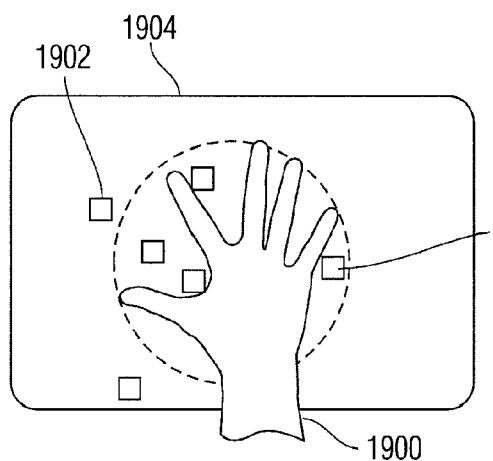
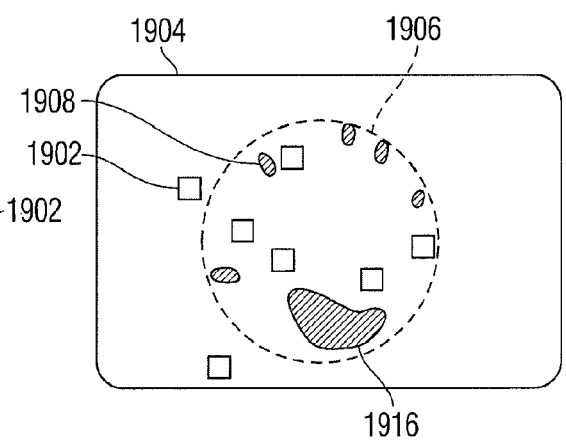
Fig. 19a         Fig. 19b
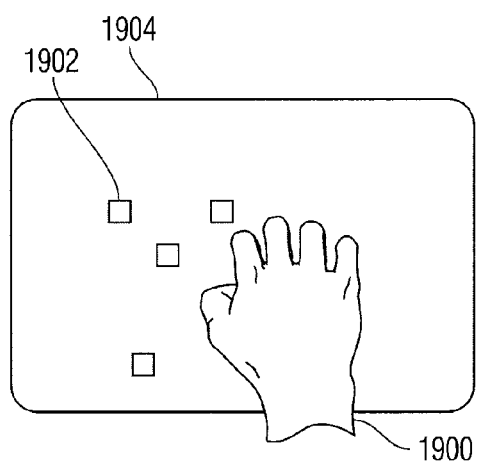
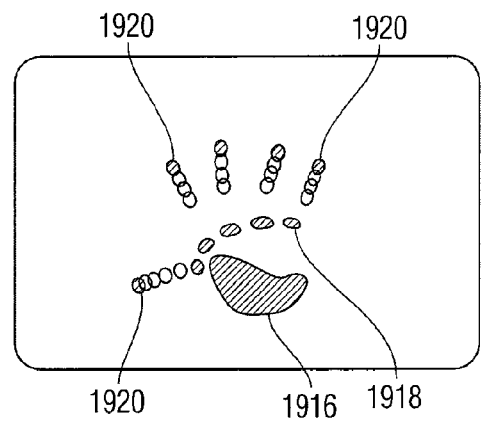
Fig. 19c         Fig. 19d

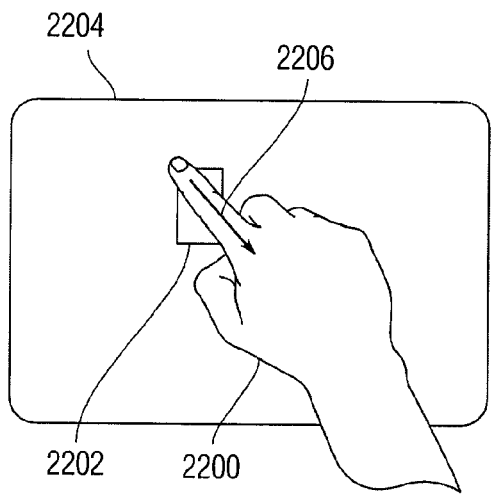
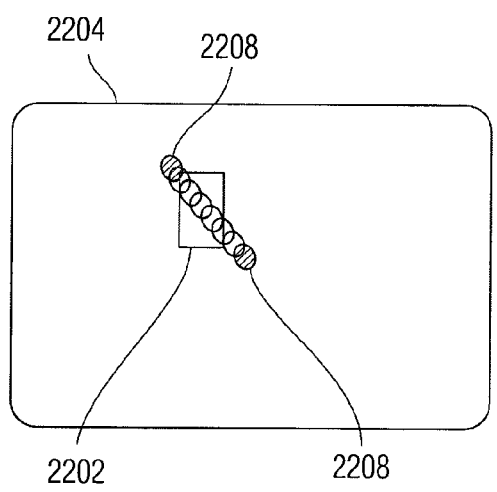
Fig. 22a    Fig. 22b
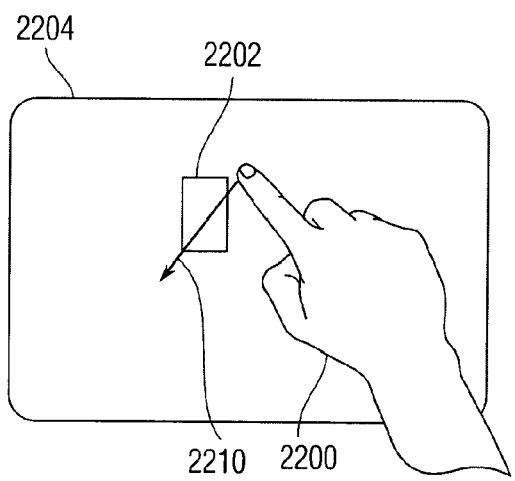
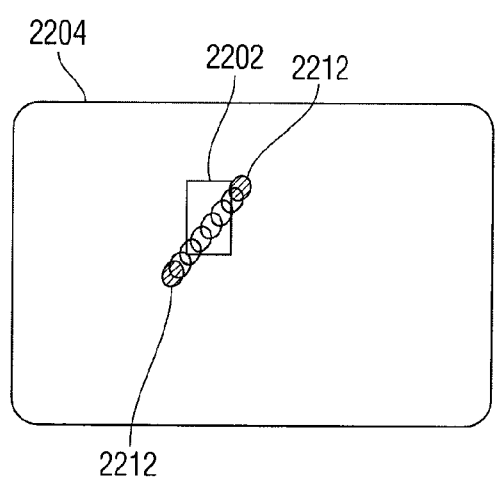
Fig. 22c    Fig. 22d

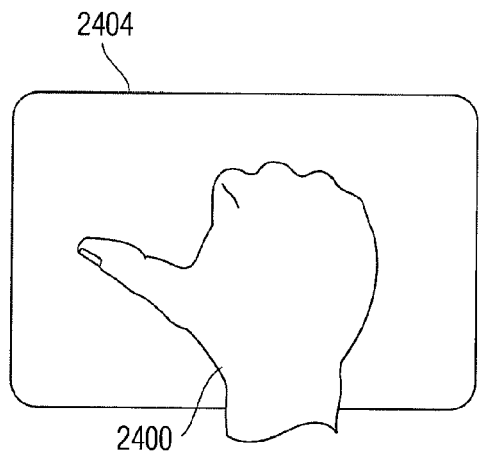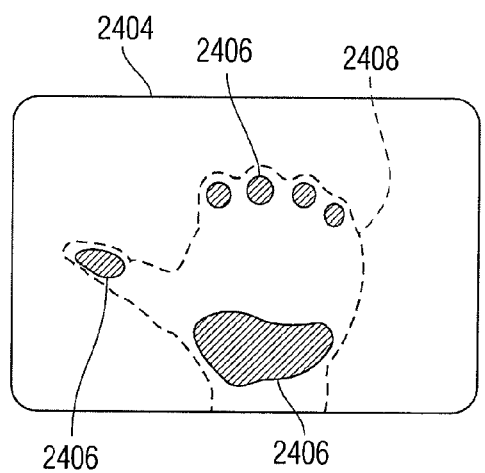
Fig. 24a  Fig. 24b
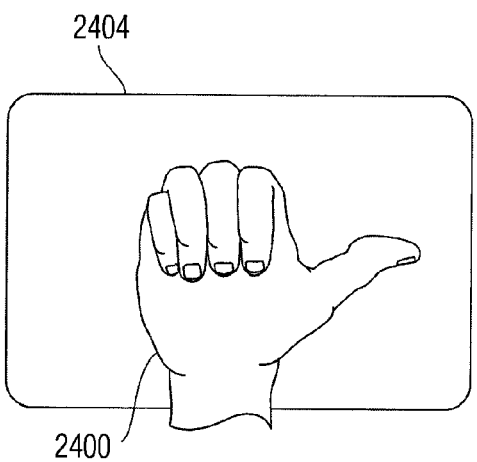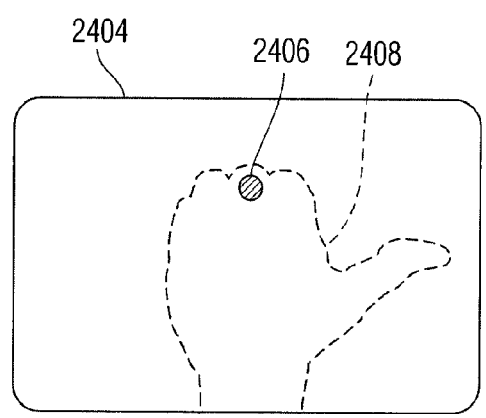
Fig. 24c  Fig. 24d

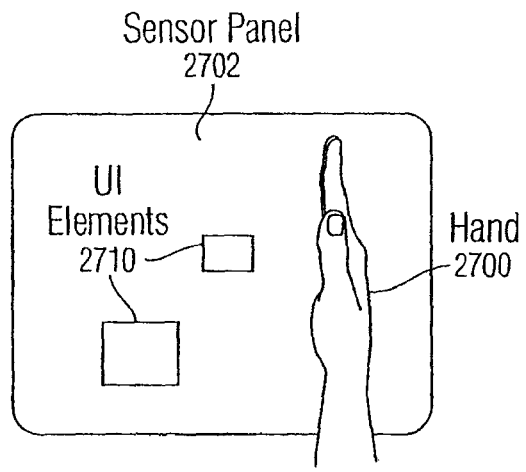
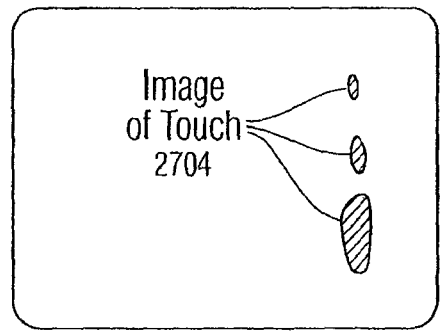
Fig. 27a　　　　　　Fig. 27b
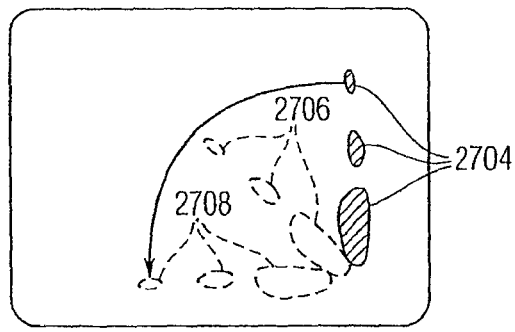
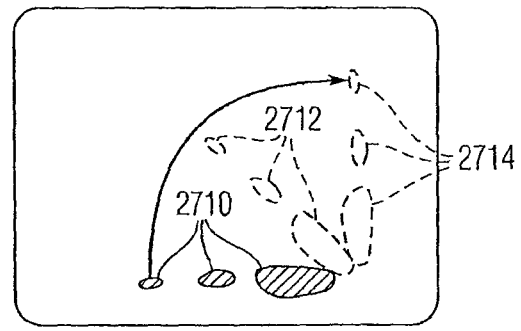
Fig. 27c　　　　　　Fig. 27d
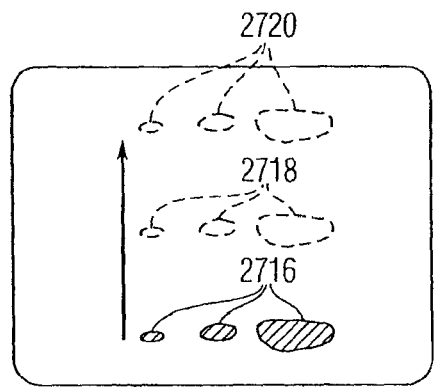
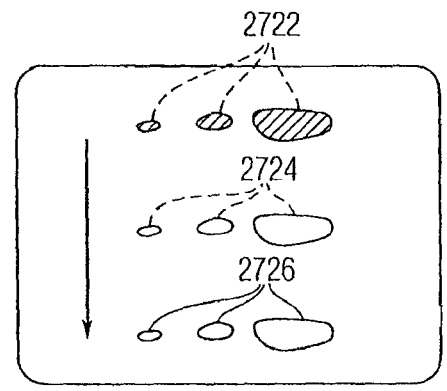
Fig. 27e　　　　　　Fig. 27f

DETECTING AND INTERPRETING REAL-WORLD AND SECURITY GESTURES ON TOUCH AND HOVER SENSITIVE DEVICES

CROSS REFERENCE TO RELATED APPLICATION

The application is a division of U.S. patent application Ser. No. 11/818,500, filed Jun. 13, 2007 which also claims the benefit under 35 USC 119(e) of U.S. provisional patent application Ser. No. 60/879,191 filed Jan. 6, 2007, the contents of which are incorporated by reference herein.

FIELD OF THE INVENTION

This relates to the detection and interpretation of gestures by touch and hover sensitive devices, and more particularly, to the detection and interpretation of real-world gestures and security-related gestures by touch and hover sensitive devices.

BACKGROUND OF THE INVENTION

There exist today many styles of input devices for performing operations in a computer system. The operations generally correspond to moving a cursor and making selections on a display screen. The operations can also include paging, scrolling, panning, zooming, etc. By way of example, the input devices can include buttons, switches, keyboards, mice, trackballs, touch pads, joy sticks, touch screens and the like. Each of these devices can have advantages and disadvantages that can be taken into account when designing a computer system.

Buttons and switches can be mechanical in nature and provide limited control with regards to the movement of the cursor and making selections. For example, they can be dedicated to moving the cursor in a specific direction (e.g., arrow keys) or to making specific selections (e.g., enter, delete, number, etc.).

In using a mouse instrument, the movement of the input pointer on a display can correspond to the relative movements of the mouse as the user moves the mouse along a surface. In using a trackball instrument, the movement of the input pointer on the display can correspond to the relative movements of a trackball as the user moves the ball within a housing. Mouse and trackball instruments can typically also include one or more buttons for making selections. A mouse instrument can also include scroll wheels that can allow a user to scroll the displayed content by rolling the wheel forward or backward.

With touch pad instrument, such as touch pads on a personal laptop computer, the movement of the input pointer on a display can correspond to the relative movements of the user's finger (or stylus) as the finger is moved along a surface of the touch pad. Touch screens, on the other hand, are a type of display screen that typically can include a touch-sensitive transparent panel (or "skin") that can overlay the display screen. When using a touch screen, a user typically makes a selection on the display screen by pointing directly to objects (such as GUI objects) displayed on the screen (usually with a stylus or finger).

To provide additionally functionality, hand gestures have been implemented with some of these input devices. By way of example, in touch pads, selections can be made when one or more taps can be detected on the surface of the touch pad. In some cases, any portion of the touch pad can be tapped, and in other cases a dedicated portion of the touch pad can be tapped. In addition to selections, scrolling can be initiated by using finger motion at the edge of the touch pad.

U.S. Pat. Nos. 5,612,719 and 5,590,219, assigned to Apple Computer, Inc. describe some other uses of gesturing. U.S. Pat. No. 5,612,719 discloses an onscreen button that can be responsive to at least two different button gestures made on the screen on or near the button. U.S. Pat. No. 5,590,219 discloses a method for recognizing an ellipse-type gesture input on a display screen of a computer system.

In recent times, more advanced gestures have been implemented. For example, scrolling can be initiated by placing four fingers on the touch pad so that the scrolling gesture is recognized, and thereafter moving these fingers on the touch pad to perform scrolling events. The methods for implementing these advanced gestures, however, can be limited and in many instances counterintuitive. In certain applications, it can be beneficial to enable a user to use "real-world" gestures such as hand movements and/or finger orientations that can be generally recognized to mean certain things, such as an "OK" signal, to more efficiently and accurately effect intended operations.

SUMMARY OF THE INVENTION

Embodiments of the present invention are directed to the detection of "real-world" gestures that can be generally recognized to mean certain things by a touch or hover sensitive device to more efficiently and accurately effect intended operations in computing systems. These gestures can include, but are not limited to, "OK gestures," "grasp everything gestures," "stamp of approval gestures," "circle select gestures," "X to delete gestures," "knock to inquire gestures," "hitchhiker directional gestures," and "shape gestures." In addition, gestures can be used to provide identification and allow or deny access to applications, files, and the like.

An "OK gesture" can be detected and interpreted to perform operations that can require an affirmative response, such as a text box UI element that asks the user whether a certain action is to be taken. A "grasp everything gesture" can be detected and interpreted to perform operations that can require a grouping action, such as the grouping of UI elements such as file icons or graphics symbols on a desktop or drawing page. A "stamp of approval gesture" can be detected and interpreted to perform operations that can require an affirmative response, such as a UI element including text that asks the user whether a certain action is to be taken. A "circle select gesture" can be detected and interpreted to perform operations that can require a grouping action, such as the grouping of UI elements such as file icons or graphics symbols on a desktop or drawing page. An "X to delete gesture" can be detected and interpreted to perform operations that can require a deleting action, such as the deleting of a UI element such as file icon or graphics symbol on a desktop or drawing page. A "knock to inquire gesture" can be detected and interpreted to perform operations that can require an inquiry action, such as determining whether an application, file, person of interest or other entity is available to be opened, accessed, communicated with, and the like. A "hitchhiker gesture" can be detected and interpreted to perform operations that can require a directional input, such as a scrolling, panning, windowing, translating in time, and the like. Shape gestures can be detected and interpreted to perform various operations, including creating a graphic image of that shape, or selecting or moving UI elements. An "identification gesture" formed by either or both hands on or over a touch or hover sensitive device can be detected and interpreted to perform operations that can require an identification action, such determining whether the user is to get access, or continue to have access, to a restricted account, file or other item.

BRIEF DESCRIPTION OF THE DRAWINGS

FIGS. 8a-8g illustrate a rotate gesture according to one embodiment of this invention.

FIGS. 19a-19d illustrate an exemplary "grasp everything gesture" according to one embodiment of this invention.

FIGS. 22a-22d illustrate an exemplary "X to delete gesture" according to one embodiment of this invention.

FIGS. 24a-24h illustrate an exemplary "hitchhiker gesture" according to one embodiment of this invention.

FIGS. 27a-27k illustrate exemplary "hand edge gestures" according to one embodiment of this invention.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention can be practiced. It is to be understood that other embodiments can be utilized and structural changes can be made without departing from the scope of the preferred embodiments of the present invention.

"Real-world" gestures such as hand or finger movements/orientations that are generally recognized to mean certain things (e.g., an "OK" hand signal generally indicates an affirmative response) can be interpreted by a touch or hover sensitive device to more efficiently and accurately effect intended operations. These gestures can include, but are not limited to, "OK gestures," "grasp everything gestures," "stamp of approval gestures," "circle select gestures," "X to delete gestures," "knock to inquire gestures," "hitchhiker directional gestures," and "shape gestures." In addition, gestures can be used to provide identification and allow or deny access to applications, files, and the like.

Although some embodiments of the invention can be described herein in terms of capacitive multi-touch sensor panels, embodiments of the invention can be generally applicable to other types of multi-touch sensors that can include resistive touch sensors, surface acoustic wave touch sensors, electromagnetic touch sensors, near field imaging touch sensors, optical touch sensors and the like. In addition, although the proximity sensors can be described herein as infrared (IR) proximity sensors, embodiments of the invention can be generally applicable to other types of proximity sensors having an output that can be AC-coupled to an analog channel.

Figure 1:
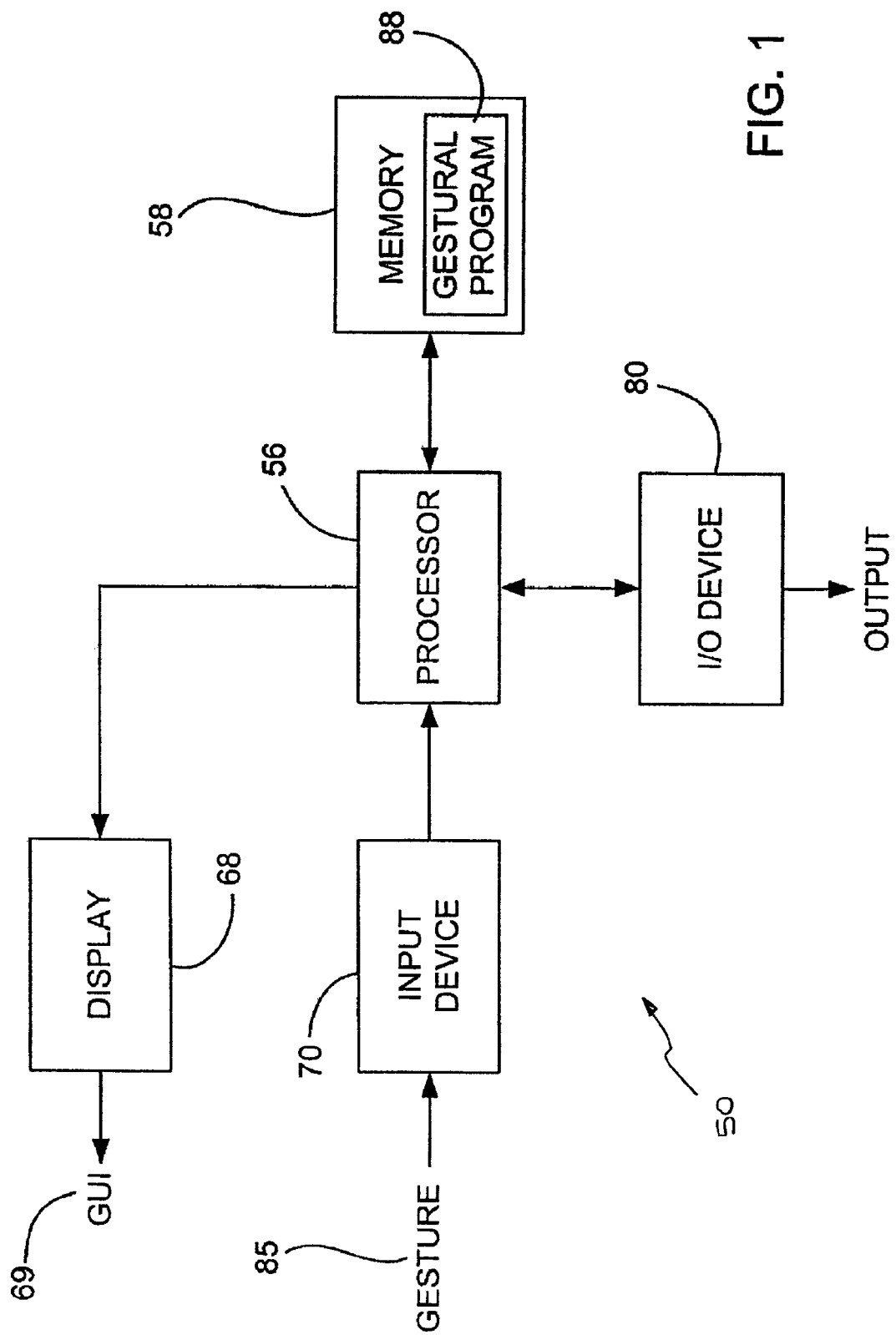
FIG. 1 is a block diagram of an exemplary computer system according to one embodiment of this invention.

FIG. 1 is a block diagram of exemplary computer system 50 in accordance with embodiments of this invention. Computer system 50 can correspond to a personal computer system, such as a desktop, laptop, tablet or handheld computer. The computer system can also correspond to a computing device, such as a mobile telephone, PDA, dedicated media player, consumer electronics device, and the like.

The exemplary computer system 50 shown in FIG. 1 can include a processor 56 configured to execute instructions and to carry out operations associated with the computer system 50. For example, using instructions retrieved, for example, from memory, the processor 56 can control the reception and manipulation of input and output data between components of the computing system 50. The processor 56 can be implemented on a single-chip, multiple chips or multiple electrical components. For example, various architectures can be used for the processor 56, including dedicated or embedded processors, single purpose processors, controllers, ASICs, and so forth.

In most cases, the processor 56 together with an operating system can operate to execute computer code and produce and use data. Operating systems are generally well known and will not be described in greater detail. By way of example, the operating system can correspond to OS/2, DOS, Unix, Linux, Palm OS, and the like. The operating system can also be a special purpose operating system, such as can be used for limited purpose appliance-type computing devices. The operating system, other computer code and data can reside within a memory block 58 that can be operatively coupled to the processor 56. Memory block 58 can generally provide a place to store computer code and data that can be used by the computer system 50. By way of example, the memory block 58 can include Read-Only Memory (ROM), Random-Access Memory (RAM), hard disk drive and/or the like. The information could also reside on a removable storage medium and can be loaded or installed onto the computer system 50 when needed. Removable storage mediums can include, for example, CD-ROM, PC-CARD, memory card, floppy disk, magnetic tape, and a network component.

The computer system 50 can also include a display device 68 that can be operatively coupled to the processor 56. The display device 68 can be a liquid crystal display (LCD) (e.g., active matrix, passive matrix and the like). Alternatively, the display device 68 can be a monitor such as a monochrome display, color graphics adapter (CGA) display, enhanced graphics adapter (EGA) display, variable-graphics-array (VGA) display, super VGA display, cathode ray tube (CRT), and the like. The display device can also correspond to a plasma display or a display implemented with electronic inks.

The display device 68 can be configured to display a graphical user interface (GUI) 69 that can provide an easy to use interface between a user of the computer system and the operating system or application running thereon. Generally speaking, the GUI 69 can represent programs, files and operational options with graphical images, objects, or vector representations. The graphical images can include windows, fields, dialog boxes, menus, icons, buttons, cursors, scroll bars, etc. Such images can be arranged in predefined layouts, or can be created dynamically to serve the specific actions being taken by a user. During operation, the user can select and/or activate various graphical images in order to initiate functions and tasks associated therewith. By way of example, a user can select a button that opens, closes, minimizes, or maximizes a window, or an icon that launches a particular program. The GUI 69 can additionally or alternatively display information, such as non interactive text and graphics, for the user on the display device 68.

The computer system 50 can also include an input device 70 that can be operatively coupled to the processor 56. The input device 70 can be configured to transfer data from the outside world into the computer system 50. The input device 70 can, for example, be used to perform tracking and to make selections with respect to the GUI 69 on the display 68. The input device 70 can also be used to issue commands in the computer system 50. The input device 70 can include a touch-sensing device configured to receive input from a user's touch and to send this information to the processor 56. By way of example, the touch-sensing device can correspond to a touchpad or a touch screen. In many cases, the touch-sensing device can recognize touches, as well as the position and magnitude of touches on a touch sensitive surface. The touch sensing device can detect and report the touches to the processor 56 and the processor 56 can interpret the touches in accordance with its programming. For example, the processor 56 can initiate a task in accordance with a particular touch. A dedicated processor can be used to process touches locally and reduce demand for the main processor of the computer system.

The touch sensing device can be based on sensing technologies including but not limited to capacitive sensing, resistive sensing, surface acoustic wave sensing, pressure sensing, optical sensing, and/or the like. Furthermore, the touch sensing means can be based on single point sensing or multipoint sensing. Single point sensing can be capable of only distinguishing a single touch, while multipoint sensing can be capable of distinguishing multiple touches that occur at the same time.

As discussed above, the input device 70 can be a touch screen that is positioned over or in front of the display 68, integrated with the display device 68, or can be a separate component, such as a touch pad.

The computer system 50 can also include capabilities for coupling to one or more I/O devices 80. By way of example, the I/O devices 80 can correspond to keyboards, printers, scanners, cameras, microphones, speakers, and/or the like. The I/O devices 80 can be integrated with the computer system 50 or they can be separate components (e.g., peripheral devices). In some cases, the I/O devices 80 can be connected to the computer system 50 through wired connections (e.g., cables/ports). In other cases, the I/O devices 80 can be connected to the computer system 80 through wireless connections. By way of example, the data link can correspond to PS/2, USB, IR, Firewire, RF, Bluetooth or the like.

In accordance with one embodiment of the present invention, the computer system 50 can be designed to recognize gestures 85 applied to the input device 70 and to control aspects of the computer system 50 based on the gestures 85. In some cases, a gesture can be defined as a stylized interaction with an input device that can be mapped to one or more specific computing operations. The gestures 85 can be made through various hand and finger motions. Alternatively or additionally, the gestures can be made with a stylus. In all of these cases, the input device 70 can receive the gestures 85 and the processor 56 can execute instructions to carry out operations associated with the gestures 85. In addition, the memory block 58 can include a gesture operational program 88, which can be part of the operating system or a separate application. The gestural operation program 88 can generally include a set of instructions that can recognize the occurrence of gestures 85 and can inform one or more software agents of the gestures 85 and/or what action(s) to take in response to the gestures 85. Additional details regarding the various gestures that can be used as input commands are discussed further below.

In one embodiment, upon a user performing one or more gestures, the input device 70 can relay gesture information to the processor 56. Using instructions from memory 58, and more particularly, the gestural operational program 88, the processor 56 can interpret the gestures 85 and control different components of the computer system 50, such as memory 58, a display 68 and I/O devices 80, based on the gestures 85. The gestures 85 can be identified as commands for performing actions in applications stored in the memory 58, modifying image objects shown on the display 68, modifying data stored in memory 58, and/or for performing actions in I/O devices 80.

Again, although FIG. 1 illustrates the input device 70 and the display 68 as two separate boxes for illustration purposes, the two boxes can be realized on one device.

Figure 2:
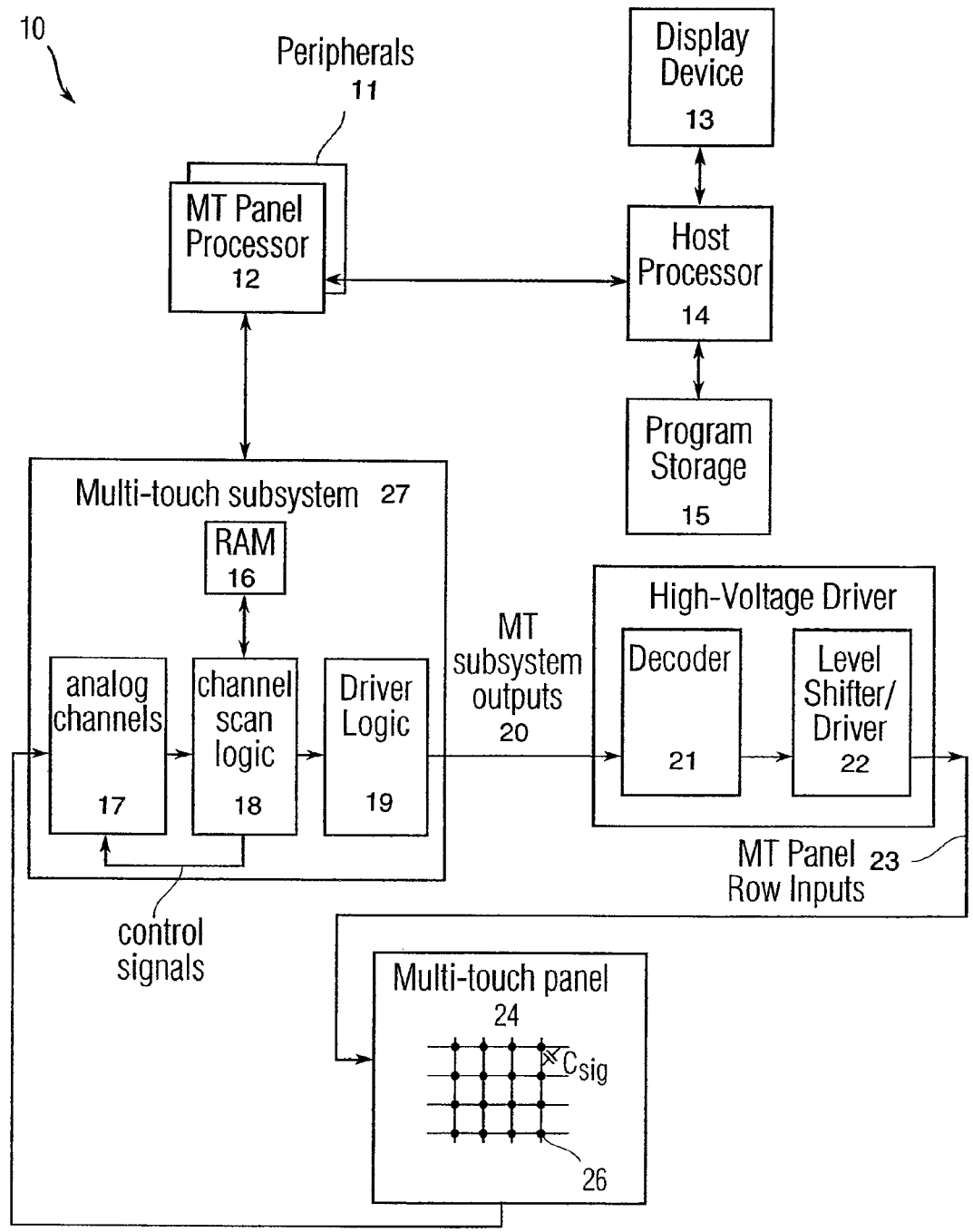
FIG. 2 illustrates another exemplary computer system according to one embodiment of this invention.

FIG. 2 illustrates an exemplary computing system 10 that can use a multi-touch panel 24 as an input device for gestures; the multi-touch panel 24 can at the same time be a display panel. The computing system 10 can include one or more multi-touch panel processors 12 dedicated to the multi-touch subsystem 27. Alternatively, the multi-touch panel processor functionality can be implemented by dedicated logic, such as a state machine. Peripherals 11 can include, but are not limited to, random access memory (RAM) or other types of memory or storage, watchdog timers and the like. Multi-touch subsystem 27 can include, but is not limited to, one or more analog channels 17, channel scan logic 18 and driver logic 19. Channel scan logic 18 can access RAM 16, autonomously read data from the analog channels and provide control for the analog channels. This control can include multiplexing columns of multi-touch panel 24 to analog channels 17. In addition, channel scan logic 18 can control the driver logic and stimulation signals being selectively applied to rows of multi-touch panel 24. In some embodiments, multi-touch subsystem 27, multi-touch panel processor 12 and peripherals 11 can be integrated into a single application specific integrated circuit (ASIC).

Driver logic 19 can provide multiple multi-touch subsystem outputs 20 and can present a proprietary interface that drives high voltage driver, which can include a decoder 21 and subsequent level shifter and driver stage 22, although level-shifting functions could be performed before decoder functions. Level shifter and driver 22 can provide level shifting from a low voltage level (e.g. CMOS levels) to a higher voltage level, providing a better signal-to-noise (S/N) ratio for noise reduction purposes. Decoder 21 can decode the drive interface signals to one or more of N outputs, where N is the maximum number of rows in the panel. Decoder 21 can be used to reduce the number of drive lines needed between the high voltage driver and multi-touch panel 24. Each multi-touch panel row input 23 can drive one or more rows in multi-touch panel 24. It should be noted that driver 22 and decoder 21 can also be integrated into a single ASIC, be integrated into driver logic 19, or in some instances be unnecessary.

The multi-touch panel 24 can include a capacitive sensing medium having a plurality of row traces or driving lines and a plurality of column traces or sensing lines, although other sensing media can also be used. The row and column traces can be formed from a substantially transparent conductive medium, such as Indium Tin Oxide (ITO) or Antimony Tin Oxide (ATO), although other transparent and non-transparent materials, such as copper, can also be used. In some embodiments, the row and column traces can be formed on opposite sides of a dielectric material, and can be perpendicular to each other, although in other embodiments other non-Cartesian orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). The rows and columns can be formed on a single side of a substrate, or can be formed on two separate substrates separated by a dielectric material. In some instances, an additional dielectric cover layer can be placed over the row or column traces to strengthen the structure and protect the entire assembly from damage.

At the "intersections" of the traces of the multi-touch panel 24, where the traces pass above and below (cross) each other (but do not make direct electrical contact with each other), the traces can essentially form two electrodes (although more than two traces could intersect as well). Each intersection of row and column traces can represent a capacitive sensing node and can be viewed as picture element (pixel) 26, which can be particularly useful when multi-touch panel 24 is viewed as capturing an "image" of touch. (In other words, after multi-touch subsystem 27 has determined whether a touch event has been detected at each touch sensor in the multi-touch panel, the pattern of touch sensors in the multi-touch panel at which a touch event occurred can be viewed as an "image" of touch (e.g. a pattern of fingers touching the panel).) The capacitance between row and column electrodes can appear as a stray capacitance on all columns when the given row is held at DC and as a mutual capacitance Csig when the given row is stimulated with an AC signal. The presence of a finger or other object near or on the multi-touch panel can be detected by measuring changes to Csig. The columns of multi-touch panel 124 can drive one or more analog channels 17 (also referred to herein as event detection and demodulation circuits) in multi-touch subsystem 27. In some implementations, each column is coupled to one dedicated analog channel 17. However, in other implementations, the columns can be couplable via an analog switch to a fewer number of analog channels 17.

Computing system 10 can also include host processor 14 for receiving outputs from multi-touch panel processor 12 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, etc. Host processor 14, which can be a personal computer CPU, can also perform additional functions that may not be related to multi-touch panel processing, and can be coupled to program storage 15 and display device 13 such as an LCD display for providing a user interface (UI) to a user of the device. It should also be noted that multi-touch panel 24 and display device 13 can be integrated into one single touch-screen display device.

Although capacitive touch sensor panels can detect objects hovering within the near-field of the panel, and appear to be "weak" touches, in some embodiments proximity sensor panels can be co-located with touch sensor panels to provide hover detection capabilities outside the near-field hover detection capabilities of capacitive touch sensor panels. These proximity sensor panels can be arranged as an array of proximity sensors that can be scanned in a manner similar to the scanning of a touch sensor panel to generate an "image" of hover. Further details of multi-touch sensor detection, including proximity detection by a touch panel and proximity detection by a proximity sensor panel, are described in commonly assigned co-pending applications, including U.S. patent application Ser. No. 10/840,862, published on May 11, 2006 as U.S. Publication No. US2006/0097991, and U.S. patent application entitled "Proximity and Multi-Touch Sensor Detection and Demodulation," filed on Jan. 3, 2007, the entirety of both which are incorporated herein by reference.

Figure 3:
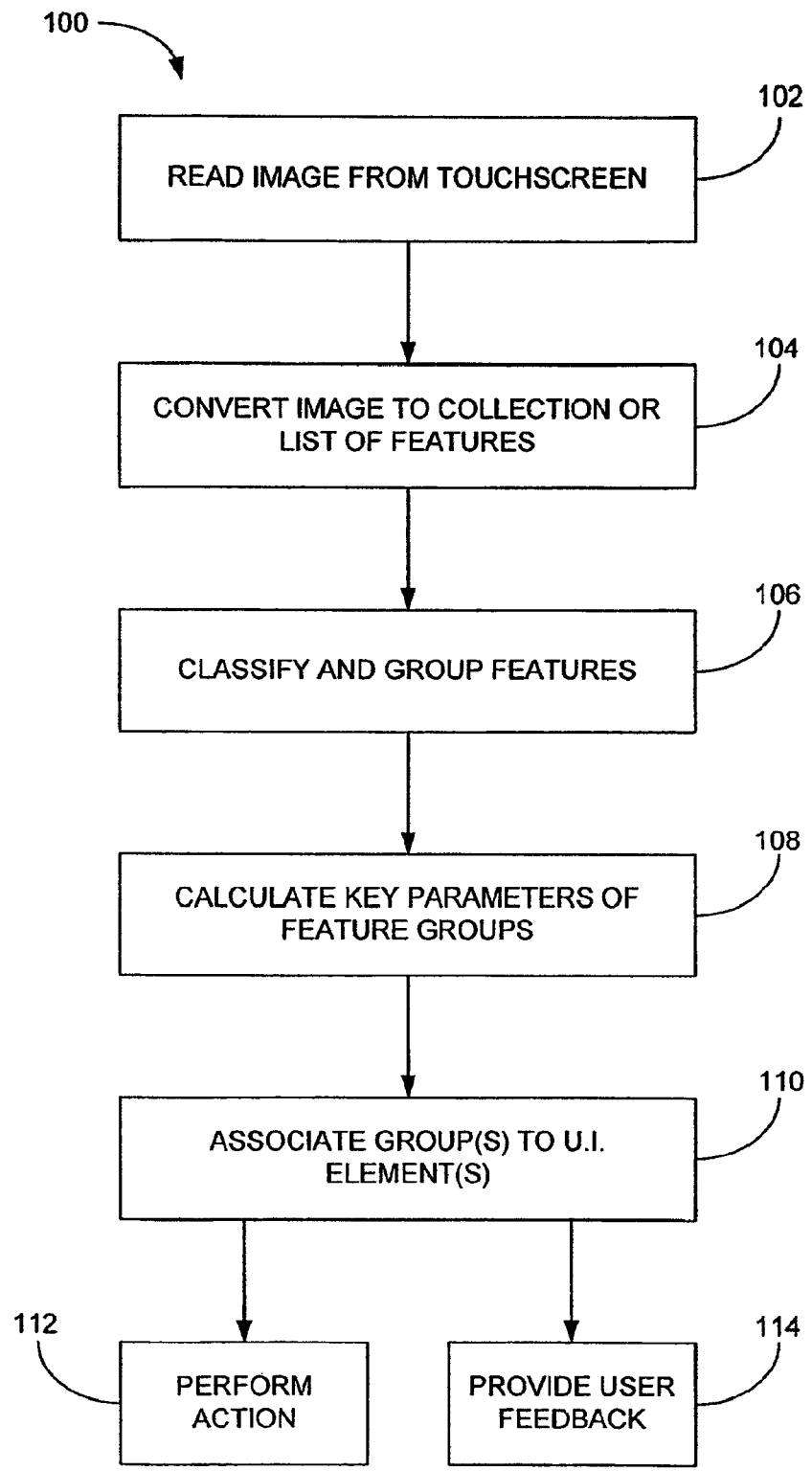
FIG. 3 is an exemplary multipoint processing method according to one embodiment of this invention.

FIG. 3 illustrates a multipoint processing method 100, in accordance with one embodiment of the present invention. The multipoint processing method 100 can, for example, be performed in the system shown in FIG. 1 or 2. The multipoint processing method 100 generally begins at block 102 where images can be read from a multipoint input device, and more particularly a multipoint touch screen. Although the term "image" is used it should be noted that the data can come in other forms. In most cases, the image read from the touch screen provides magnitude (Z) as a function of position (x and y) for each sensing point or pixel of the touch screen. The magnitude can, for example, reflect the capacitance measured at each point.

Figure 4A:
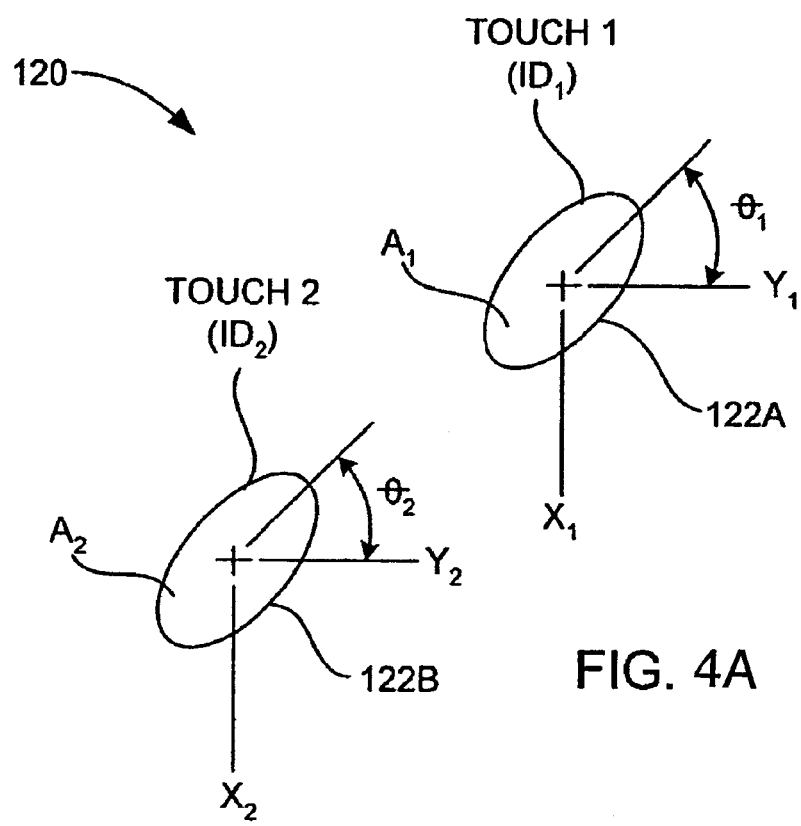
FIGS. 4a and 4b illustrate a detected touch image according to one embodiment of this invention.
Figure 4B:
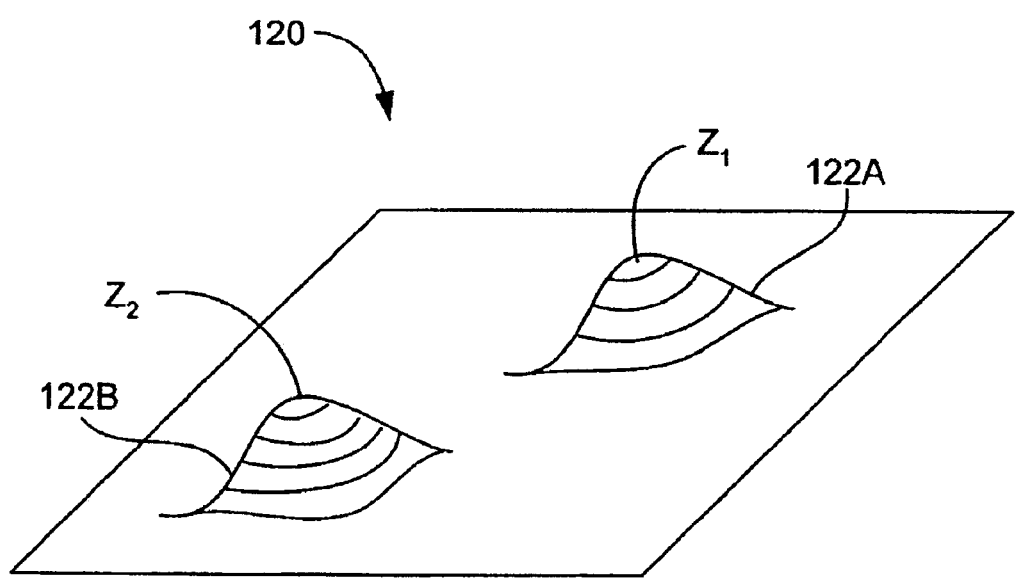

Following block 102, multipoint processing method 100 can proceed to block 104 where the image can be converted into a collection or list of features. Each feature can represent a distinct input such as a touch. In most cases, each feature can include its own unique identifier (ID), x coordinate, y coordinate, Z magnitude, angle $\Theta$, area A, and the like. By way of example, FIGS. 4A and 4B illustrate a particular image 120 in time. In image 120, there are two features 122 based on two distinct touches. The touches can for example be formed from a pair of fingers touching the touch screen. As shown, each feature 122 can include unique identifier (ID), x coordinate, y coordinate, Z magnitude, angle .theta., and area A. More particularly, the first feature 122A is represented by $ID_i$, $X_1$, $Y_1$, $Z_1$, $\Theta_1$, $A_1$ and the second feature 122B is represented by $ID_2$, $X_2$, $Y_2$, $Z_2$, $\Theta_2$, $A_2$. This data can be outputted for example using a multi-touch protocol.

The conversion from data or images to features can be accomplished using methods described in U.S. Patent Publication No. US2006/009771. As disclosed therein, the raw data can typically be received in a digitized form, and can include values for each node of the touch screen. The values can be between 0 and 256 where 0 equates to no touch pressure and 256 equates to full touch pressure. Thereafter, the raw data can be filtered to reduce noise. Once filtered, gradient data, which indicates the topology of each group of connected points, can be generated. Thereafter, the boundaries for touch regions can be calculated based on the gradient data (i.e., a determination is made as to which points are grouped together to form each touch region). By way of example, a watershed algorithm can be used. Once the boundaries are determined, the data for each of the touch regions can be calculated (e.g., X, Y, Z, θ, A).

Following block 104, multipoint processing method 100 proceeds to block 106 where feature classification and groupings can be performed. During classification, the identity of each of the features can be determined. For example, the features can be classified as a particular finger, thumb, palm or other object. Once classified, the features can be grouped. The manner in which the groups are formed can be widely varied. In most cases, the features can be grouped based on some criteria (e.g., they carry a similar attribute). For example, the two features shown in FIGS. 4A and 4B can be grouped together because each of these features can be located in proximity to each other or because they can be from the same hand. The grouping can include some level of filtering to filter out features that are not part of the touch event. In filtering, one or more features can be rejected because they either meet some predefined criteria or because they do not meet some criteria. By way of example, one of the features can be classified as a thumb located at the edge of a tablet PC. Because the thumb can be used to hold the device rather than being used to perform a task, the feature generated therefrom can be rejected, i.e., is not considered part of the touch event being processed.

Figure 5:
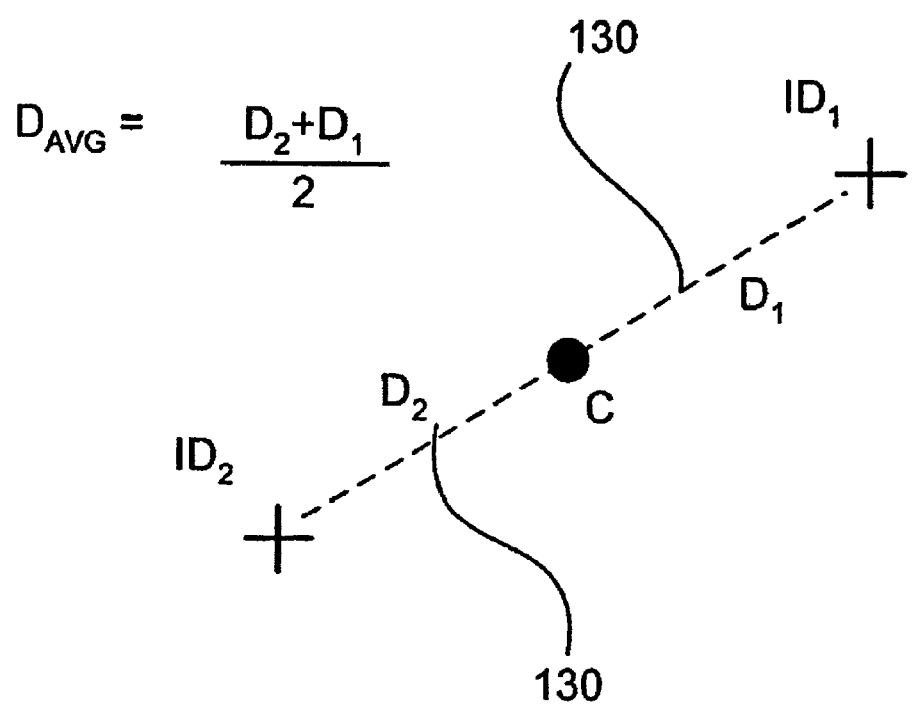
FIG. 5 illustrates a group of features according to one embodiment of this invention.

Following block 106, the multipoint processing method 100 proceeds to block 108 where key parameters for the feature groups can be calculated. The key parameters can include distance between features, x/y centroid of all features, feature rotation, total pressure of the group (e.g., pressure at centroid), and the like. As shown in FIG. 5, the calculation can include finding the centroid C, drawing a virtual line 130 to each feature from the centroid C, defining the distance D for each virtual line ($D_1$ and $D_2$), and then averaging the distances $D_1$ and $D_2$. Once the parameters are calculated, the parameter values can be reported. The parameter values can typically be reported with a group identifier (GID) and number of features within each group (in this case three). In most cases, both initial and current parameter values can be reported. The initial parameter values can be based on set down or touch down, i.e., when the user sets their fingers on the touch screen, and the current values can be based on any point within a stroke occurring after set down.

As should be appreciated, blocks 102-108 are repetitively performed during a user stroke thereby generating a plurality of sequentially configured signals. The initial and current parameters can be compared in later steps to perform actions in the system.

Following block 108, the process flow proceeds to block 110 where the group is or can be associated with a user interface (UI) element. UI elements can be buttons boxes, lists, sliders, wheels, knobs, pictures, documents, icons, etc. Each UI element can represent a component or control of the user interface. The application behind the UI element(s) can have access to the parameter data calculated in block 108. In one implementation, the application can rank the relevance of the touch data to the UI element corresponding there to. The ranking can be based on some predetermined criteria. The ranking can include producing a figure of merit, and whichever UI element has the highest figure of merit, giving it sole access to the group. There can even be some degree of hysteresis as well (once one of the UI elements claims control of that group, the group sticks with the UI element until another UI element has a much higher ranking). By way of example, the ranking can include determining proximity of the centroid (or features) to the image object associated with the UI element.

Following block 110, the multipoint processing method 100 proceeds to blocks 112 and 114. The blocks 112 and 114 can be performed approximately at the same time. From the user perspective, in one embodiment, the blocks 112 and 114 appear to be performed concurrently. In block 112, one or more actions can be performed based on differences between initial and current parameter values, and can also be based on a UI element to which they are associated, if any. In block 114, user feedback pertaining to the one or more action being performed can be provided. By way of example, user feedback can include display, audio, tactile feedback and/or the like.

Figure 6:
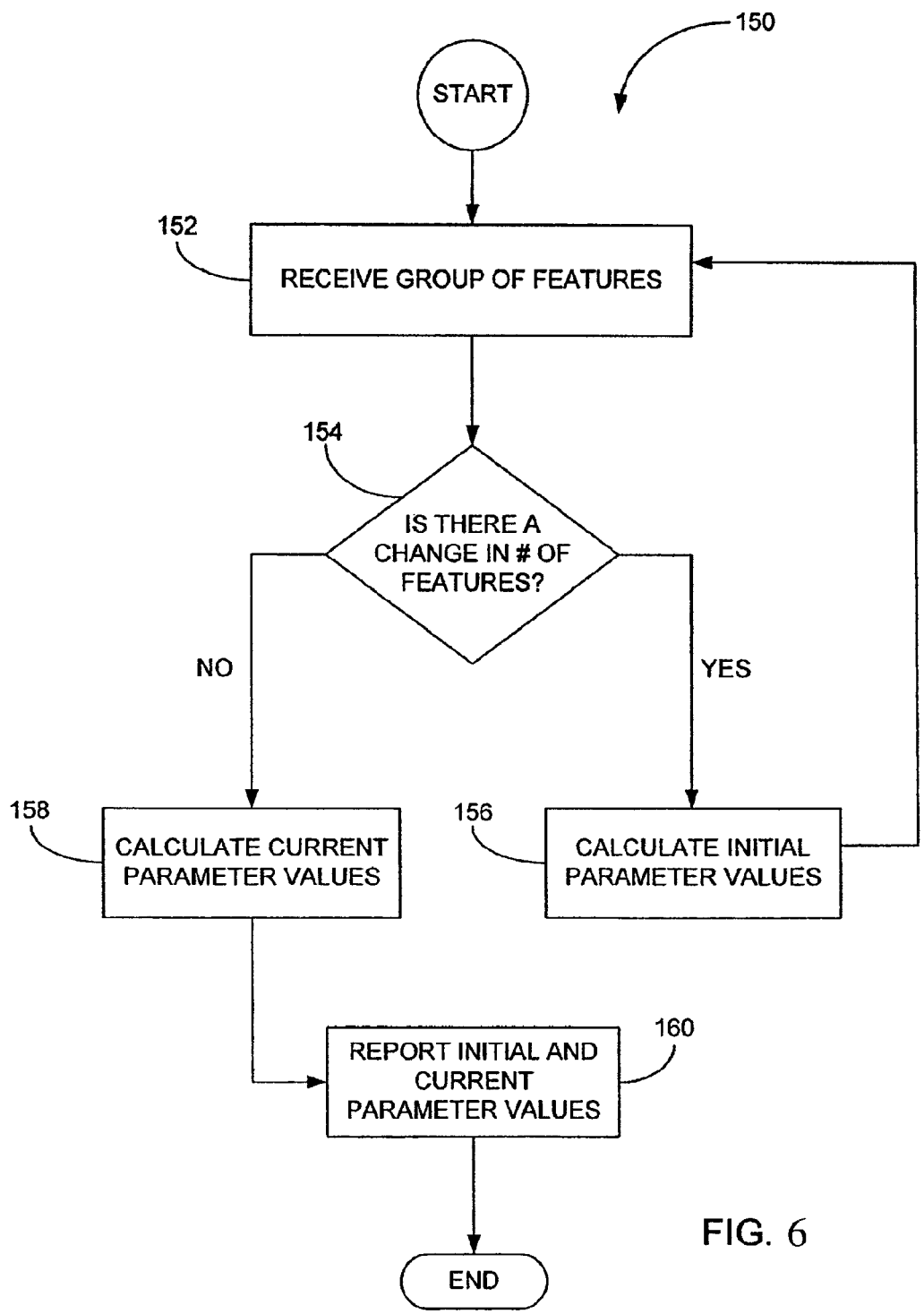
FIG. 6 is a parameter calculation method according to one embodiment of this invention.

FIG. 6 is a parameter calculation method 150, in accordance with one embodiment of the present invention. The parameter calculation method 150 can, for example, correspond to block 108 shown in FIG. 3. The parameter calculation method 150 generally begins at block 152 where a group of features can be received. Following block 152, the parameter calculation method 150 proceeds to block 154 where a determination can be made as to whether or not the number of features in the group of features has changed. For example, the number of features can have changed due to the user picking up or placing an additional finger. Different fingers can be needed to perform different controls (e.g., tracking, gesturing). If the number of features has changed, the parameter calculation method 150 can proceed to block 156 where the initial parameter values can be calculated. If the number stays the same, the parameter calculation method 150 can proceed to block 158 where the current parameter values can be calculated. Thereafter, the parameter calculation method 150 proceeds to block 160 where the initial and current parameter values can be reported. By way of example, the initial parameter values can contain the average initial distance between points (or Distance (AVG) initial) and the current parameter values can contain the average current distance between points (or Distance (AVG) current). These can be compared in subsequent steps in order to control various aspects of a computer system.

The above methods and techniques can be used to implement any number of GUI interface objects and actions. For example, gestures can be created to detect and effect a user command to resize a window, scroll a display, rotate an object, zoom in or out of a displayed view, delete or insert text or other objects, etc.

Figure 7A:
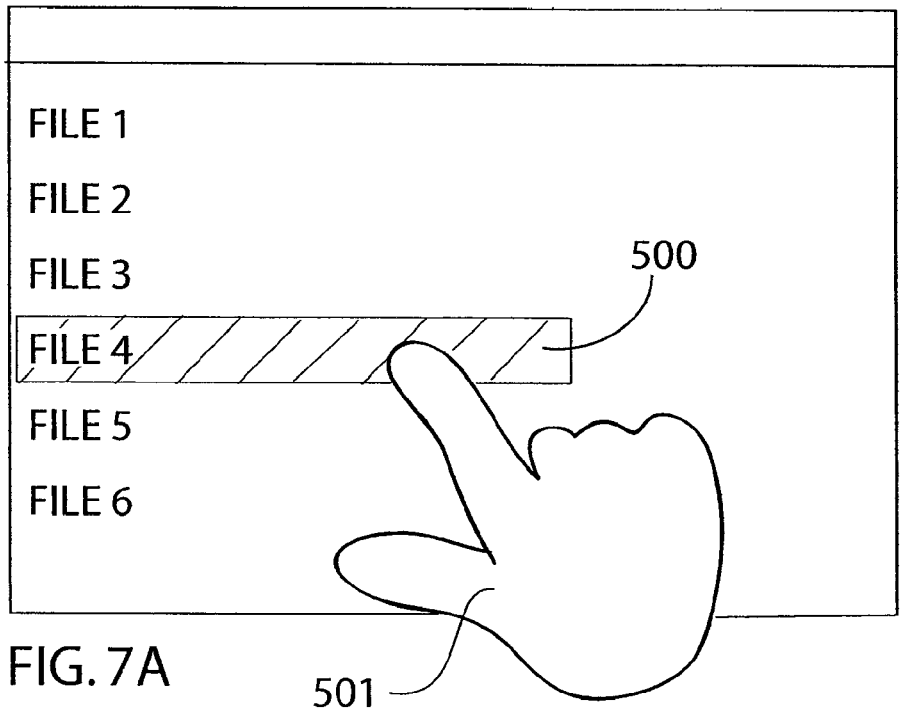
FIGS. 7a-7e and 7i-7k illustrate various gestures for performing targeting and/or selecting tasks according to one embodiment of this invention.
Figure 7B:
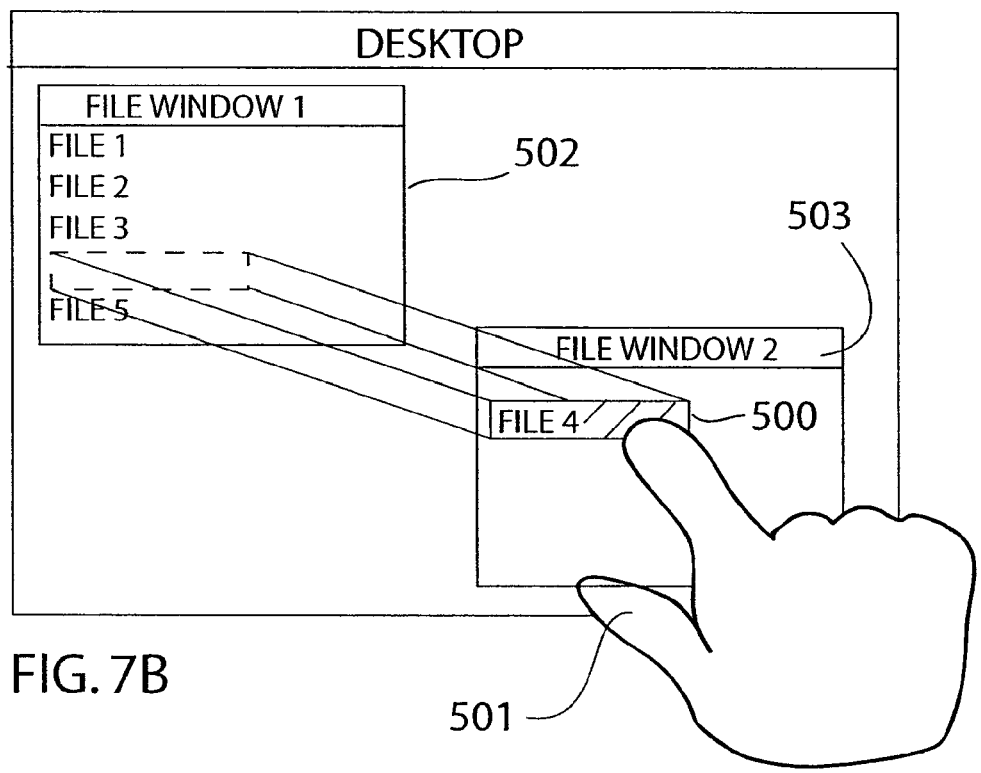
Figure 7C:
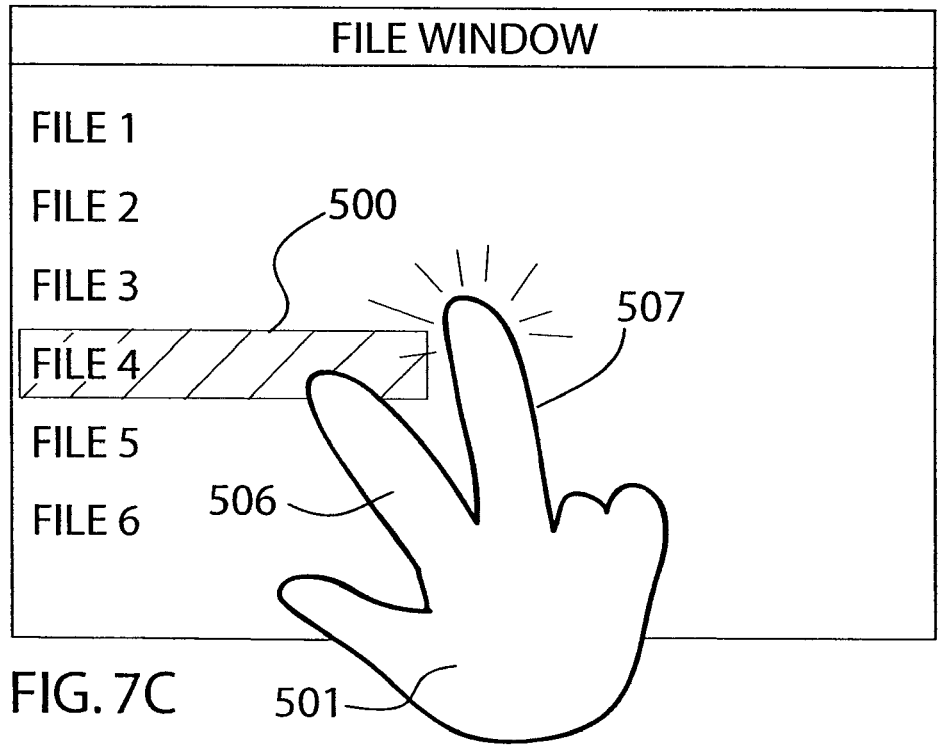
Figure 7D:
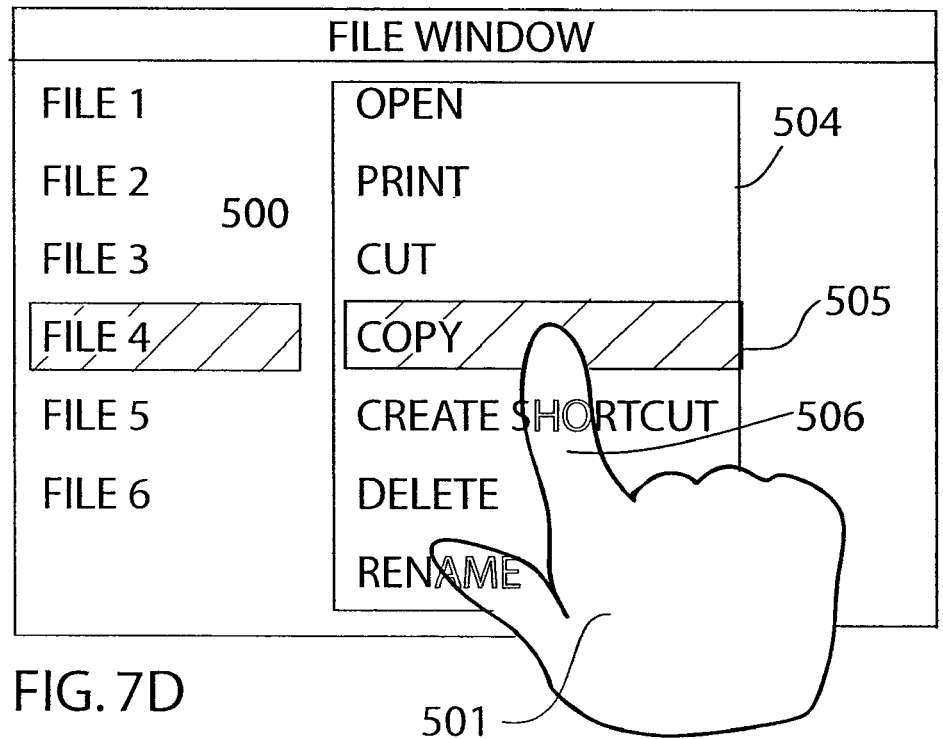
Figure 7E:
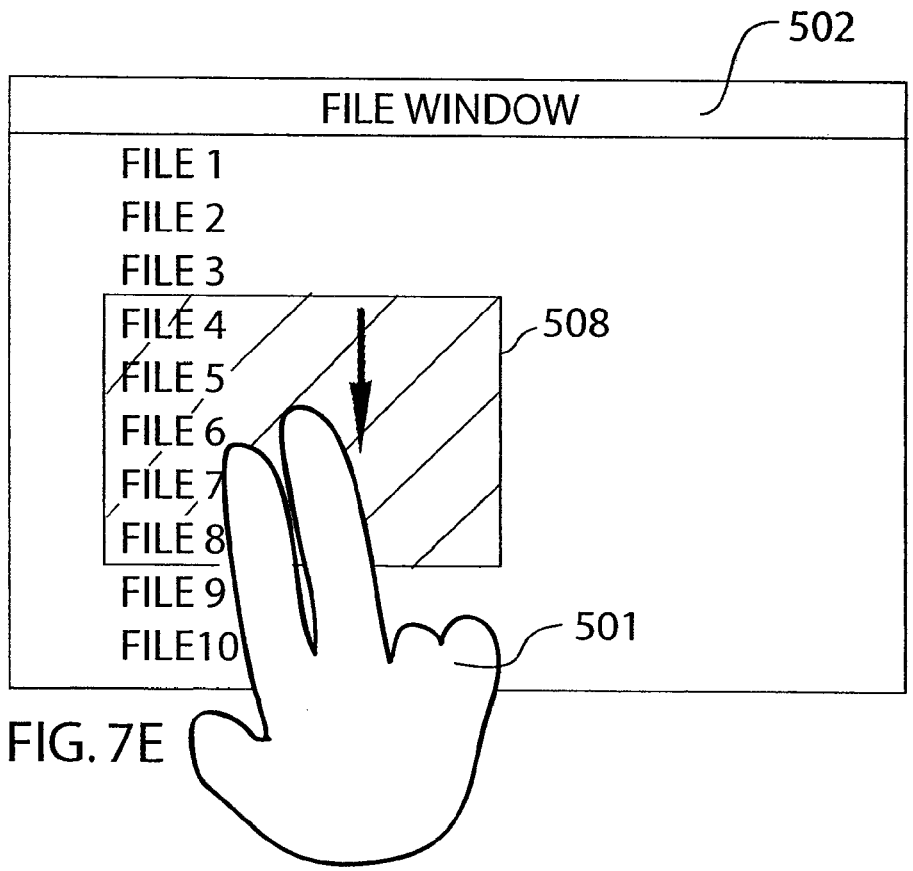

A basic category of gestures can allow a user to input the common commands that can be inputted through the use of a conventional mouse or trackball instrument. FIG. 7F shows a flow chart for processing the detection of mouse-click actions. Starting with block 710, detection can be made of either one or two touches by fingers. If the touch detected is determined 711 to be one finger, then a determination 712 can be made as to whether the touch is in a predetermined proximity of a displayed image object that is associated with a selectable file object, and if so, then a selection action can be made 714. If a double tap action is detected 716 in association with a selectable object, then a double-click action can be invoked 718. A double tap action can be determined by the detection of a finger leaving the touch screen and immediately retouching the touch screen twice. In accordance with an alternative embodiment, a double-click action can also be invoked if it is detected that a finger touch on a selected object remains for more than a predetermined period of time.

Figure 7G:
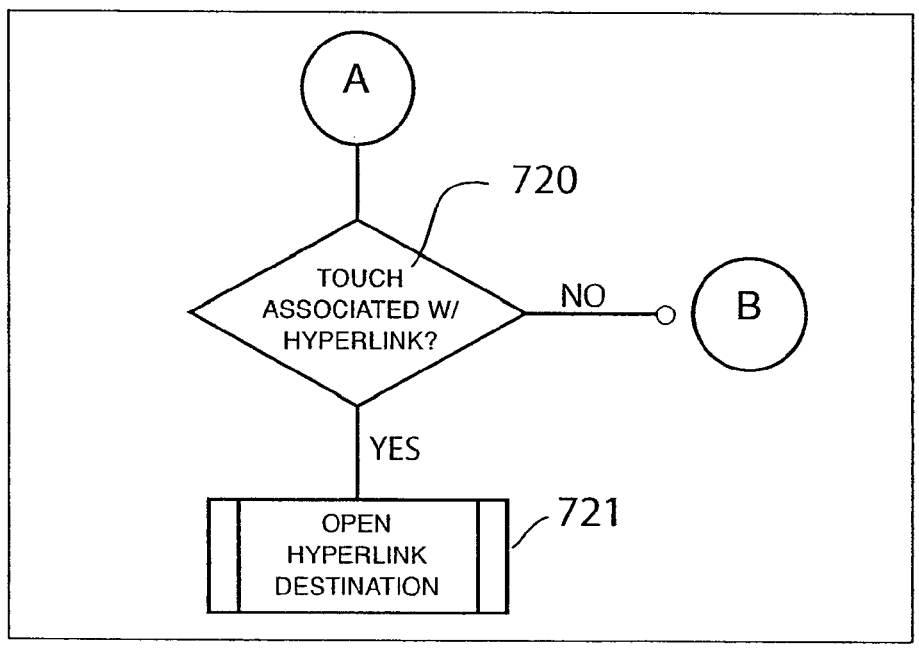
FIGS. 7f-7h show a diagram of a method for recognizing and implementing gestural inputs of FIGS. 7a-7e.
Figure 7F:
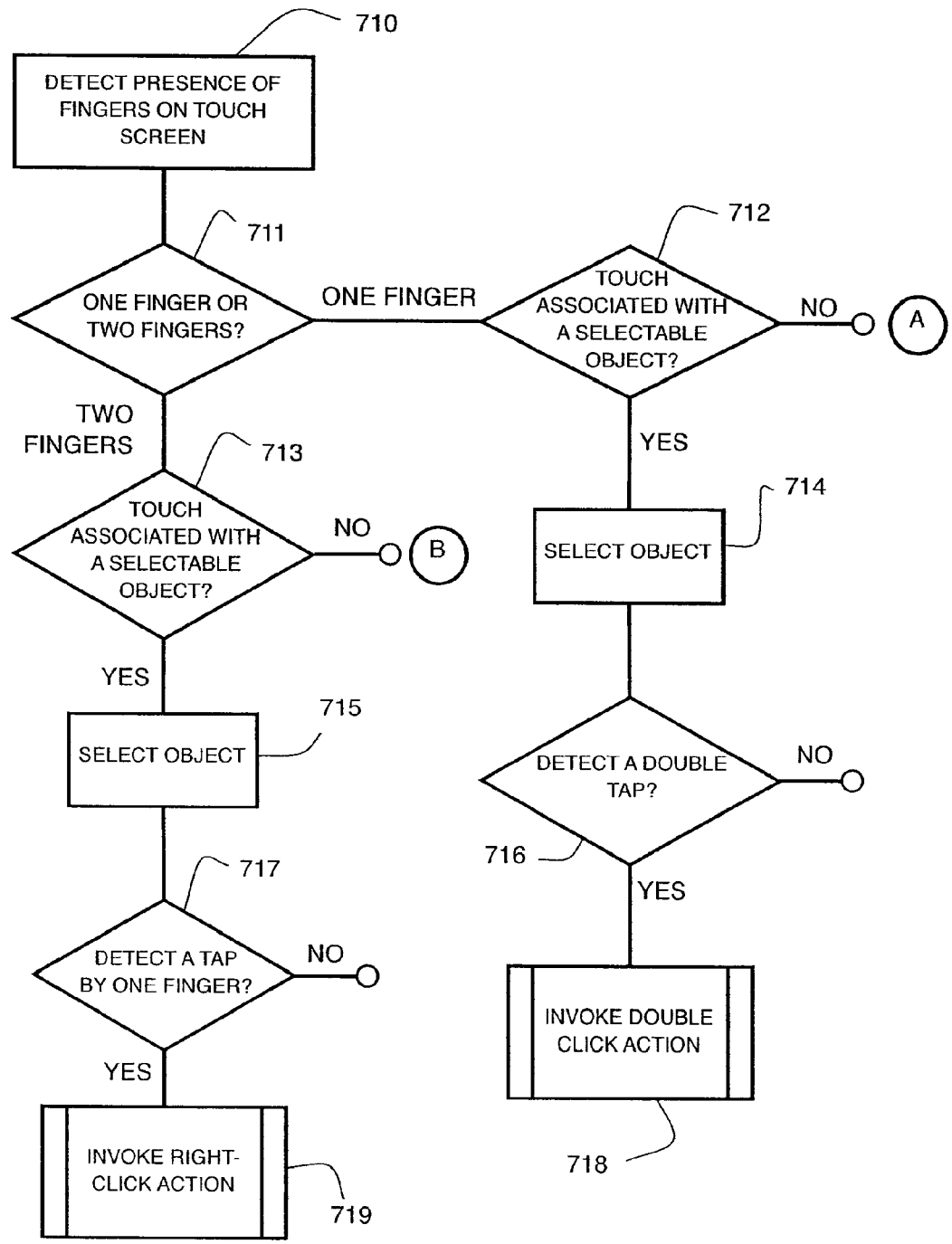

As shown in FIG. 7G, if the one finger touch detected is not associated with a selectable file object, but rather is determined 720 to be associated with a network address hyperlink, then a single-click action can be invoked whereby the hyperlink is activated. If the hyperlink was touched within a non-browser environment, then a browser application would also be launched.

If a two finger touch is detected 711, then if at least one of the touchdown point is associated with a selectable file object 713, then a selection 715 can be made of the object. If one or more tap by one of the fingers on the touch sensitive display is detected 717 while the touchdown point is maintained, then a right-click mouse action can be invoked.

Figure 7H:
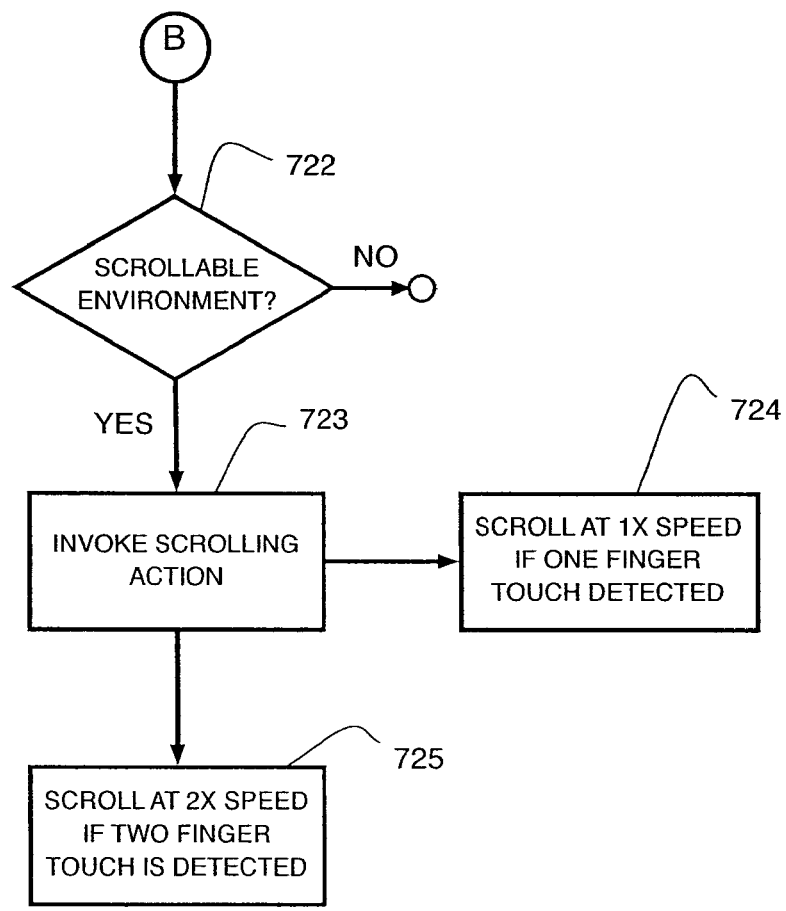

In accordance with a preferred embodiment, if a touch or touches detected are not associated with any selectable file object or hyperlinks, then as shown in FIG. 7H, a determination 722 can be made as to whether the touchdown point(s) is/are associated with a scrollable area, such as text editing application window, a file listing window, or an Internet webpage.

Scrolling generally pertains to moving displayed data or images across a viewing area on a display screen so that a new set of data is brought into view in the viewing area. In most cases, once the viewing area is full, each new set of data appears at the edge of the viewing area and all other sets of data move over one position. That is, the new set of data appears for each set of data that moves out of the viewing area. In essence, these functions allow a user to view consecutive sets of data currently outside of the viewing area. In most cases, the user is able to accelerate their traversal through the data sets by moving his or her finger at greater speeds. Examples of scrolling through lists can be found in U.S. Patent Publication Nos. 2003/0076303A1, 2003/0076301A1, 2003/0095096A1, which are herein incorporated by reference.

If the touch down point(s) is/are within a scrollable area, then a scrolling action can be invoked 723 similar to the pressing down of a scroll wheel on a conventional mouse instrument. If the scrollable area is scrollable in only one direction (e.g., up and down), then the scrolling action invoked will be unidirectional scroll. If the scrollable area is scrollable two dimensionally, then the scrolling action invoked will be omnidirectional.

In a unidirectional scrolling action where the scrolling is restricted to the vertical direction (i.e., the Y axis), only the vertical vector component of the tracked touch movement can be used as input for effecting vertical scrolling. Similarly, in a unidirectional scrolling action where the scrolling is restricted to the horizontal direction (i.e., the X axis), only the horizontal vector component of the tracked touch movement can be used as input for effecting horizontal scrolling. If the scrolling action is omnidirectional, then the scrolling action effected can track the movement of the tracked touch.

If the detected touch is a one finger touch, then the scrolling action is ready to be performed 724 at a normal, or 1×, speed. If and once the touched down finger begins to move on the touch screen, then a scroll action can be performed by tracking the movement of the touchdown point on the touch screen. If the detected touch is a two finger touch, then the scrolling action can be performed 725 at a double, or 2× speed. Additional fingers can be added to perform even faster scrolling action, where a detection of a four finger touch can be translated into "pg up" or "pg dn" commands within a multi-page document window.

In accordance with another embodiment, the displayed data can continue to move even when the finger is removed from the touch screen. The continuous motion can be based at least in part on the previous motion. For example the scrolling can be continued in the same direction and speed. In some cases, the scrolling slow down over time, i.e., the speed of the traversal through the media items can get slower and slower until the scrolling eventually stops, thereby leaving a static list. By way of example, each new media item brought into the viewing area can incrementally decrease the speed. Alternatively or additionally, the displayed data can stop moving when the finger is placed back on the touch screen. That is, the placement of the finger back on the touch screen can implement braking, which can stop or slow down the continuous acting motion.

By way of examples to illustrate the above discussed gestural actions, as shown in FIG. 7A, using a touch screen (such as the multi-touch screen 24 shown in FIG. 2), a single finger tap with a finger 501 on an image object (e.g., a file listing 500) can be translated into the equivalent of a single click of a mouse, which in this instance can indicate a selection, which is typically indicated by highlighting of the selected file or image object. A detected double tap on the image object can be translated into the equivalent of a double click of a mouse, which can invoke a launch of an application associated with the image object tapped. For instance, a double tapping of a file listing on a screen, such as a photo file, can cause the launch of a photo viewer application and the opening of that photo file.

Drag-and-drop function can be invoked by touching, with at least one finger, the image associated with the object to be dropped and graphically dragging the object to the desired drop location by maintaining the touch, such as shown in FIG. 7B, illustrating a drag and drop of a file listing 501 from folder window 502 to folder window 503.

Certain mouse functionalities can require two touches to complete. For instance, as shown in FIG. 7C, a "right click" gesture can be invoked by two fingers, with one finger as the touchdown finger 506 and a second finger 507 tapping the screen at least once to indicate a right click action. FIG. 7D illustrates that, after a right click action is performed, an action window 504 can be invoked, after which the first finger can move over to the invoked window 504 to select and tap an action item 505 with a single finger 506. In accordance with one embodiment of the invention, a right click action can be effected only if the tapping detected is located in close proximity of the detected touchdown, and only if the tapping detected is located to the left of the touchdown finger (right of the touchdown finger from the user's point of view).

Other file selection functions that can normally require a combination of mouse and keyboard action can be performed using only touch action. For instance, in the Microsoft Windows environment, in to select multiple files within file window 502, a user typically needs to hold down the shift button while dragging the mouse icon over the sequential files to be selected. Without holding down the shift button, the dragging of the mouse icon can be interpreted as a drag and drop action. As shown in FIG. 7E, in accordance with an embodiment of the present invention, a detection of two closely associated touch drag of a file listings can be read as a multi-selection action for selecting a group of files 508. In order to avoid misinterpreting the two-touch action as another command, such as a rotating action, the two-touch multi-selection function can be invoked only if the two touches detected are in relative close proximity to each other.

Figure 7I:
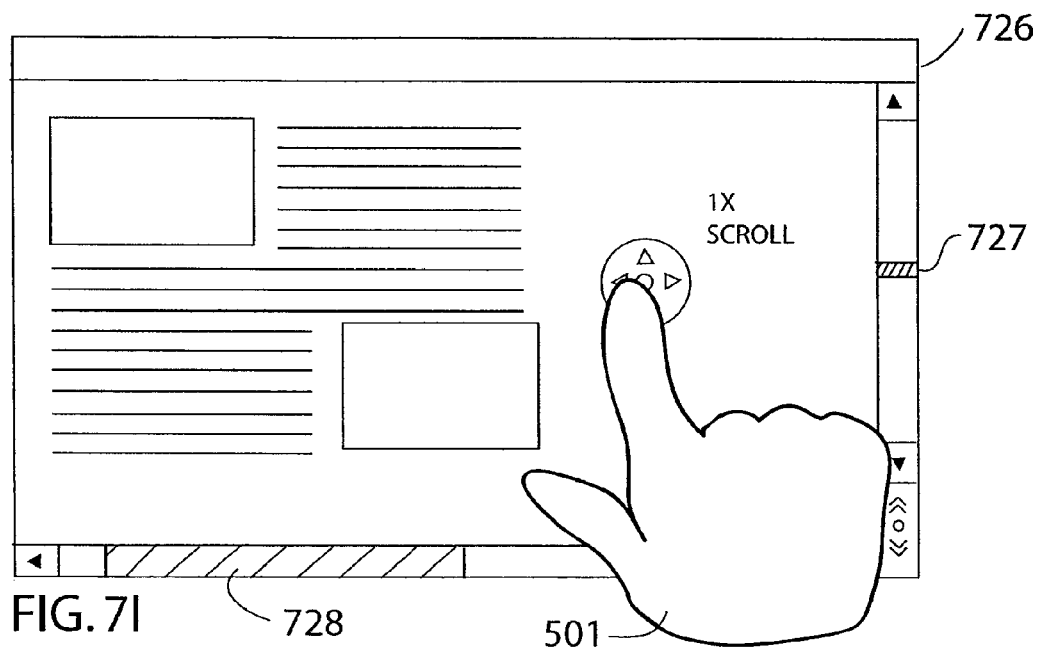
Figure 7J:
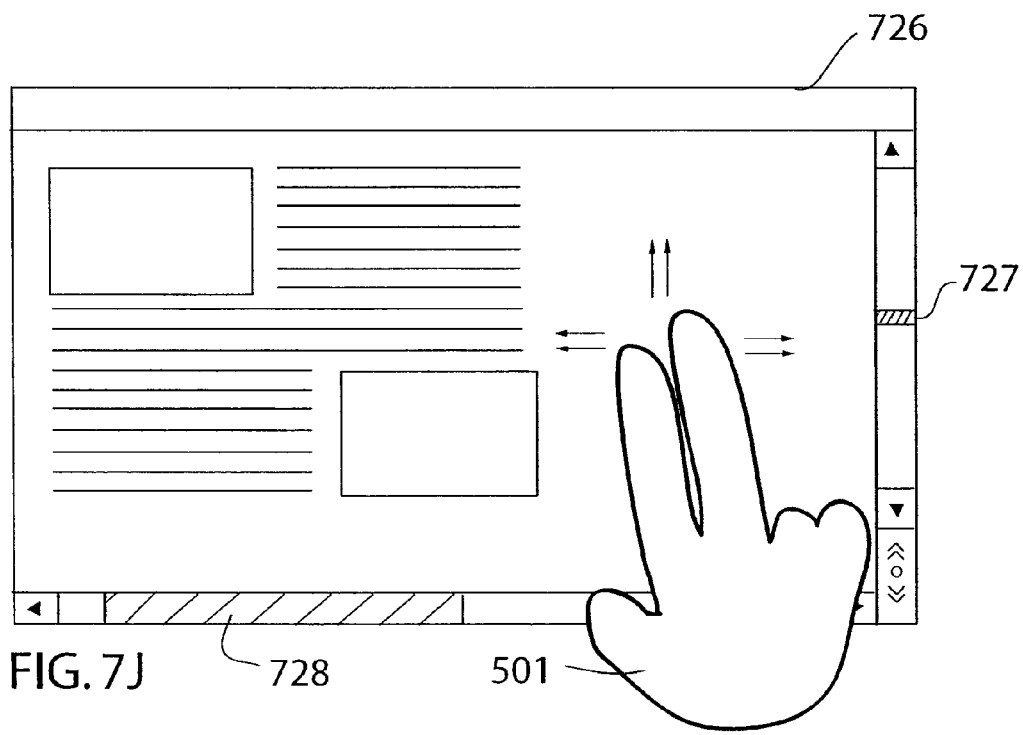

Referring to the scrolling actions described in FIG. 7H, and as shown in FIGS. 7I and 7J, a one or two finger touchdown within a scrollable window can cause the displayed content of the window to scroll at different speeds. Specifically, once a scrolling action is invoked 723, the scrolling takes place at 1× speed 724 if it is determined that only one finger (or one touchdown point) is detected on the touch sensitive display, and at 2× speed if two fingers (or two touchdown points) are detected. In accordance with a preferred embodiment, during the scroll action, scroll bars 727 and 728 can move in correspondence to the direction of the scrolls.

Finally, using a multi-touch display that is capable of proximity detection, such as the panels described in the aforementioned and incorporated by reference commonly assigned co-pending U.S. application Ser. No. 10/840,862 (published as U.S. Patent Publication No. US2006/0097991) and an application entitled "Proximity and Multi-Touch Sensor Detection and Demodulation,"filed on Jan. 3, 2007, gestures of a finger can also be used to invoke hovering action that is can be the equivalent of hovering a mouse icon over an image object.

Figure 7K:
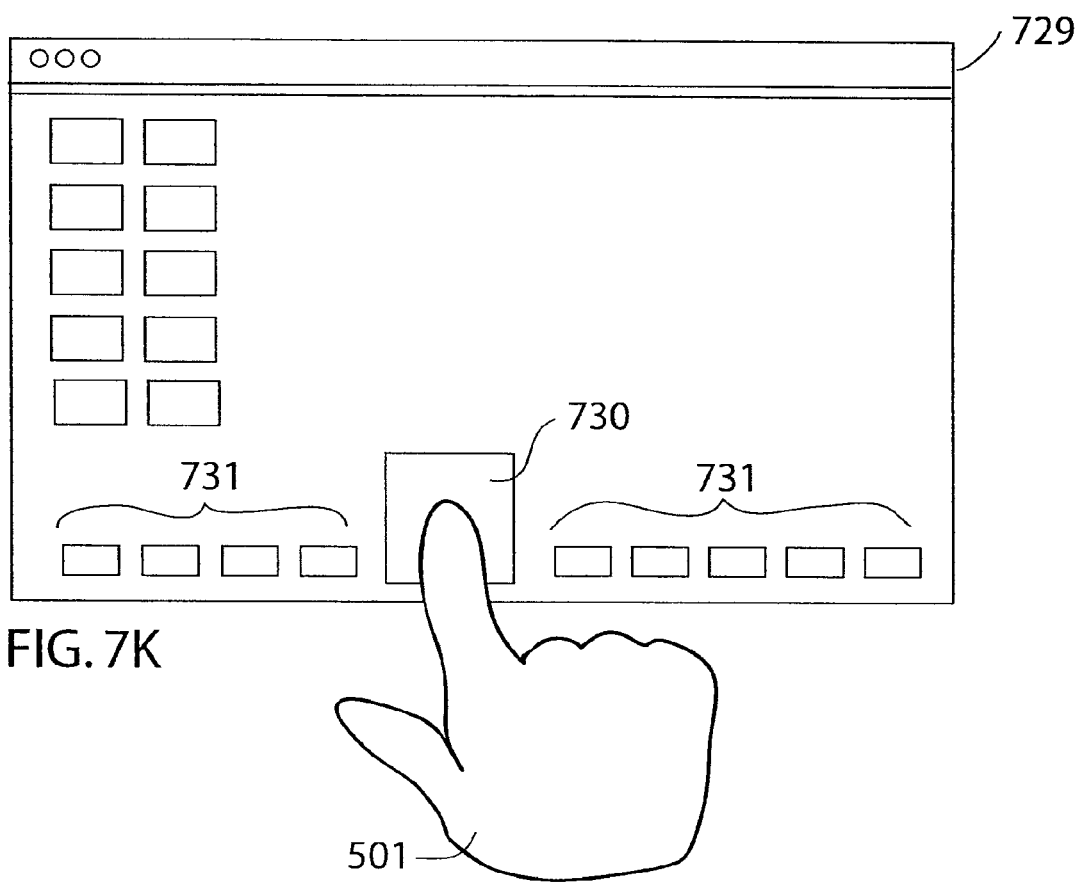

By way of an example, referring to FIG. 7K, the detection of proximity of a user's finger 501 over application icons 731 within a desktop 729 can be interpreted as a hovering action, which can invoke the rolling popup of the hovered application icon 730. If the user touches the popped up icon, then a double-click action can be invoked whereby the application can be launched. Similar concepts can be applied application specific situations, such as when photo files are displayed in a thumbnail format within a photo management software, and a detection of proximity of a finger over a thumbnail invokes a hover action whereby the size of the hovered photo thumbnail can be enlarged (but not selected).

Gestures can also be used to invoke and manipulate virtual control interfaces, such as volume knobs, switches, sliders, keyboards, and other virtual interfaces that can be created to facilitate human interaction with a computing system or a consumer electronic item. By way of an example, using a gesture to invoke a virtual control interface, and referring to FIGS. 8A-8H, a rotate gesture for controlling a virtual volume knob 170 on a GUI interface 172 of a display 174 of a tablet PC 175 will be described. In order to actuate the knob 170, the user places their fingers 176 on a multipoint touch screen 178. The virtual control knob can already be displayed, or the particular number, orientation or profile of the fingers at set down, or the movement of the fingers immediately thereafter, or some combination of these and other characteristics of the user's interaction can invoke the virtual control knob to be displayed. In either case, the computing system can associate a finger group to the virtual control knob and can make a determination that the user intends to use the virtual volume knob.

This association can also be based in part on the mode or current state of the computing device at the time of the input. For example, the same gesture can be interpreted alternatively as a volume knob gesture if a song is currently playing on the computing device, or as a rotate command if an object editing application is being executed. Other user feedback can be provided, including for example audible or tactile feedback.

Figure 8A:
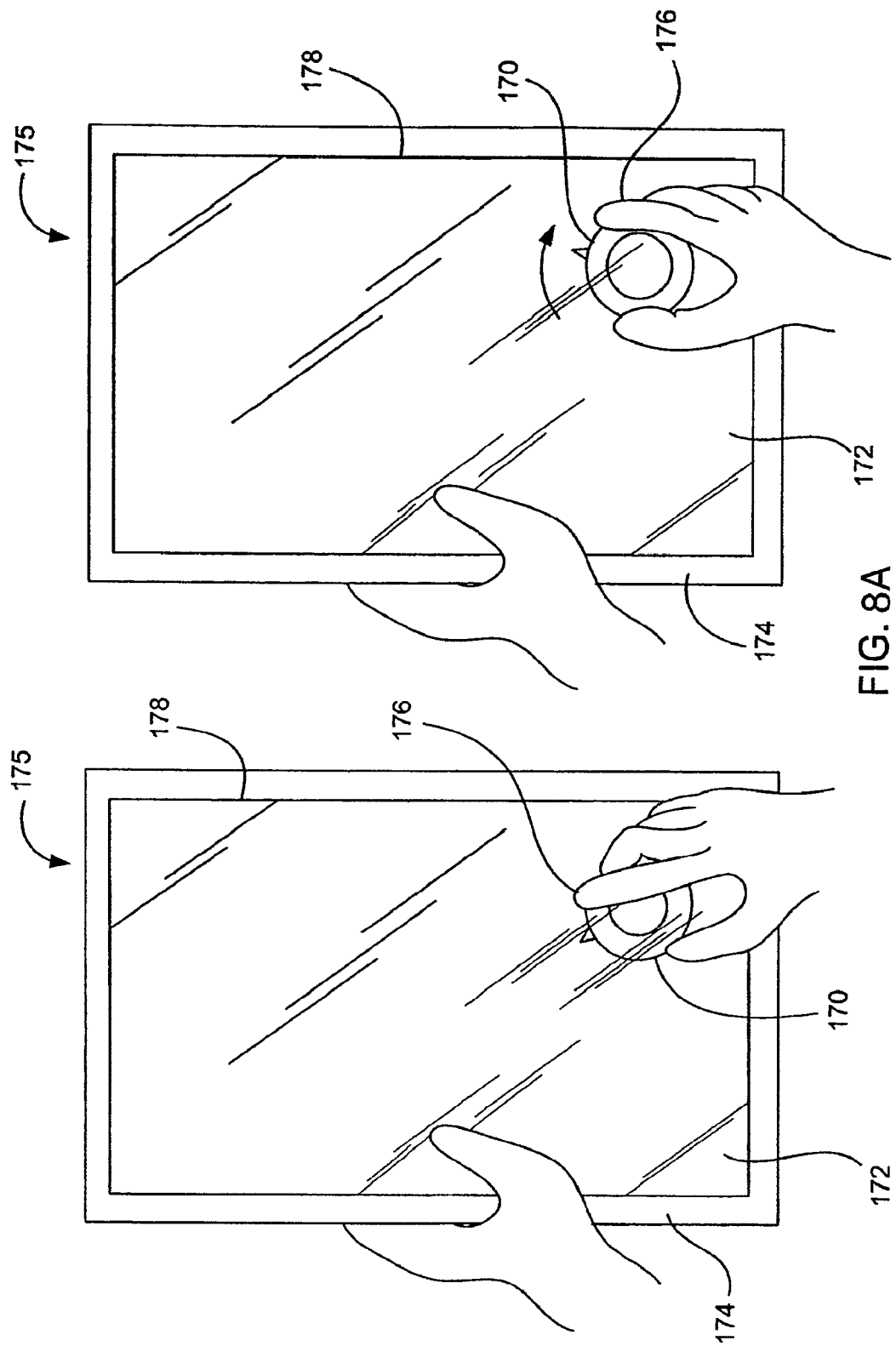

Once the knob 170 is displayed as shown in FIG. 8A, the user's fingers 176 can be positioned around the knob 170 similar to if it were an actual knob or dial, and thereafter can be rotated around the knob 170 in order to simulate turning the knob 170. Again, audible feedback in the form of a clicking sound or tactile feedback in the form of vibration, for example, can be provided as the knob 170 is "rotated." The user can also use their other hand to hold the tablet PC 175.

As shown in FIG. 8B, the multipoint touch screen 178 can detect at least a pair of images. In particular, a first image 180 can be created at set down, and at least one other image 182 can be created when the fingers 176 are rotated. Although only two images are shown, in most cases there canca be many more images that incrementally occur between these two images. Each image can represent a profile of the fingers in contact with the touch screen at a particular instant in time. These images can also be referred to as touch images. It will be understood that the term "image" does not mean that the profile is displayed on the screen 178 (but rather imaged by the touch sensing device). It should also be noted that although the term "image" is used, the data can be in other forms representative of the touch plane at various times.

As shown in FIG. 8C, each of the images 180 and 182 can be converted to a collection of features 184. Each feature 184 can be associated with a particular touch as for example from the tips each of the fingers 176 surrounding the knob 170 as well as the thumb of the other hand 177 used to hold the tablet PC 175.

As shown in FIG. 8D, the features 184 can be classified, i.e., each finger/thumb can be identified, and grouped for each of the images 180 and 182. In this particular case, the features 184A associated with the knob 170 can be grouped together to form group 188 and the feature 184B associated with the thumb is filtered out. In alternative arrangements, the thumb feature 184B can be treated as a separate feature by itself (or in another group), for example, to alter the input or operational mode of the system or to implement another gesture, for example, a slider gesture associated with an equalizer slider displayed on the screen in the area of the thumb (or other finger).

As shown in FIG. 8E, the key parameters of the feature group 188 can be calculated for each image 180 and 182. The key parameters associated with the first image 180 represent the initial state and the key parameters of the second image 182 represent the current state.

Also as shown in FIG. 8E, the knob 170 can be the UI element associated with the feature group 188 because of its proximity to the knob 170. Thereafter, as shown in FIG. 8F, the key parameter values of the feature group 188 from each image 180 and 182 can be compared to determine the rotation vector, i.e., the group of features rotated five (5) degrees clockwise from the initial to current state. In FIG. 8F, the initial feature group (image 180) is shown in dashed lines while the current feature group (image 182) is shown in solid lines.

Figure 8G:
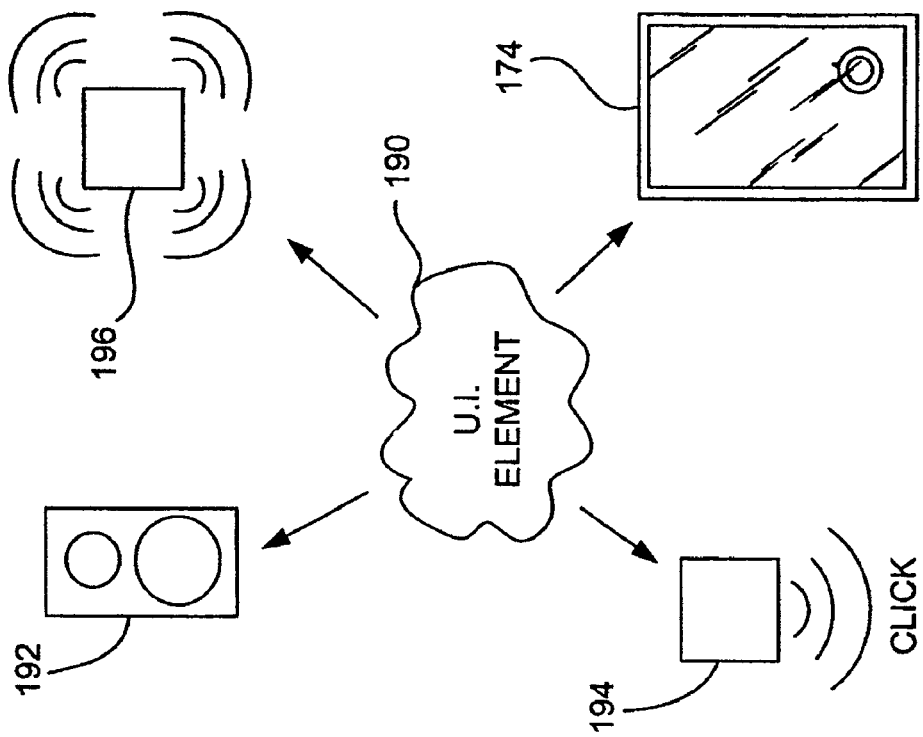
Figure 8F:
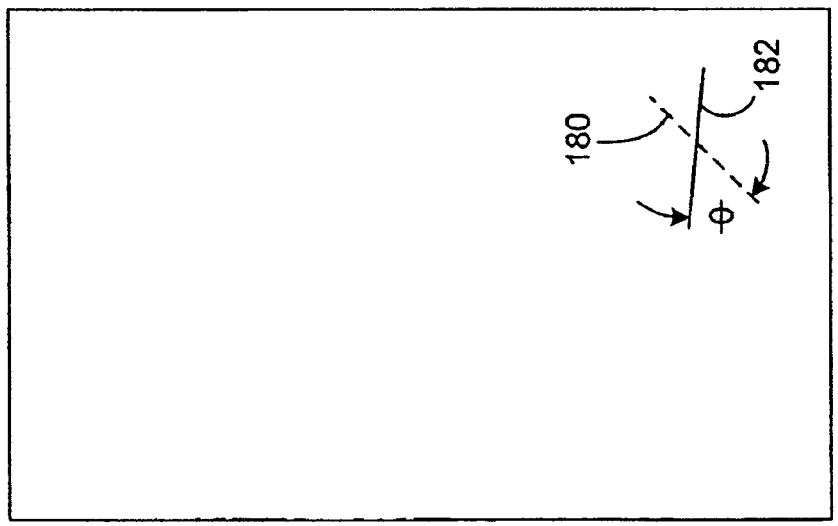

As shown in FIG. 8G, based on the rotation vector, the speaker 192 of the tablet PC 175 increases (or decreases) its output in accordance with the amount of rotation of the fingers 176, e.g., increase the volume by 5% based on rotation of 5 degrees. The display 174 of the tablet PC can also adjust the rotation of the knob 170 in accordance with the amount of rotation of the fingers 176, e.g., the position of the knob 170 rotates five (5) degrees. In most cases, the rotation of the knob can occur simultaneously with the rotation of the fingers, i.e., for every degree of finger rotation the knob can rotate a degree. In essence, the virtual control knob can follow the gesture occurring on the screen. Still further, an audio unit 194 of the tablet PC can provide a clicking sound for each unit of rotation, e.g., provide five clicks based on rotation of five degrees. Still yet further, a haptics unit 196 of the tablet PC 175 can provide a certain amount of vibration or other tactile feedback for each click thereby simulating an actual knob.

It should be noted that additional gestures can be performed simultaneously with the virtual control knob gesture. For example, more than one virtual control knob can be controlled at the same time using both hands, i.e., one hand for each virtual control knob. Alternatively or additionally, one or more slider bars can be controlled at the same time as the virtual control knob, i.e., one hand operates the virtual control knob, while at least one finger and maybe more than one finger of the opposite hand can operate at least one slider and maybe more than one slider bar, e.g., slider bar for each finger.

It should also be noted that although the described embodiment utilizes a virtual control knob, in another embodiment, the UI element can be a virtual scroll wheel. As an example, the virtual scroll wheel can mimic an actual scroll wheel such as those described in U.S. Patent Publication Nos. US2003/0076303A1, US2003/0076301A1, and US2003/0095096A1, all of which are herein incorporated by reference.

Figure 9:
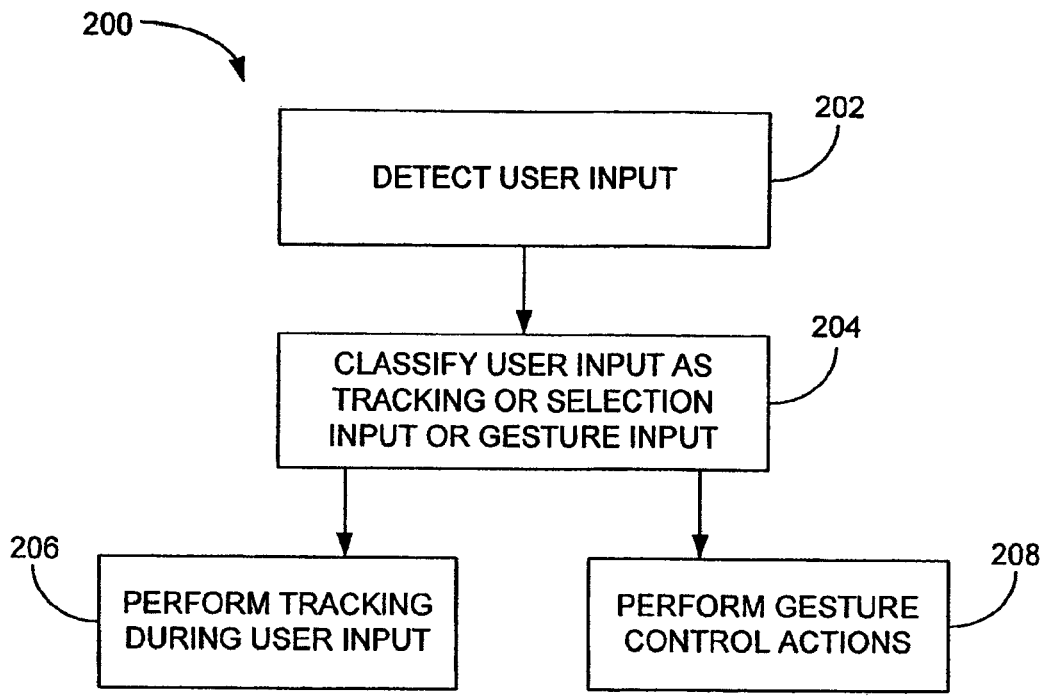
FIG. 9 is a diagram of a touch-based method according to one embodiment of this invention.

FIG. 9 is a diagram of a touch-based method 200 in accordance with one embodiment of the present invention. The method generally begins at block 202 where a user input that occurs over a multipoint sensing device is detected. The user input can include one or more touch inputs, with each touch input having a unique identifier. Following block 202, the touch-based method 200 proceeds to block 204 where the user input can be classified as a tracking or selection input when the user input can include a single unique identifier (one touch input), or can be classified as a gesture input when the user input can include at least two unique identifiers (more than one touch input). If the user input is classified as a tracking input, the touch-based method 200 proceeds to block 206 where tracking can be performed corresponding to the user input.

If the user input is classified as a gesture input, the touch-based method 200 proceeds to block 208 where one or more gesture control actions can be performed corresponding to the user input. The gesture control actions can be based at least in part on changes that occur with or between the at least two unique identifiers.

Figure 10:
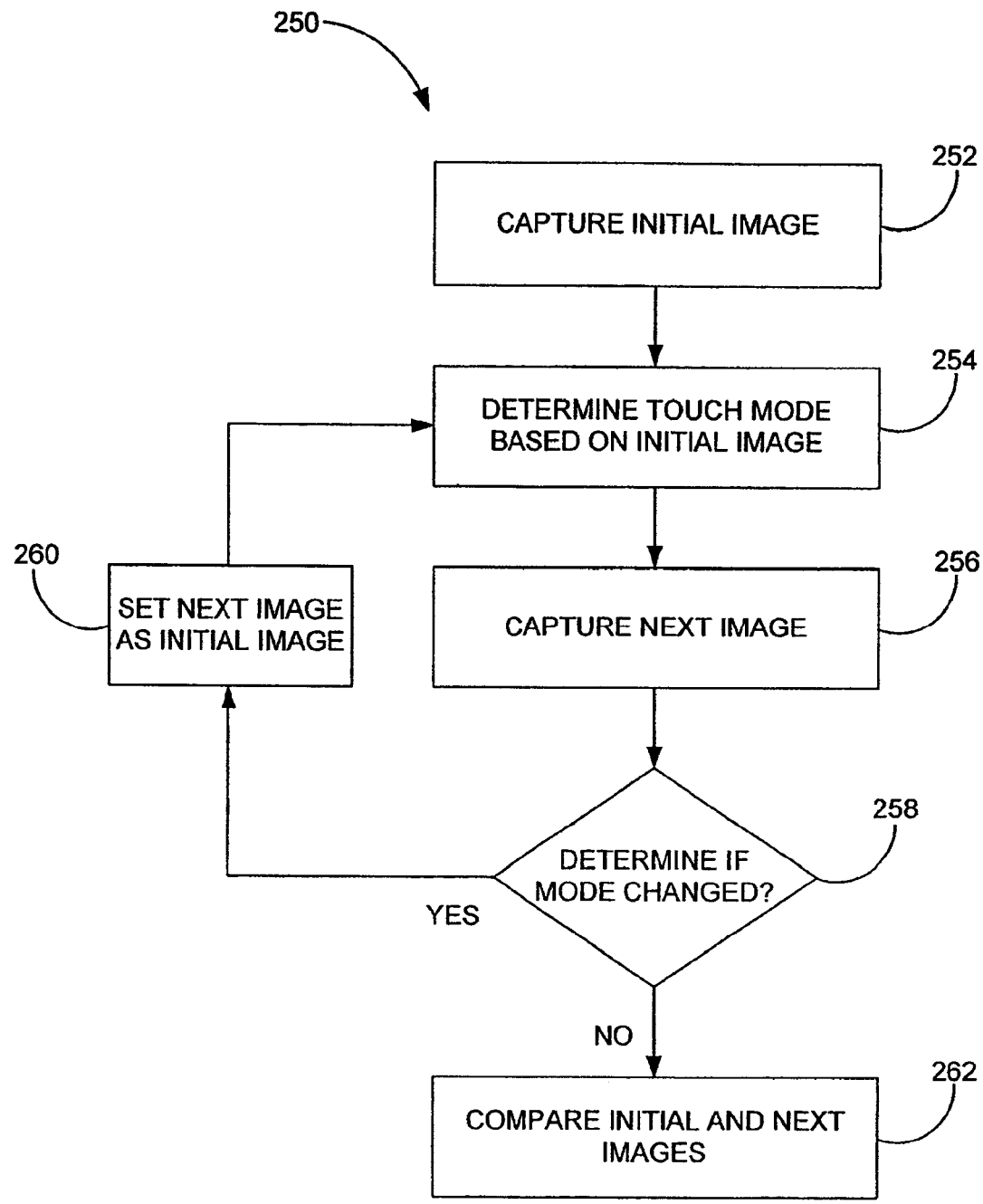
FIG. 10 is a diagram of a touch-based method according to one embodiment of this invention.

FIG. 10 is a diagram of a touch-based method 250 in accordance with one embodiment of the present invention. The touch-based method 250 generally begins at block 252 where an initial image can be captured during an input stroke on a touch sensitive surface. Following block 252, the touch-based method 250 proceeds to block 254 where the touch mode can be determined based on the initial image. For example, if the initial image includes a single unique identifier then the touch mode can correspond to a tracking or selection mode. On the other hand, if the image includes more than one unique identifier, then the touch mode can correspond to a gesture mode.

Following block 254, the touch-based method 250 proceeds to block 256 where a next image can be captured during the input stroke on the touch sensitive surface. Images can be captured sequentially during the stroke and thus the there can be a plurality of images associated with the stroke.

Following block 256, touch-based method 250 proceeds to block 258 where a determination can be made as to whether the touch mode changed between capture of the initial image and capture of the next image. If the touch mode changed, the touch-based method 250 proceeds to block 260 where the next image can be set as the initial image and thereafter the touch mode can again be determined at block 254 based on the new initial image. If the touch mode stayed the same, the touch-based method 250 proceeds to block 262 where the initial and next images can be compared and one or more control signals can be generated based on the comparison.

Figure 11:
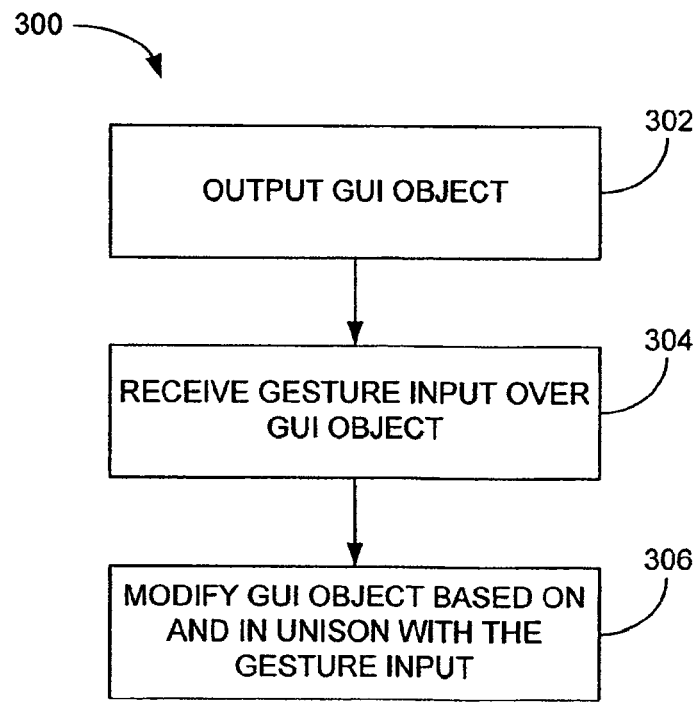
FIG. 11 is a diagram of a touch-based method according to one embodiment of this invention.

FIG. 11 is a diagram of a touch-based method 300 in accordance with one embodiment of the present invention. The touch-based method 300 begins at block 302 where an image object, which can be a GUI object, can be output. For example, a processor can instruct a display to display a particular image object. Following block 302, the touch-based method 300 proceeds to block 304 where a gesture input can be received over the image object. For instance, a user can set or move their fingers in a gestural way on the surface of the touch screen and while over the displayed image object. The gestural input can include one or more single gestures that occur consecutively or multiple gestures that occur simultaneously. Each of the gestures generally can have a particular sequence, motion, or orientation associated therewith. For example, a gesture can include spreading fingers apart or closing fingers together, rotating the fingers, translating the fingers, and/or the like.

Following block 304, the touch-based method 300 proceeds to block 306 where the Image object can be modified based on and in unison with the gesture input. By modified, it is meant that the image object can change according to the particular gesture or gestures being performed. By in unison, it is meant that the changes can occur approximately while the gesture or gestures are being performed. In most cases, there is a one to one relationship between the gesture(s) and the changes occurring at the image object and they occur substantially simultaneously. In essence, the image object follows the motion of the fingers. For example, spreading of the fingers can simultaneously enlarge the object, closing of the fingers can simultaneously reduce the image object, rotating the fingers can simultaneously rotate the object, and translating the fingers can allow simultaneous panning or scrolling of the image object.

In one embodiment, block 306 can include determining which image object is associated with the gesture being performed, and thereafter locking the displayed object to the fingers disposed over it such that the image object changes in accordance with the gestural input. By locking or associating the fingers to the image object, the image object can continuously adjust itself in accordance to what the fingers are doing on the touch screen. Often the determination and locking occurs at set down, i.e., when the finger is positioned on the touch screen.

Figure 12:
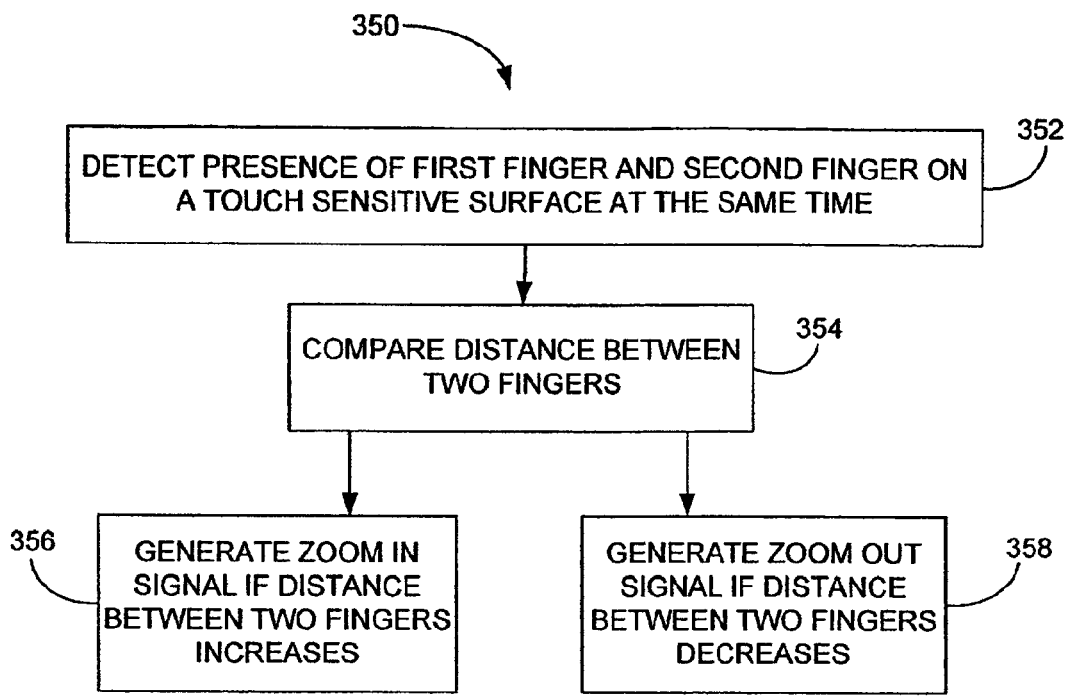
FIG. 12 is a diagram of a zoom gesture method according to one embodiment of this invention.

FIG. 12 is a diagram of a zoom gesture method 350 in accordance with one embodiment of the present invention. The zoom gesture can be performed on a multipoint touch screen such as the multi-touch panel 24 shown in FIG. 2. The zoom gesture method 350 generally begins at block 352 where the presence of at least a first finger and a second finger are detected on a touch sensitive surface at the same time. The presence of at least two fingers can be configured to indicate that the touch is a gestural touch rather than a tracking touch based on one finger. In some cases, the presence of only two fingers indicates that the touch is a gestural touch. In other cases, any number of more than two fingers indicates that the touch is a gestural touch. In fact, the gestural touch can be configured to operate whether two, three, four or more fingers are touching, and even if the numbers change during the gesture, i.e., only need a minimum of two fingers at any time during the gesture.

Following block 352, the zoom gesture method 350 proceeds to block 354 where the distance between at least the two fingers can be compared. The distance can be from finger to finger or from each finger to some other reference point as for example the centroid. If the distance between the two fingers increases (spread apart), a zoom-in signal can be generated as shown in block 356. If the distance between two fingers decreases (close together), a zoom-out signal can be generated as shown in block 358. In most cases, the set down of the fingers will associate or lock the fingers to a particular image object being displayed. For example, the touch sensitive surface can be a touch screen, and the image object can be displayed on the touch screen. This typically occurs when at least one of the fingers is positioned over the image object. As a result, when the fingers are moved apart, the zoom-in signal can be used to increase the size of the embedded features in the image object and when the fingers are pinched together, the zoom-out signal can be used to decrease the size of embedded features in the object. The zooming typically occurs within a predefined boundary such as the periphery of the display, the periphery of a window, the edge of the image object, and/or the like. The embedded features can be formed on a plurality of layers, each of which represents a different level of zoom.

In most cases, the amount of zooming varies according to the distance between the two objects. Furthermore, the zooming typically can occur substantially simultaneously with the motion of the objects. For instance, as the fingers spread apart or closes together, the object zooms in or zooms out at the same time. Although this methodology is directed at zooming, it should be noted that it can also be used for enlarging or reducing. The zoom gesture method 350 can be particularly useful in graphical programs such as publishing, photo, and drawing programs. Moreover, zooming can be used to control a peripheral device such as a camera, i.e., when the finger is spread apart, the camera zooms out, and when the fingers are closed the camera zooms in.

Figure 13A:
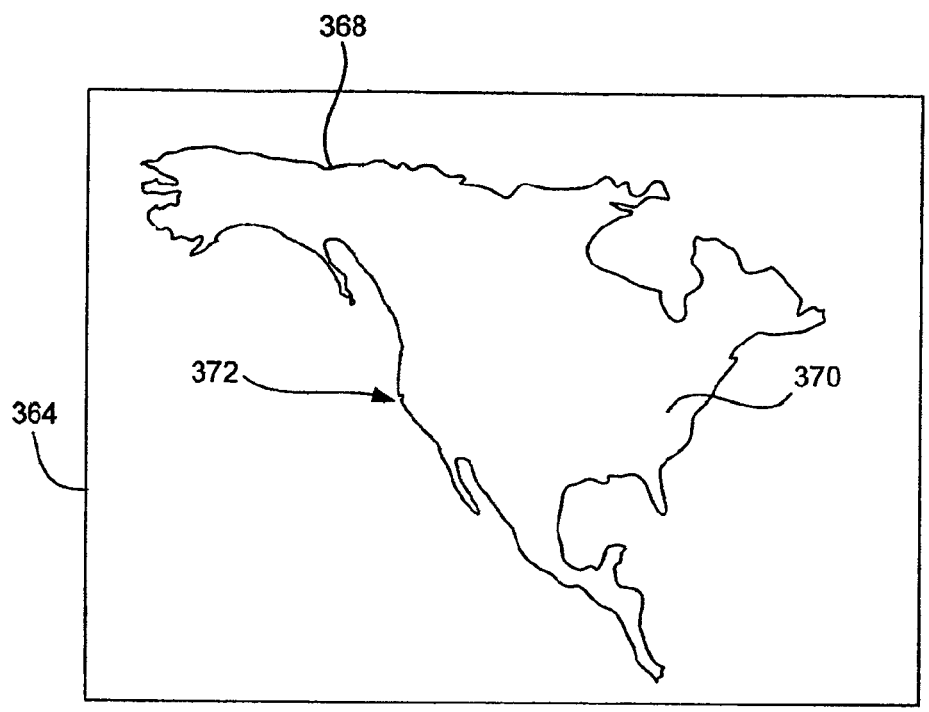
FIGS. 13a-13h illustrates a zooming sequence according to one embodiment of this invention.
Figure 13B:
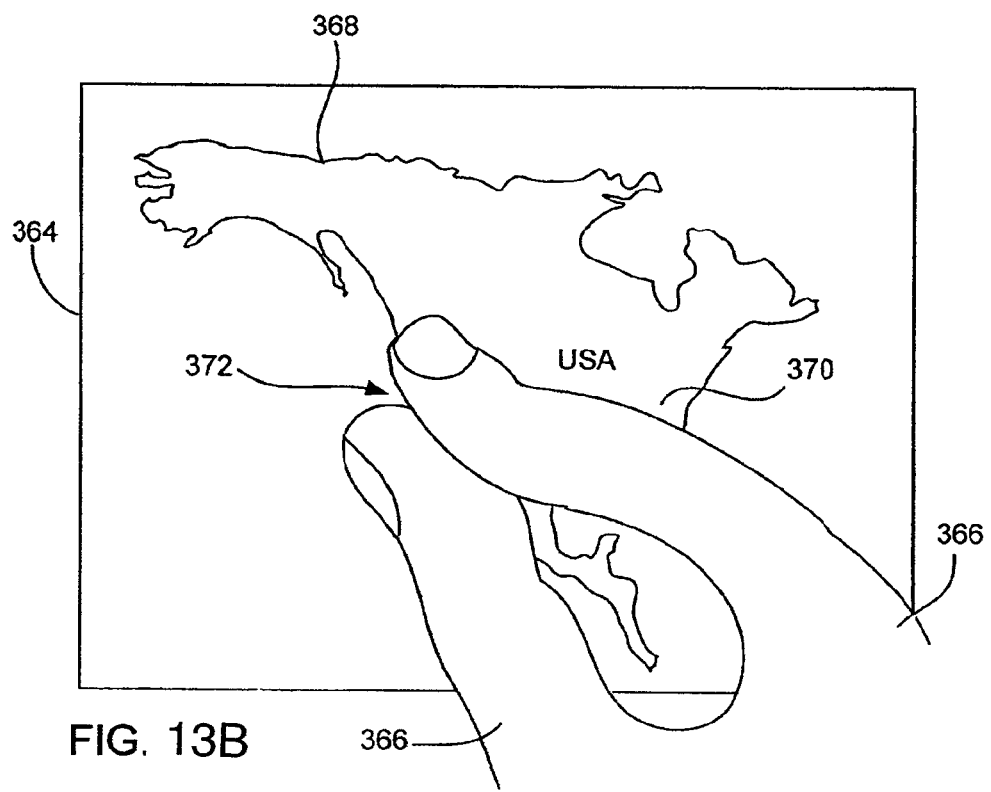
Figure 13C:
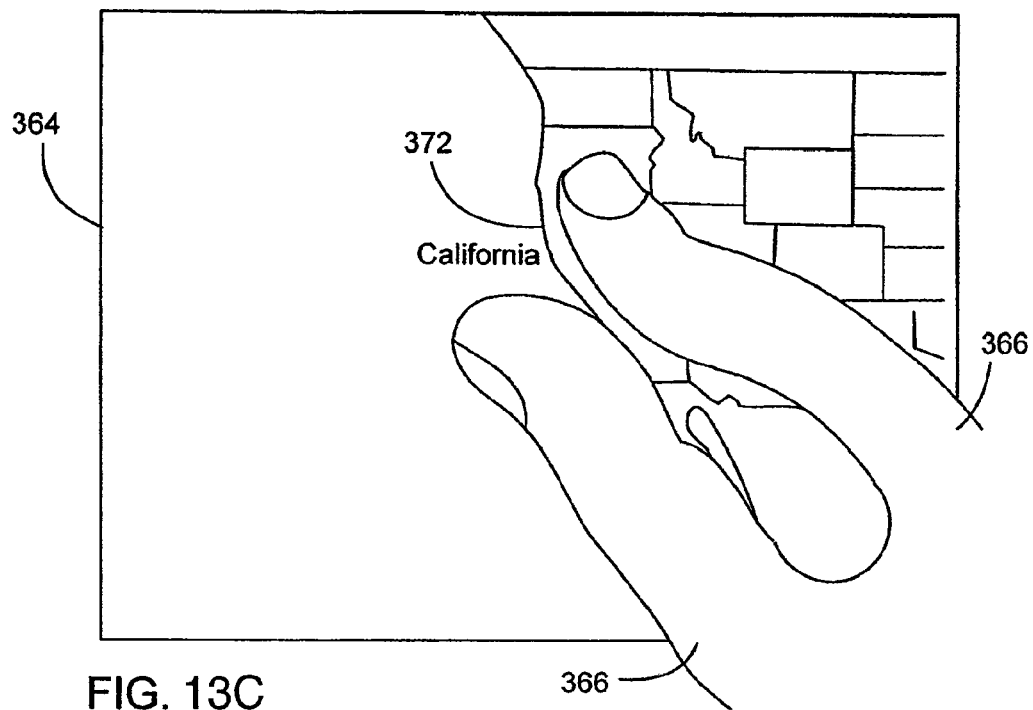
Figure 13D:
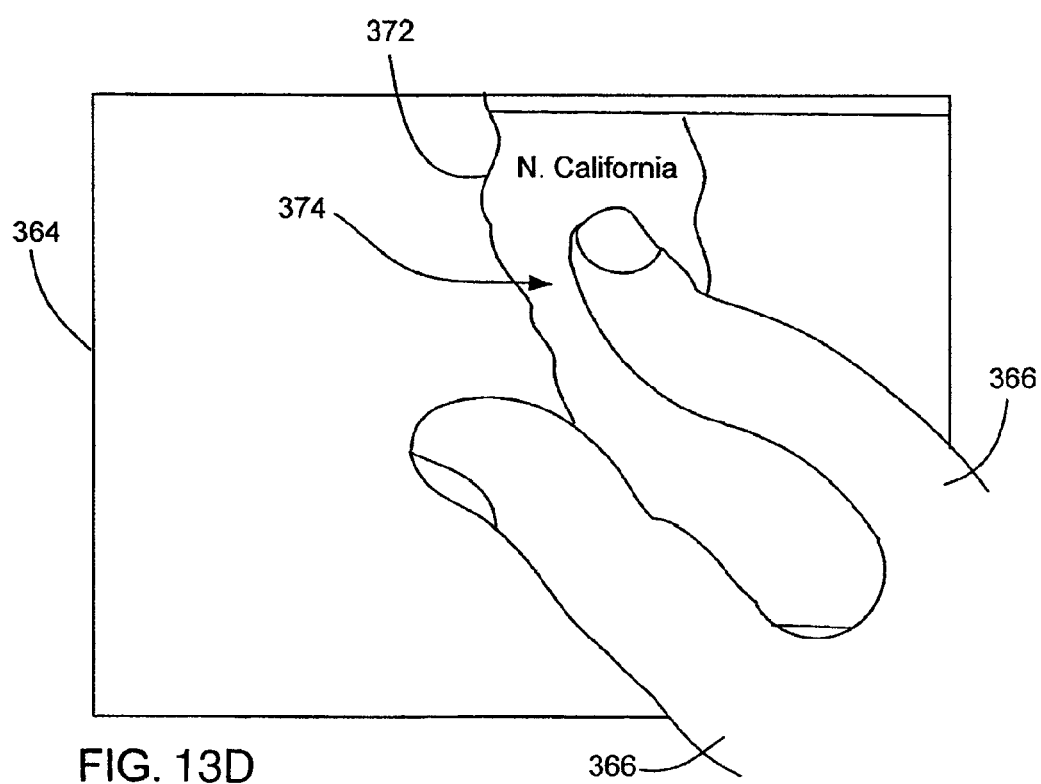
Figure 13E:
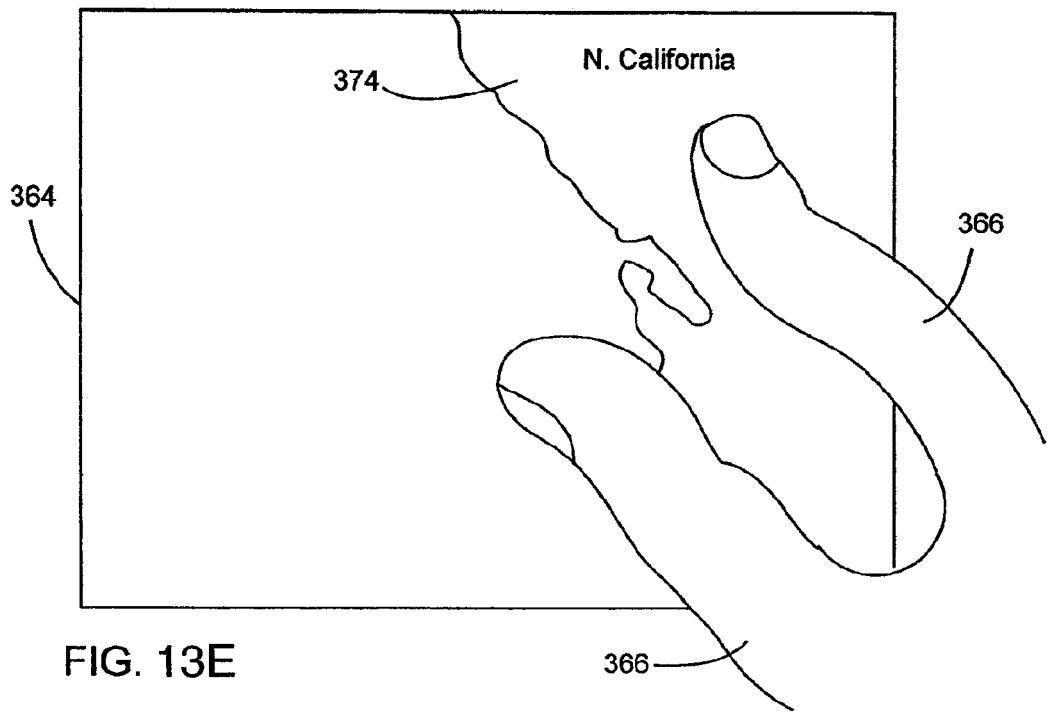
Figure 13F:
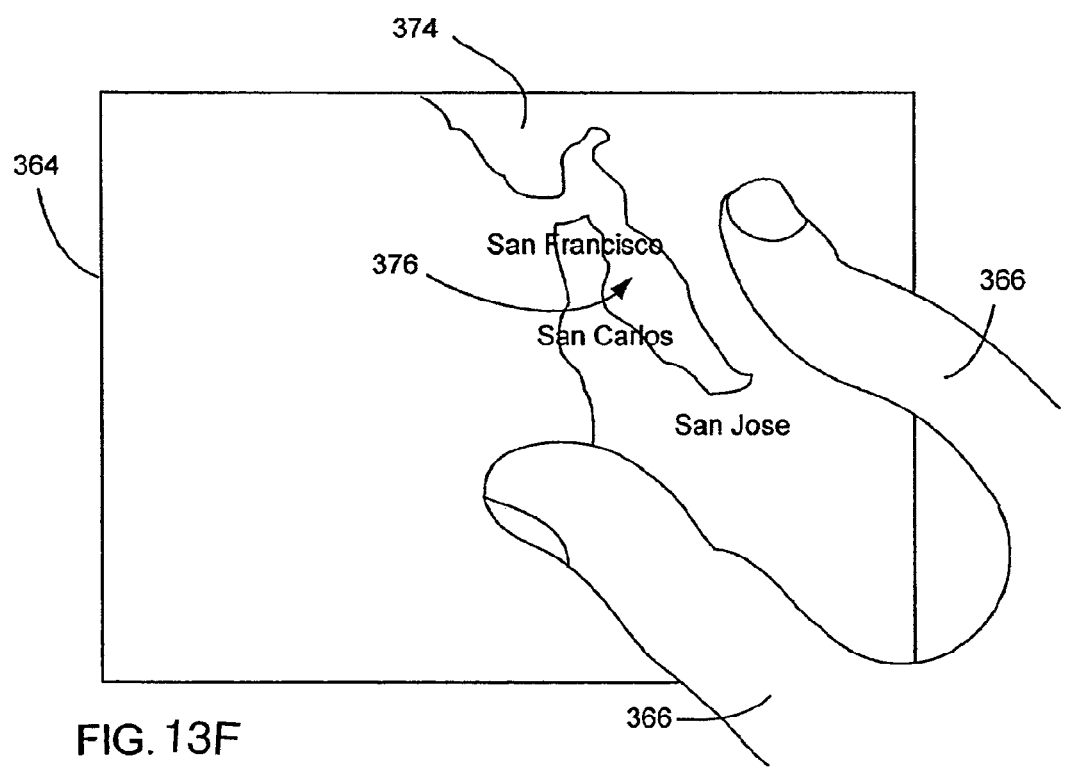
Figure 13G:
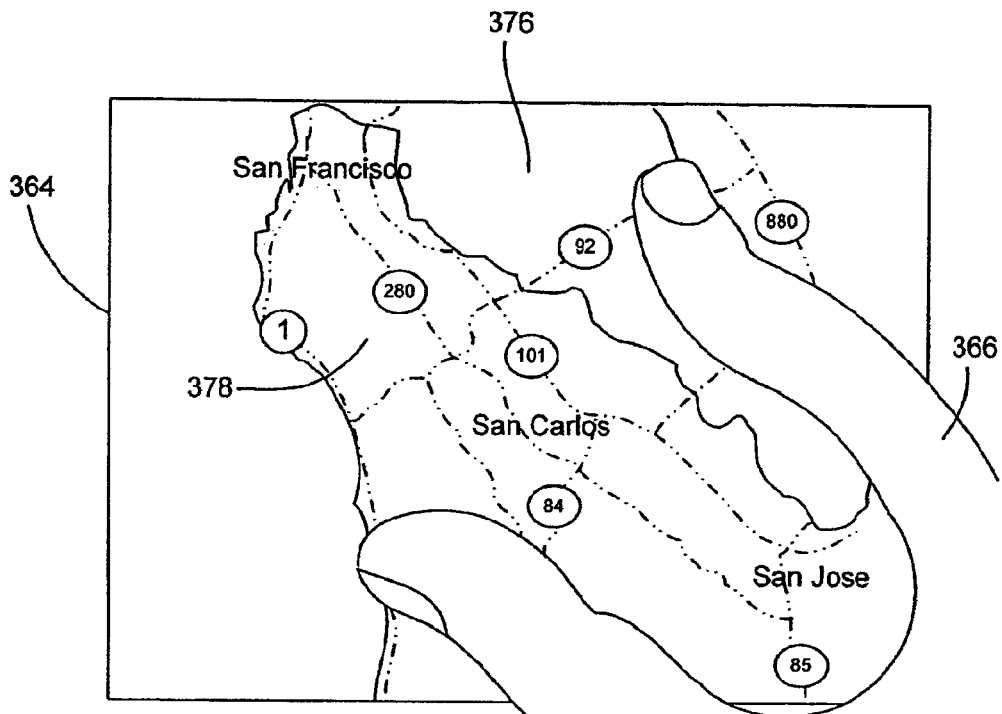
Figure 13H:
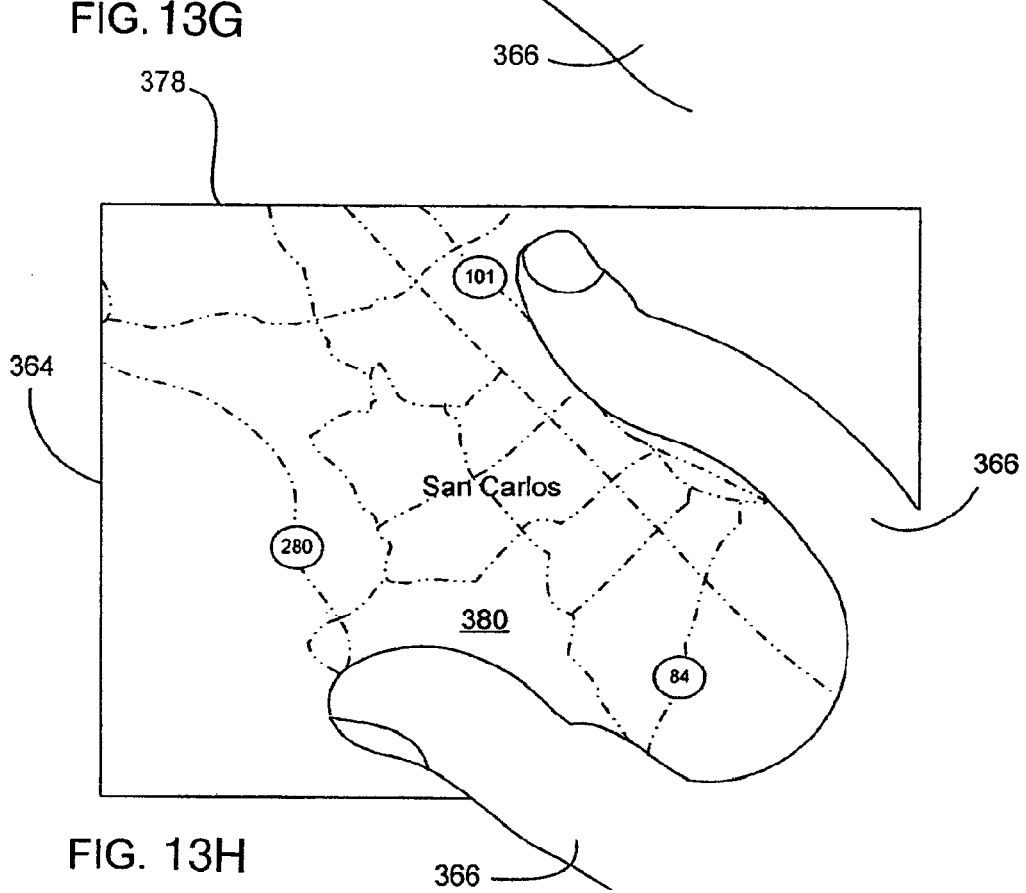

FIGS. 13A-13H illustrate a zooming sequence using the method described above. FIG. 13A illustrates a display presenting an image object 364 in the form of a map of North America with embedded levels which can be zoomed. In some cases, as shown, the image object is positioned inside a window that forms a boundary of the image object 364. FIG. 13B illustrates a user positioning their fingers 366 over a region of North America 368, particularly the United States 370 and more particularly California 372. In order to zoom in on California 372, the user starts to spread their fingers 366 apart as shown in FIG. 13C. As the fingers 366 spread apart further (detected distance increases), the map zooms in further on Northern California 374, then to a particular region of Northern California 374, then to the Bay area 376, then to the peninsula 378 (e.g., the area between San Francisco and San Jose Area), and then to the city of San Carlos 380 located between San Francisco and San Jose as illustrated in FIGS. 13D-13H. In order to zoom out of San Carlos 380 and back to North America 368, the fingers 366 can be closed back together following the sequence described above, but in reverse.

Figure 14:
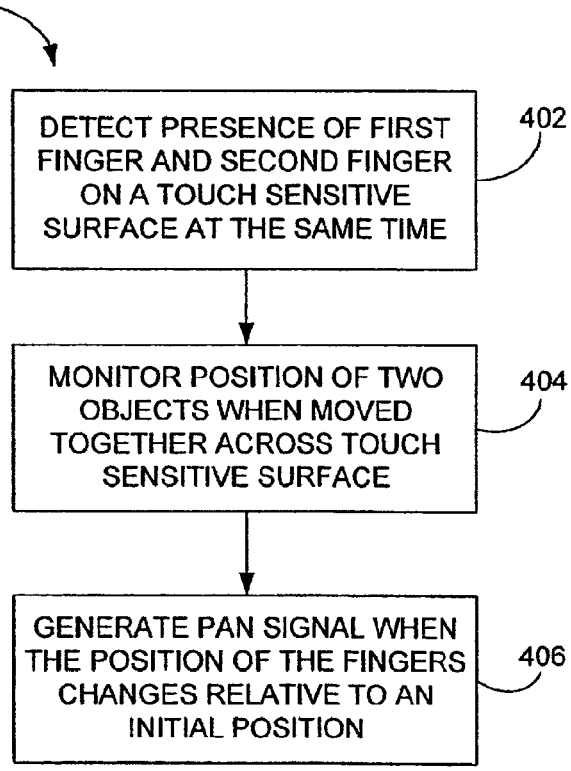
FIG. 14 is a diagram of a pan method according to one embodiment of this invention.

FIG. 14 is a diagram of a pan method 400, in accordance with one embodiment of the present invention. The pan gesture can be performed on a multipoint touch screen. The pan method 400 generally begins at block 402 where the presence of at least a first object and a second object are detected on a touch sensitive surface at the same time. The presence of at least two fingers can be configured to indicate that the touch is a gestural touch rather than a tracking touch based on one finger. In some cases, the presence of only two fingers indicates that the touch is a gestural touch. In other cases, any number of more than two fingers indicates that the touch is a gestural touch. In fact, the gestural touch can be configured to operate whether two, three, four or more fingers are touching, and even if the numbers change during the gesture, i.e., need a minimum of only two fingers.

Following block 402, the pan method 400 proceeds to block 404 where the position of the two objects when the objects are moved together across the touch screen can be monitored. Following block 404, the pan method 400 proceeds to block 406 where a pan signal can be generated when the position of the two objects changes relative to an initial position. In most cases, the set down of the fingers can lock the fingers to a particular image object displayed on the touch screen. As a result, when the fingers are moved together across the touch screen, the pan signal can be used to translate the image in the direction of the fingers. In most cases, the amount of panning varies according to the distance the two objects move. Furthermore, the panning typically can occur substantially simultaneously with the motion of the objects. For instance, as the fingers move, the object moves with the fingers at the same time.

Figure 15A:
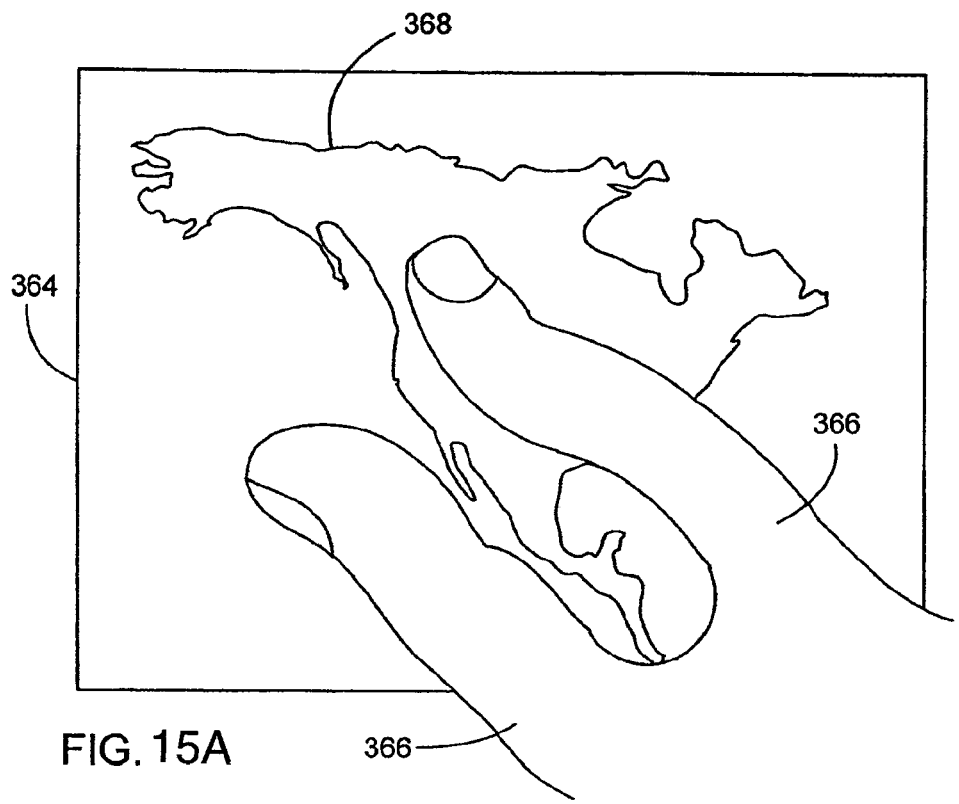
FIGS. 15a-15d illustrate a panning sequence according to one embodiment of this invention.
Figure 15:
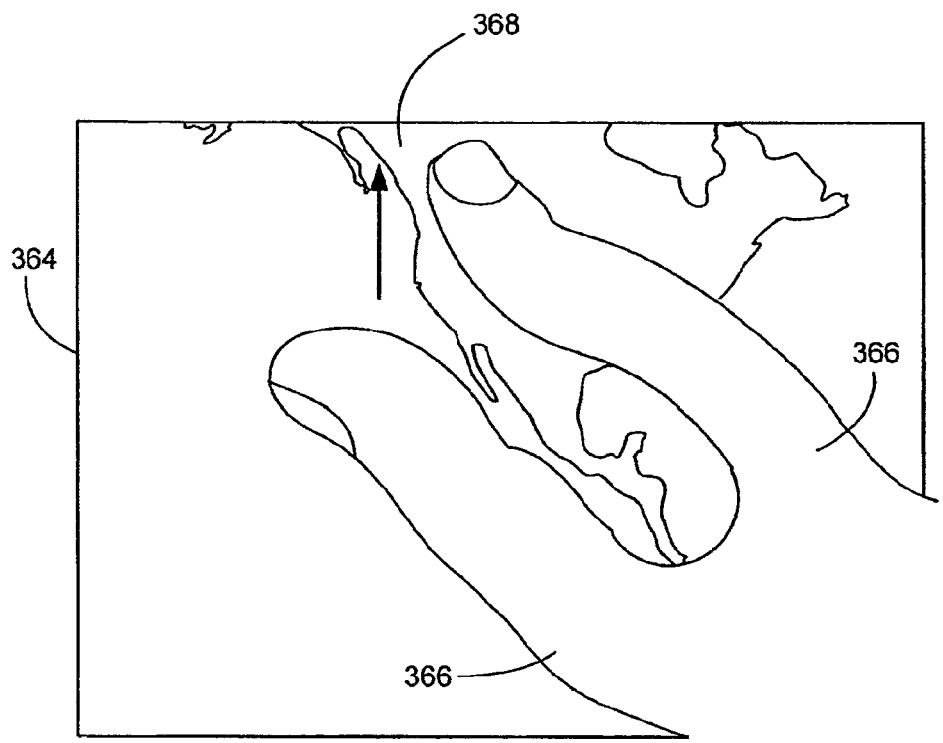
Figure 15C:
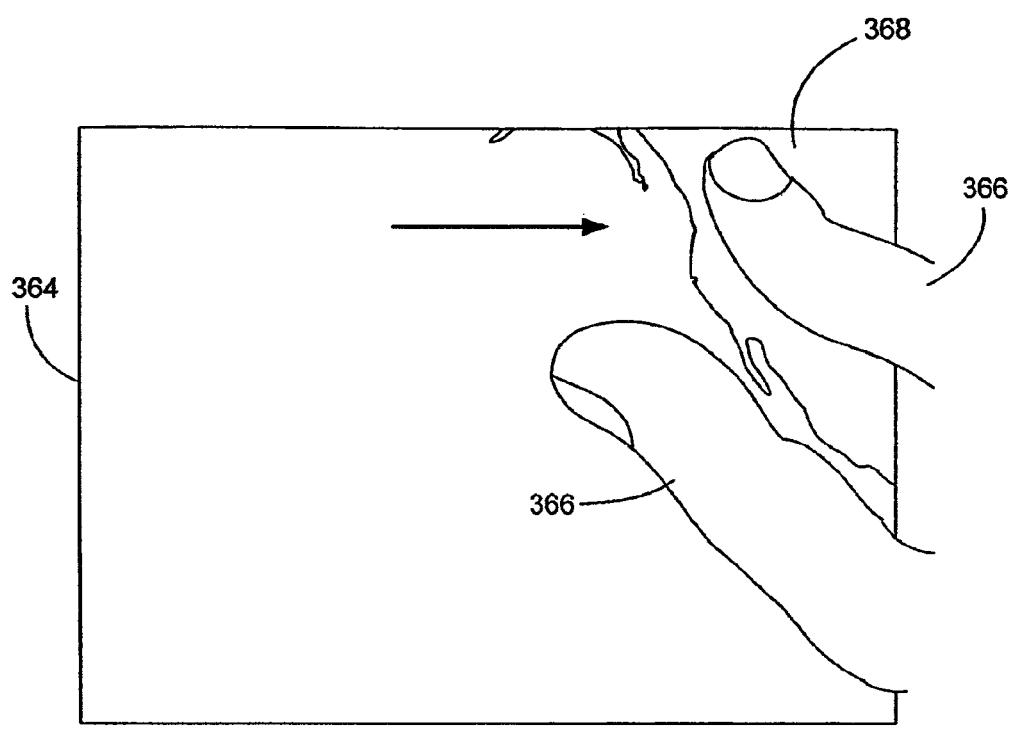
Figure 15D:
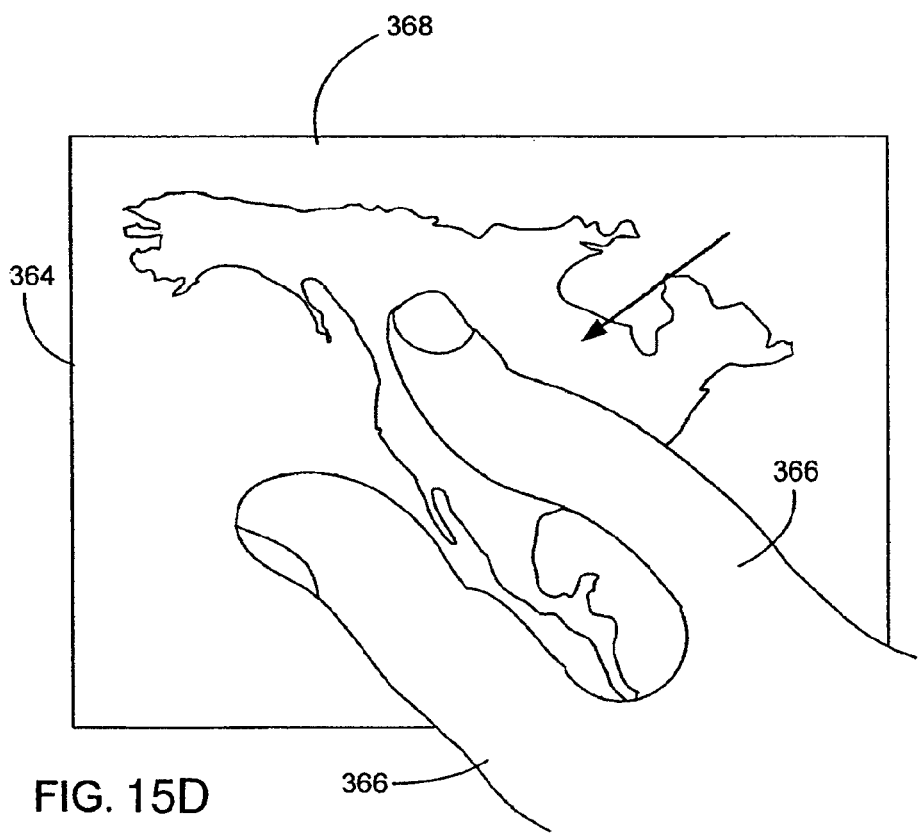

FIGS. 15A-15D illustrate a panning sequence based on the pan method 400 described above. Using the map of FIG. 13A, FIG. 15A illustrates a user positioning their fingers 366 over the map. Upon set down, the fingers 366 are locked to the map. As shown in FIG. 15B, when the fingers 366 are moved vertically up, the entire map 364 can be moved up, thereby causing previously seen portions of map 364 to be placed outside the viewing area and unseen portions of the map 364 to be placed inside the viewing area. As shown in FIG. 15C, when the fingers 366 are moved horizontally sideways, the entire map 364 can be moved sideways thereby causing previously seen portions of map 364 to be placed outside the viewing area and unseen portions of the map to be placed inside the viewing area. As shown in FIG. 15D, when the fingers 366 are moved diagonally, the entire map 364 can be moved diagonally thereby causing previously seen portions of map 364 to be placed outside the viewing area and unseen portions of the map to be placed inside the viewing area. As should be appreciated, the motion of the map 364 follows the motion of the fingers 366. This process is similar to sliding a piece of paper along a table. The pressure the fingers exert on the paper locks the paper to the fingers and when the fingers are slid across the table, the piece of paper moves with them.

Figure 16:
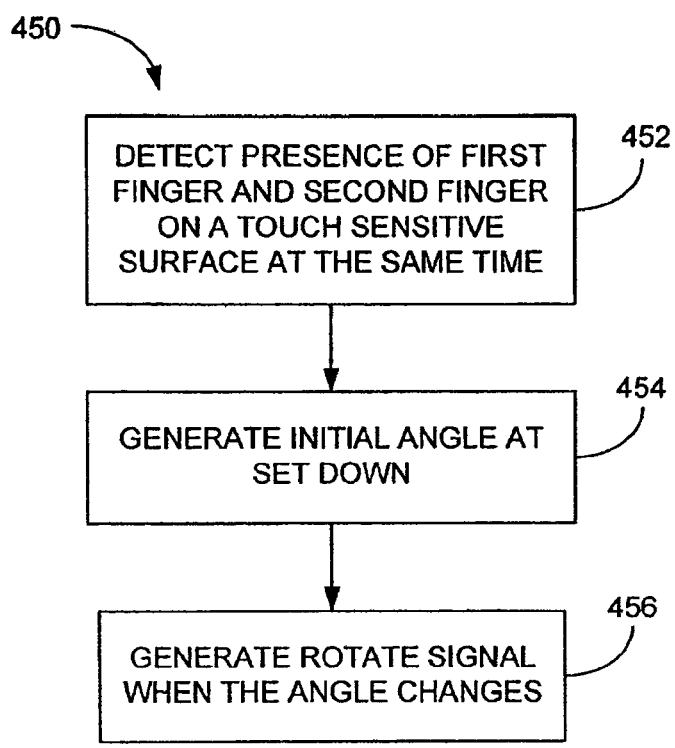
FIG. 16 is a diagram of a rotate method according to one embodiment of this invention.

FIG. 16 is a diagram of a rotate method 450, in accordance with one embodiment of the present invention. The rotate gesture can be performed on a multipoint touch screen. The rotate method 450 generally begins at block 452 where the presence of a first object and a second object can be detected at the same time. The presence of at least two fingers can be configured to indicate that the touch is a gestural touch rather than a tracking touch based on one finger. In some cases, the presence of only two fingers indicates that the touch can be a gestural touch. In other cases, any number of more than two fingers indicates that the touch can be a gestural touch. In still some other instances, the gestural touch can be configured to operate whether two, three, four or more fingers are touching, and even if the numbers change during the gesture, i.e., only need a minimum of two fingers.

Following block 452, the rotate method 450 proceeds to block 454 where the angle of each of the finger can be set. The angles can typically be determined relative to a reference point. Following block 454, rotate method 450 proceeds to block 456 where a rotate signal can be generated when the angle of at least one of the objects changes relative to the reference point. In most cases, the set down of the fingers can associate or lock the fingers to a particular image object displayed on the touch screen. Typically, when at least one of the fingers is positioned over the image on the image object, the image object can be associated with or locked to the fingers. As a result, when the fingers are rotated, the rotate signal can be used to rotate the object in the direction of finger rotation (e.g., clockwise, counterclockwise). In most cases, the amount of object rotation varies according to the amount of finger rotation, i.e., if the fingers move 5 degrees then so will the object. Furthermore, the rotation typically can occur substantially simultaneously with the motion of the fingers. For instance, as the fingers rotate, the object rotates with the fingers at the same time.

Figure 17A:
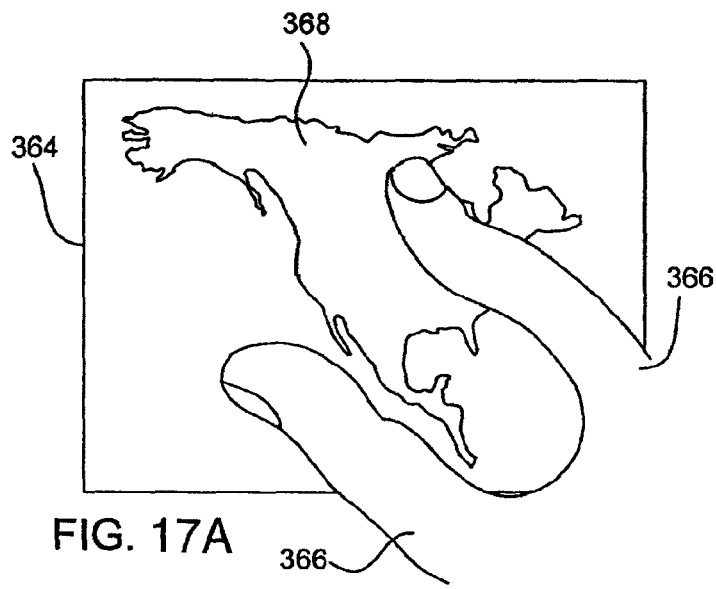
FIGS. 17a-17c illustrate a rotating sequence according to one embodiment of this invention.
Figure 17B:
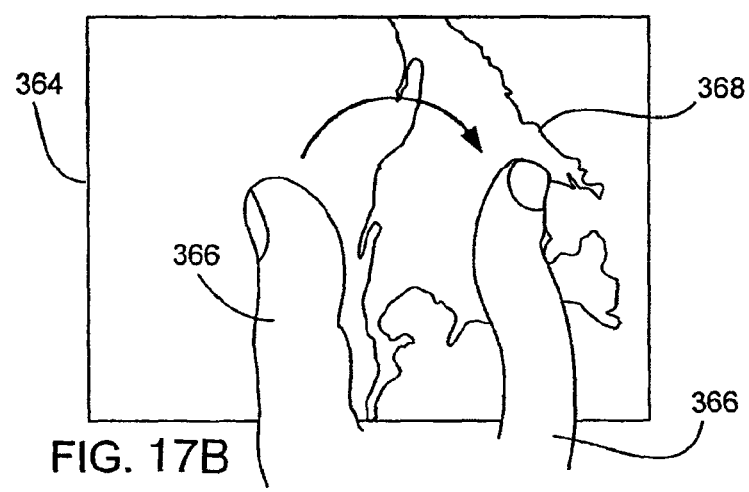
Figure 17C:
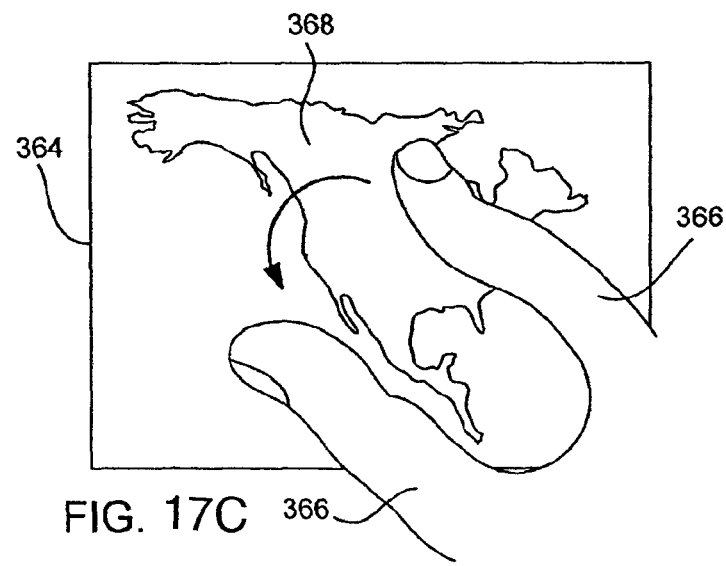

FIGS. 17A-17C illustrate a rotating sequence based on the method described above. Using the map of FIG. 13, FIG. 17A illustrates a user positioning their fingers 366 over the map 364. Upon set down, the fingers 366 are locked to the map 364. As shown in FIG. 17B, when the fingers 366 are rotated in a clockwise direction, the entire map 364 is rotated in the clockwise direction in accordance with the rotating fingers 366. As shown in FIG. 17C, when the fingers 366 are rotated in a counterclockwise direction, the entire map 364 is rotated in the counter clockwise direction in accordance with the rotating fingers 366.

It should be noted that the methods described in FIGS. 12-17 can be implemented during the same gestural stroke. That is, zooming, rotating and panning can all be performed during the gestural stroke, which can include spreading, rotating and sliding fingers. For example, upon set down with at least two fingers, the displayed object (map) can be associated or locked to the two fingers. In order to zoom, the user can spread or close their fingers. In order to rotate, the user can rotate their fingers. In order to pan, the user can slid their fingers. Each of these actions can occur simultaneously in a continuous motion. For example, the user can spread and close their fingers while rotating and sliding them across the touch screen. Alternatively, the user can segment each of these motions without having to reset the gestural stroke. For example, the user can first spread their fingers, then rotate their fingers, then close their fingers, then slide their fingers and so on.

Further details on the detection, interpretation and use of gestures are described in Applicant's co-pending U.S. patent application Ser. No. 11/038,590 entitled "Mode-Based Graphical User Interfaces for Touch Sensitive Input Devices," filed Jan. 18, 2005, and published as U.S. Patent Publication No. 2006/0026535 on Feb. 2, 2006, the contents of which are incorporated by reference herein. Further details on detecting touches on a surface and interpreting them as gestures are described in Applicant's co-pending U.S. patent application Ser. No. 11/428,522 entitled "Identifying Contacts on a Touch Surface," filed Jul. 3, 2006, and published as U.S. Patent Publication No. 2006/0238522 on Oct. 26, 2006, the contents of which are incorporated by reference herein. Further details on "knuckle" and "pengrip" detection are described in U.S. Pat. No. 6,323,846 entitled "Method and Apparatus for Integrating Manual Input," the contents of which are incorporated by reference herein.

"Real-world" gestures such as hand or finger movements/orientations that are generally recognized to mean certain things (e.g., an "OK" hand signal generally indicates an affirmative response) can be detected by the touch or hover sensitive device and interpreted by the multipoint processing method to more efficiently and accurately effect intended operations. Like other gestures described above, "real-world" gestures can be detected and interpreted by first obtaining one or more images of touch, classifying and grouping the features, calculating any key parameters of the groups, associating the groups with UI elements where applicable, and then performing the appropriate action.

Figure 18A:
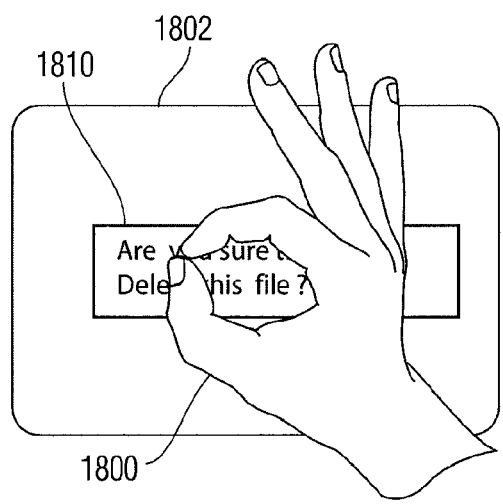
FIGS. 18a-18c illustrate an exemplary "OK gesture" according to one embodiment of this invention.
Figure 18B:
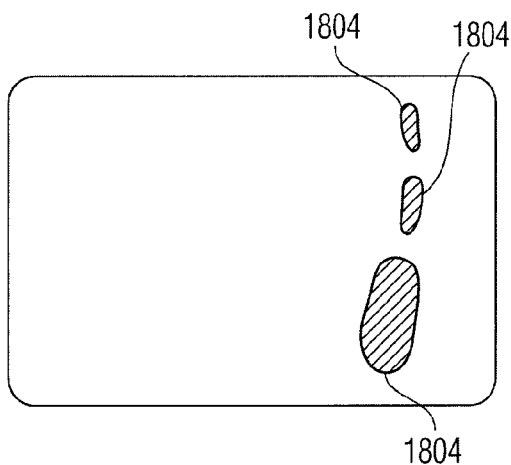
Figure 18C:
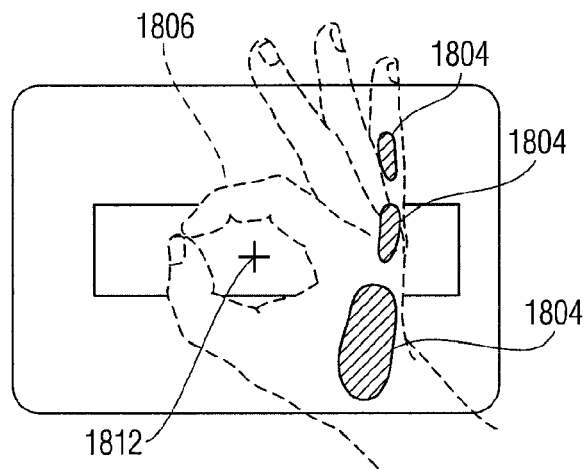

FIGS. 18a-18c illustrate an exemplary "OK gesture" according to embodiments of this invention. An "OK gesture" formed by either hand over a touch or hover sensitive device can be detected and interpreted to perform operations requiring an affirmative response, such as a text box UI element that asks the user whether a certain action is to be taken (e.g. "Are you sure you want to delete this file?").

To detect an "OK gesture," either a touch sensor panel with some hover detecting capability or a touch sensor panel co-located with a proximity sensor panel can be employed. FIG. 18a illustrates an exemplary orientation of a right hand 1800 giving an "OK gesture" over a UI element 1810 appearing beneath sensor panel 1802 according to embodiments of this invention. In some embodiments, the thumb and index finger in the "OK" gesture can touch the sensor panel. Note that although single-hand gestures will generally be described and illustrated herein as right-handed operations, it should be understood that embodiments of this invention are equally applicable to left-handed operations.

In FIG. 18b, the image of actual touch 1804 may not look like an "OK gesture" at all, because only the user's thumb, index finger, "pinky" finger and palm edge may actually make contact with the sensor panel. However, if a sensor panel with sufficient near-field and/or far-field sensitivity is utilized, the image can appear more like that shown in FIG. 18c, with some or all of index finger and thumb 1806 being detected, although portion 1804 can have a much higher "magnitude" or z-component as compared to portion 1806, because portion 1804 is closer to the sensor panel. In some embodiments, image 1804 can be detected by a touch sensor panel, while image 1806 can be detected by a co-located proximity sensor panel. Images 1804 and 1806 can together be converted into a single feature as described above, or the images can be converted into two separate but overlapping features if image magnitude values are used to separate the two features.

If a single feature is found, and the various characteristics indicative of an "OK gesture" are present (e.g., either images 1804 of FIG. 18b, or a "finger circle" portion including an image of weak touch or hover 1806 that completely or almost completely encircles a region of no detected touch or hover 1808, in combination with one or more adjacent longer and tapering "palm edge and pinky" images 1804), then that feature can be classified as an "OK gesture." If two features are found, one can be classified as a "palm edge and pinky" feature and the other can be classified as a "thumb/index finger" feature or a "finger circle" feature, and both features can be grouped together. The grouping can then be analyzed to determine if the grouping indicates that a hand forming an "OK gesture" is present. Note that the presence of other images in the same general area, or the absence of certain image portions (e.g. the image portion caused by the pinky finger) is missing, can cause a lack of recognition of the "OK gesture."

After the features have been classified and grouped, parameters for the group can be computed, such as an approximate center 1812 of the region of no detected touch or hover, and if this center is located coincident with the UI element (e.g. text box 1810 in FIG. 18a), the UI element can be associated with the group. An appropriate action can then be taken. In the present example, the detection of an "OK gesture" image coincident with the "Are you sure you want to delete this file?" text box can cause the file to be deleted.

FIGS. 19a-19e illustrate an exemplary "grasp everything gesture" according to embodiments of this invention. A "grasp everything gesture" formed by either hand over a touch or hover sensitive device can be detected and interpreted to perform operations requiring a grouping action, such as the grouping of UI elements such as file icons or graphics symbols on a desktop or drawing page.

To detect a "grasp everything gesture," either a touch sensor panel with some hover detecting capability or a touch sensor panel co-located with a proximity sensor panel can be employed. FIGS. 19a and 19b illustrate a right hand 1900 performing a "grasp everything gesture" over a plurality of UI elements 1902 appearing beneath sensor panel 1904 according to embodiments of this invention. In FIG. 19a, right hand 1900 can have a palm resting on the sensor panel with fingers extended and touching the sensor panel at the approximate circumferential or oblong boundary 1906 of an area within which UI elements 1902 can be grouped. FIG. 19b shows the image of touch corresponding to FIG. 19a, including palm heel image 1916 and fingerprint images 1908. In FIG. 19b, images 1916 and 1908 can be classified as palm and fingerprint features, respectively, and can be grouped together if their spacings and orientations indicate that they are from the same hand, for example. In some embodiments, the multipoint processing method can receive one or more inputs that cause the multipoint processing method to enter a certain mode and begin to convert the received images 1908 into features, and classify, group, and interpret images as the start of a possible "grasp everything gesture." In other embodiments, the detection of images 1916 and 1908 spaced apart at distances indicating the presence of a single spread hand can trigger the multipoint processing method to begin tracking these images as the start of a possible "grasp everything gesture." In other embodiments, the context of images 1908, such as if they should appear over a desktop, can cause the images to be classified, grouped, and interpreted as the start of a possible "grasp everything gesture." In either case, parameters for the group can then be computed, such as circumferential boundary 1906.

FIG. 19c shows right hand 1900 in a clenched fist shape 1910 after the "grasp everything gesture" has been completed. In corresponding FIG. 19d, after completion of the gesture, the detected image can now include a palm image 1916 and images 1918, which can represent the light touches of fingerprints or first knuckles resting on the sensor panel. However, between the images of FIGS. 19b and 19d, as the user's fingers were being drawn together into a clenched fist, temporary images 1920 may have been detected. These temporary images 1920 can be stored and used to more accurately determine that a "grasp everything gesture" has been performed. In other words, to enhance the robustness of the detection of the "grasp everything gesture," temporary images 1920 can be tracked over time and detected as being pulled inward for some distance, with a gradually lighter "touch," before disappearing, to further insure the detection of fingers being pulled inward and upward toward the palm.

If the images and corresponding features are tracked over time, the completion of a "grasp everything gesture" can be accurately detected. At that point, all UI elements 1902 within the calculated circumferential boundary 1906 can be associated with the "grasp everything gesture" and selected together, for example. Any UI elements outside this boundary would not be "grasped." Note, however, that if after some time has passed, instead of the images of FIG. 19d, no image of touch is detected, this can indicate that the user has merely lifted the hand off of the sensor panel without performing a "grasp everything gesture," and in that case the "grasp everything gesture" would not be detected.

After the "grasp everything gesture" has been detected and the corresponding UI elements have been grouped, the user can utilize various input mechanisms to take further actions with regard to the grasped UI elements. In an exemplary extension of the "grasp everything feature," if images 1916 and 1918 are further tracked over time and rapidly get weaker and quickly disappear, indicating that the user may have quickly pulled the clenched hand away from the touch screen, this can be further interpreted as a "throw away" gesture to discard the grasped UI elements (i.e. a "grasp and delete everything gesture").

Figure 20A:
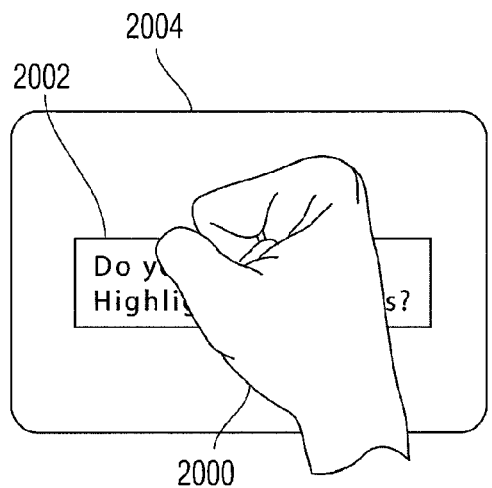
FIGS. 20a-20b illustrate an exemplary "stamp of approval gesture" according to one embodiment of this invention.
Figure 20B:
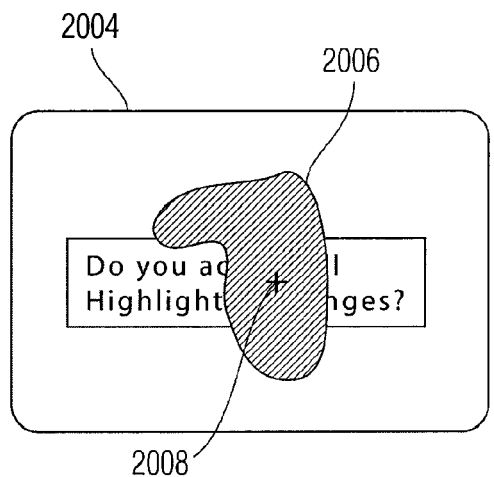

FIGS. 20a-20b illustrate an exemplary "stamp of approval gesture" according to embodiments of this invention. A "stamp of approval gesture" formed by either hand over a touch or hover sensitive device can be detected and interpreted to perform operations requiring an affirmative response, such as a UI element including text that asks the user whether a certain action is to be taken (e.g. "Do you accept all highlighted changes?").

To detect a "stamp of approval gesture," either a touch sensor panel with some hover detecting capability or a touch sensor panel co-located with a proximity sensor panel can be employed. FIG. 20a illustrates an exemplary orientation of a right hand 2000 giving a "stamp of approval gesture" over a UI element 2002 appearing beneath sensor panel 2004 according to embodiments of this invention. In FIG. 20b, the image of actual touch 2006 may not look like a "stamp of approval gesture" at all, because only the user's curled "pinky" finger and palm edge can actually make contact with the sensor panel. To enhance the unambiguous detection of a "stamp of approval gesture," image 2006 can be required to appear and disappear rapidly, which would indicate a characteristic stamping motion by the user.

After the detected image 2006 has been converted to one or more features and classified and grouped as a "stamp of approval gesture," parameters for the feature can be computed, such as an approximate center 2008 of the "stamp of approval gesture," and if this center is located coincident with the UI element (e.g. text box 2002 in FIG. 20a), the UI element is associated with the gestures and appropriate action can then be taken. In the present example, the detection of an "stamp of approval gesture" coincident with the "Do you accept all highlighted changes?" text box can cause the changes to become permanent.

Figure 21A:
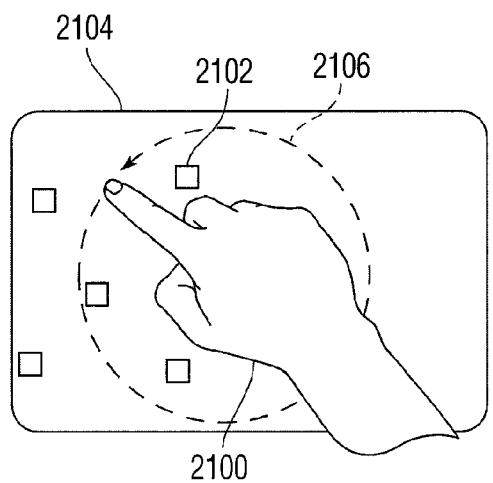
FIGS. 21a-21b illustrate an exemplary "circle select gesture" according to one embodiment of this invention.
Figure 21B:
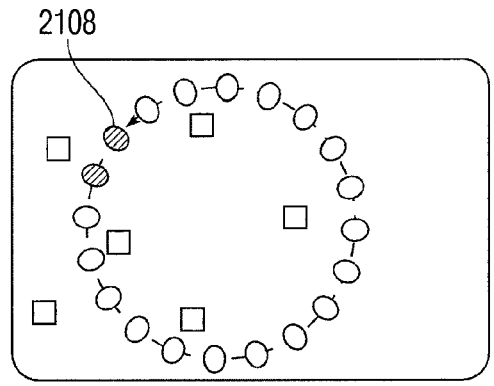

FIGS. 21a-21b illustrate an exemplary "circle select gesture" according to embodiments of this invention. A "circle select gesture" formed by either hand over a touch or hover sensitive device can be detected and interpreted to perform operations requiring a grouping action, such as the grouping of UI elements such as file icons or graphics symbols on a desktop or drawing page.

To detect a "circle select everything gesture," either a touch sensor panel with some hover detecting capability or a touch sensor panel co-located with a proximity sensor panel can be employed. FIG. 21a illustrates a right hand 2100 giving a "circle select gesture" over a plurality of UI elements 2102 appearing beneath sensor panel 2104 according to embodiments of this invention. In FIG. 21a, right hand 2100 can have only index finger extended and touching the sensor panel, although it should be understood that other fingers can be used as well. Over time, the index finger can trace the approximate boundary 2106 of an area within which UI elements 2102 can be grouped or selected. The boundary can be generally circular, oval, oblong or any shape that eventually closes on itself. FIG. 21b shows the image of touch corresponding to FIG. 21a, including fingerprint images 2108 changing over time. In some embodiments, image processing logic can receive one or more inputs that cause the image processing logic to enter a certain mode and begin to convert the received images 2108 into features, and classify, group, and interpret the features as the start of a possible "circle select gesture." In other embodiments, the context of images 2108, such as if the images should appear over a desktop or graphics application, can cause the images to be converted into features, classified, grouped, and interpreted as the start of a possible "circle select gesture." In either case, parameters for the group can then be computed, such as circumferential boundary 2106.

If a "circle select gesture" is detected, all UI elements 2102 within the circumferential boundary 2106 can be associated with the gesture and selected together, for example. Any UI elements outside this boundary would not be selected. However, if after some time has passed, the moving image of touch 2108 has not yet substantially returned to its starting point, this can indicate that the user has abandoned the "circle select gesture" or did not intend that gesture at all, and in that case no UI elements would be selected.

After the "circle select gesture" has been detected and the corresponding UI elements have been selected, the user can utilize various input mechanisms to take further actions with regard to the selected UI elements. For example, the selected UI elements can be copied, moved, or deleted as a group.

FIGS. 22a-22d illustrate an exemplary "X to delete gesture" according to embodiments of this invention. An "X to delete gesture" formed by either hand over a touch or hover sensitive device can be detected and interpreted to perform operations requiring a deleting action, such as the deleting of a UI element such as file icon or graphics symbol on a desktop or drawing page.

To detect a "X to delete gesture," either a touch sensor panel with some hover detecting capability or a touch sensor panel co-located with a proximity sensor panel can be employed. FIG. 22a illustrates a right hand 2200 beginning a "X to delete gesture" over a UI element 2202 appearing beneath sensor panel 2204 according to embodiments of this invention. In FIG. 22a, right hand 2200 can have only index finger extended and touching the sensor panel, although it should be understood that any finger can be used. Over time, the index finger can trace the first stroke 2006 of an "X" over UI element 2202. FIG. 22b shows a series of images of touch corresponding to FIG. 22a, including fingerprint images 2208 changing over time. In some embodiments, image processing logic can receive one or more inputs that cause the image processing logic to enter a certain mode and begin to convert the received images 2208 into features, and classify, group, and interpret the features as the start of a possible "X to delete gesture." In other embodiments, images 2208 can be stored until further information is received that indicates this is the start of a possible "X to delete gesture."

After stroke 2206 is completed, the user can then lift the finger off the sensor panel and begin a second stroke 2208 shown in FIG. 22c. Over time, the index finger can trace the second stroke 2210 of the "X" over UI element 2202. FIG. 22d shows a series of images of touch corresponding to FIG. 22c, including fingerprint images 2212 changing over time. In some embodiments, image processing logic can receive one or more inputs that cause the processing logic to classify, group, and interpret images 2212 as the second stroke of a possible "X to delete gesture." In other embodiments, images 2212 can be stored until stroke 2210 has been completed and it is confirmed that an "X to delete gesture" has been properly received. To ensure an accurate detection of the "X to delete gesture," the multipoint processing method can require that the strokes 2206 and 2210 be completed within a short time of each other.

If an "X to delete gesture" is detected, parameters can be computed such as the intersection between the first and second strokes 2206 and 2210. The UI element 2202 beneath the between the first and second strokes 2206 and 2210 can then be selected for deletion. Those UI elements that did not appear under the intersection would not be deleted. Note that if, for example, after some time has passed, the second stroke 2210 is not detected, this can indicate that the user has abandoned the "X to delete gesture" or that it was never intended to be an "X to delete gesture," and in that case no UI elements would be selected and deleted.

Figure 23A:
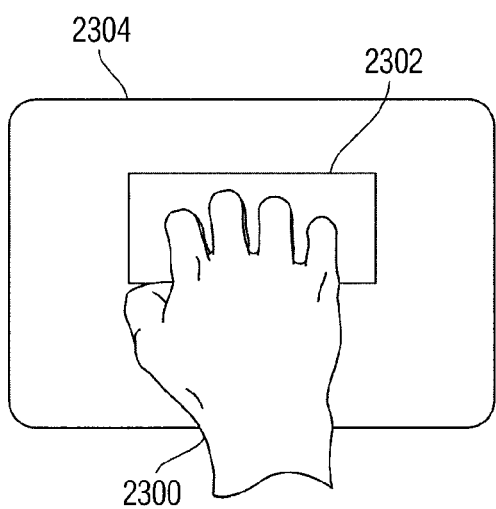
FIGS. 23a-23b illustrate an exemplary "knock to inquire gesture" according to one embodiment of this invention.
Figure 23B:
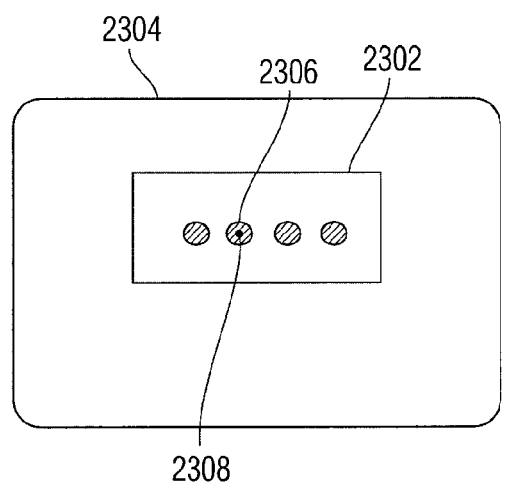

FIGS. 23a-23b illustrate an exemplary "knock to inquire gesture" according to embodiments of this invention. A "knock to inquire gesture" formed by either hand over a touch or hover sensitive device can be detected and interpreted to perform operations requiring an inquiry action, such as determining whether an application, file, person of interest or other entity is available to be opened, accessed, communicated with, and the like.

To detect a "knock to inquire gesture," either a touch sensor panel with some hover detecting capability or a touch sensor panel co-located with a proximity sensor panel can be employed. FIG. 23a illustrates a right hand 2300 executing a "knock to inquire gesture" over a UI element 2302 appearing beneath sensor panel 2304 according to embodiments of this invention. Although not visible in FIG. 23a, right hand 2300 can have only one to four knuckles actually contacting the sensor panel at any time. FIG. 23b shows exemplary images of touch 2306 corresponding to knuckles contacting the sensor panel in FIG. 23a. These images can be converted to features, and grouped and classified as knuckle features. Although not shown in FIG. 23b, images 2306 can be generally repeated two or more times, representing a typical knocking motion. In some embodiments, image processing logic can receive one or more inputs that cause the processing logic to classify, group, and interpret images 2306 as the start of a possible "knock to inquire gesture." In other embodiments, images 2306 can be stored until further information is received that indicates this is the start of a possible "knock to inquire gesture." For example, after two or more groupings of images 2306 are received in rapid succession, the image processing logic can interpret these repetitively received, similarly located groups of images 2306 as a "knock to inquire gesture."

If a "knock to inquire gesture" is detected, parameters can be computed such as the approximate center location 2308 of the knuckle on the middle finger. The UI element 2302 beneath center location 2308 can then be associated with the gesture and selected for inquiry. Those UI elements that did not appear under center location 2308 would not be selected. Note that if, for example, after a first group of images 2306 are detected, similar groups of images are not received in rapid succession, this can indicate that a "knock to inquire gesture" is not being performed.

After the "knock to inquire gesture" has been detected and the corresponding UI element has been selected, further actions can be taken with regard to the selected UI element. For example, if the selected UI algorithm is a shared resource such as a limited access application, an inquiry as to whether the application is available to be checked out can be initiated.

FIGS. 24a-24h illustrate an exemplary "hitchhiker gesture" according to embodiments of this invention. A "hitchhiker gesture" formed by either hand over a touch or hover sensitive device can be detected and interpreted to perform operations requiring a directional input, such as a scrolling, panning, windowing, translating in time (e.g., moving backward or forward in time in an audio or video recording), and the like.

To detect a "hitchhiker gesture," either a touch sensor panel with some hover detecting capability or a touch sensor panel co-located with a proximity sensor panel can be employed. FIG. 24a illustrates a right hand 2400 executing a "hitchhiker gesture" upon sensor panel 2404 according to embodiments of this invention. Although not visible in FIG. 24a, right hand 2400 can have only certain hand parts actually contacting the sensor panel at any time. FIG. 24b shows exemplary images of touch 2406 corresponding to the "hitchhiker gesture" in FIG. 24a. These images 2406 can be converted to images, and grouped and classified as a left-pointing "hitchhiker gesture." In particular, one of the images 2406 can be identified as corresponding to a thumb, and from that identification a directional parameter (e.g. left) can be calculated. However, if images 2406 are insufficient to detect the left-pointing "hitchhiker gesture" with reasonable accuracy, in some embodiments the near-field proximity detection capabilities of the touch sensors or a co-located proximity sensor panel can be used to detect an outline 2408 of the left-pointing "hitchhiker gesture" to more accurately identify it. Detection of the left-pointing "hitchhiker gesture" can the be used to scroll left, pan left, window left, translate left (earlier) in time (e.g., moving backward or forward in time in an audio or video recording), and the like.

Figure 24E:
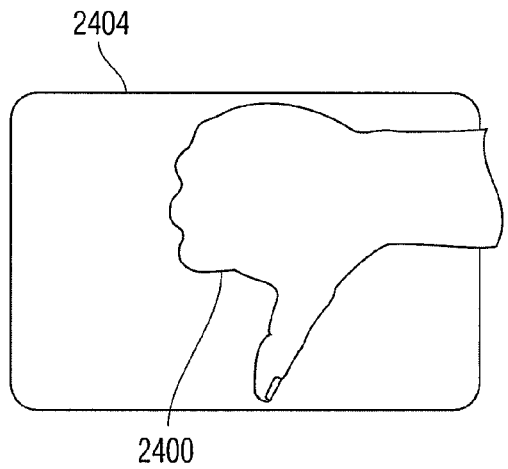
Figure 24F:
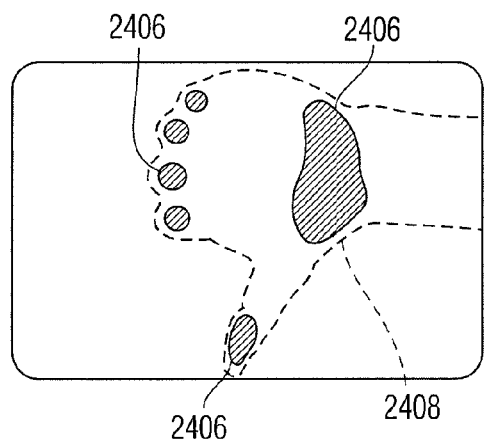
Figure 24G:
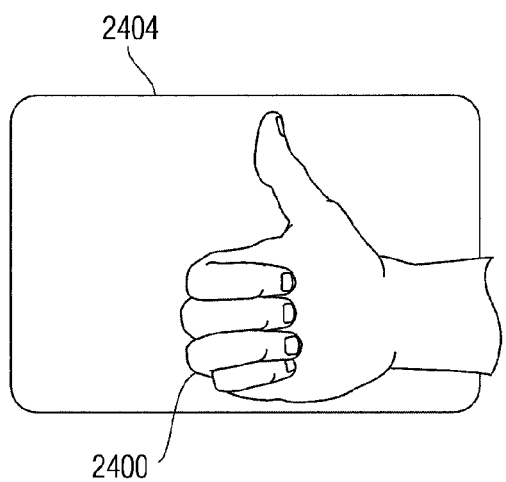
Figure 24H:
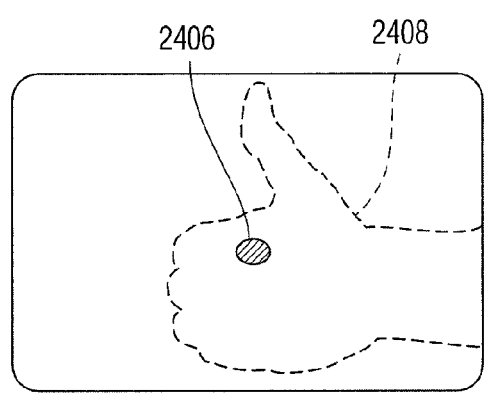

FIGS. 24c and 24d, FIGS. 24e and 24f, and FIGS. 24g and 24h illustrate other orientations, detected touch and/or hover images for the "hitchhiker gesture" pointing in different directions. FIGS. 24d and 24h, in particular, show how only the user's middle knuckle can form a touch image on sensor panel 2404, and therefore illustrate how outline 2408 detected by the near-field proximity detection capabilities of the touch sensors or proximity sensors co-located with the touch sensors can be used advantageously to more accurately detect the "hitchhiker gesture."

FIGS. 25a-25h illustrate exemplary "shape gestures" according to embodiments of this invention. Shape gestures formed by either or both hands over a touch or hover sensitive device can be detected and interpreted to perform various operations, including creating a graphic image of that shape.

Figure 25A:
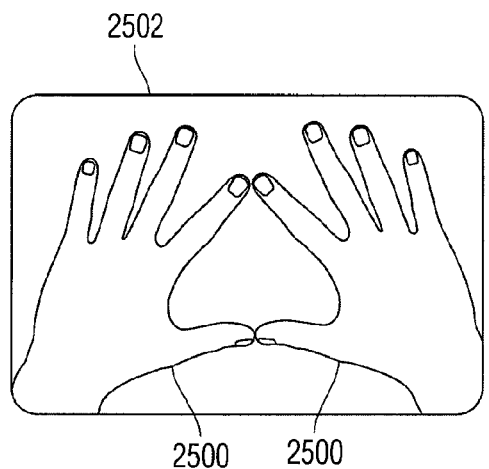
FIGS. 25a-25h illustrate exemplary "shape gestures" according to one embodiment of this invention.
Figure 25B:
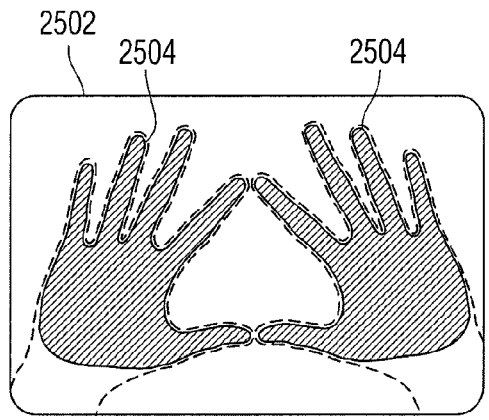
Figure 25C:
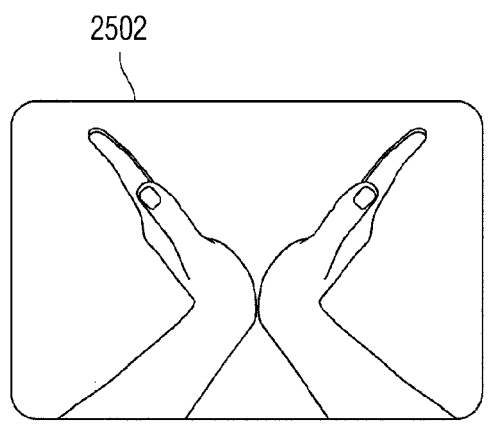
Figure 25D:
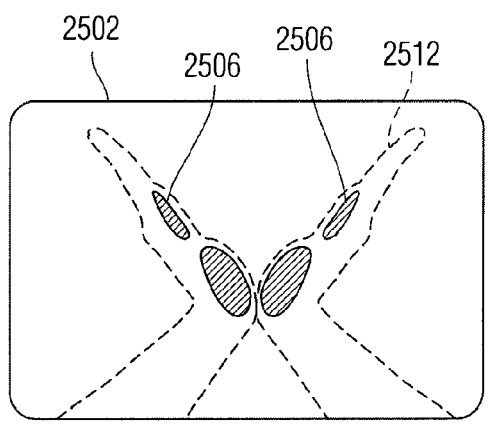
Figure 25E:
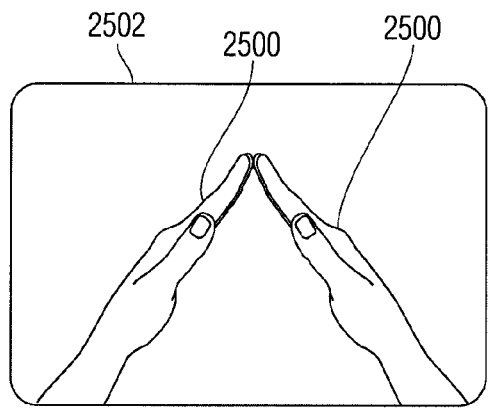
Figure 25F:
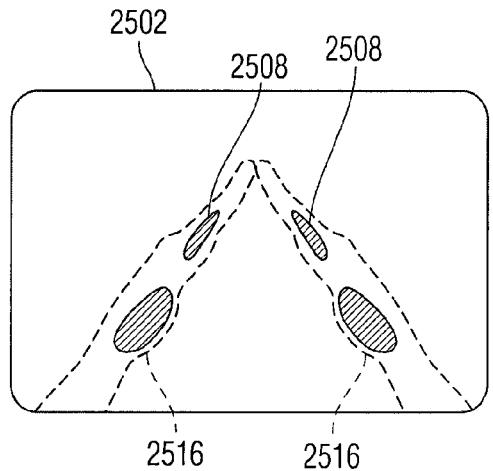
Figure 25G:
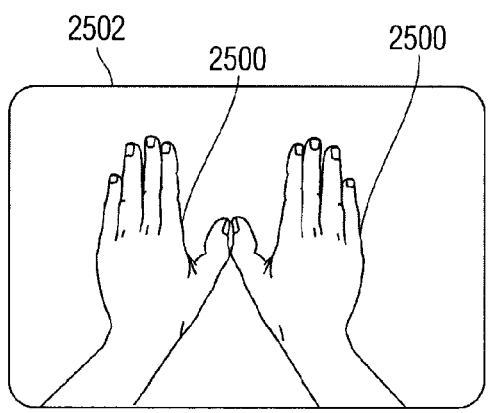
Figure 25H:
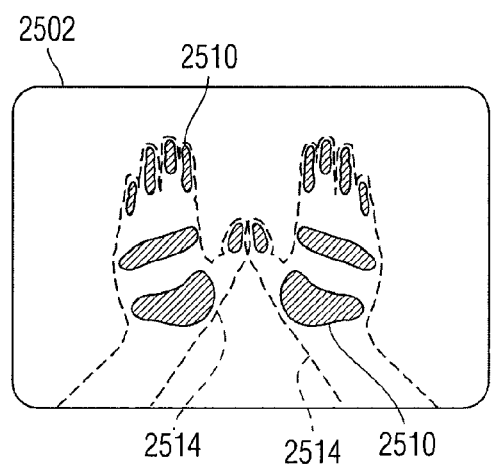

To detect a shape gesture, either a touch sensor panel with some hover detecting capability or a touch sensor panel co-located with a proximity sensor panel can be employed. FIG. 25a illustrates both hands 2500 making a "triangle shape gesture" over sensor panel 2502 according to embodiments of this invention. FIG. 25b shows the images of actual touch or hover 2504 that can be detected by the sensor panel. FIG. 25c illustrates both hands 2500 making a "V shape gesture" over sensor panel 2502 according to embodiments of this invention. FIG. 25d shows the images of actual touch 2506 or hover 2512 that can be detected by the sensor panel. FIG. 25e illustrates both hands 2500 making an "inverted V shape gesture" over sensor panel 2502 according to embodiments of this invention. FIG. 25f shows the images of actual touch 2508 or hover 2516 that can be detected by the sensor panel. FIG. 25g illustrates both hands 2500 making an "wing shape gesture" over sensor panel 2502 according to embodiments of this invention. FIG. 25h shows the images of actual touch 2510 or hover 2514 that can be detected by the sensor panel.

In any of these examples, the images can be converted to features, which can then be classified, grouped and interpreted as a particular gesture. Each gesture described above can then cause a particular operation to be performed with regard to UI elements appearing with a certain relationship to the gesture (e.g., UI elements within the triangle formed by the "triangle shape gesture" can be selected, zoomed, and the like). In another example, if multiple touch images taken over time indicate that the "V shape gesture" is being shifted upwards, UI elements within the "V" of the "V shape gesture" could be grouped and translated (moved) upward in accordance with the motion of the "V shape gesture." A similar concept could apply to the "inverted V shape gesture." The "wing shape gesture" could, for example, trigger the desktop faxing or sending of a UI element under the gesture (e.g. a document) or trigger the e-mailing of a document over the Internet.

FIGS. 26a-26d illustrate exemplary "identification gestures" according to embodiments of this invention. An "identification gesture" formed by either or both hands on or over a touch or hover sensitive device can be detected and interpreted to perform operations requiring an identification action, such determining whether the user is to get access, or continue to have access, to a restricted account, file or other item.

Figure 26A:
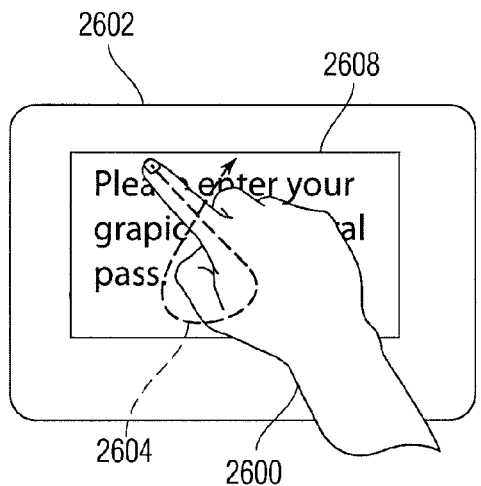
FIGS. 26a-26h illustrate exemplary "identification gestures" and "lock/unlock gestures" according to one embodiment of this invention.
Figure 26B:
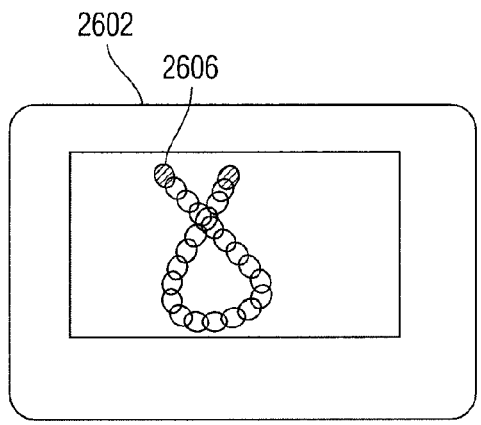

To detect an "identification gesture," either a touch sensor panel with some hover detecting capability or a touch sensor panel co-located with a proximity sensor panel can be employed. FIG. 26a illustrates a right hand 2600 beginning an exemplary "identification gesture" over a UI text box element 2608 indicating "Please enter graphical/gestural password" appearing on sensor panel 2602 according to embodiments of this invention. In FIG. 26a, right hand 2600 can have only index finger extended and touching the sensor panel, although it should be understood that any one finger or multiple fingers, or even both hands can be used. Over time, the index finger can trace a graphical password 2604. FIG. 26b shows a series of captured images of touch corresponding to FIG. 26a, including fingerprint images 2606 changing over time. In some embodiments, image processing logic can receive one or more inputs that cause the image processing logic to enter a certain mode and begin to convert the received images into features, and classify, group, and interpret images 2606 as the start of a possible "identification gesture" as soon as images start to appear. In other embodiments, images 2606 can be stored until further information is received that identifies the images as an "identification gesture." For example, if the complete "identification gesture" is the shape shown in FIG. 26b, the composite shape can be recognized as an "identification gesture" only after all images 2606 are fully captured. Note that although the example of FIGS. 26a and 26b only shows a single stroke by a single hand, it should be understood that one or more strokes, by either or both hands, in series or in parallel, can be used to create an "identification gesture" unique to the user. The gesture need not look like a signature, but can be any symbolic representation of choice.

A time component can optionally be attached to an "identification gesture." For example, the entire "identification gesture" can be required to be completed within a certain period of time (e.g. a few seconds), otherwise the gesture will be rejected.

Figure 26C:
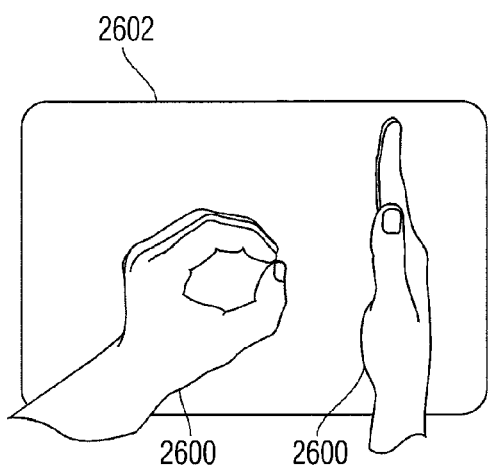
Figure 26D:
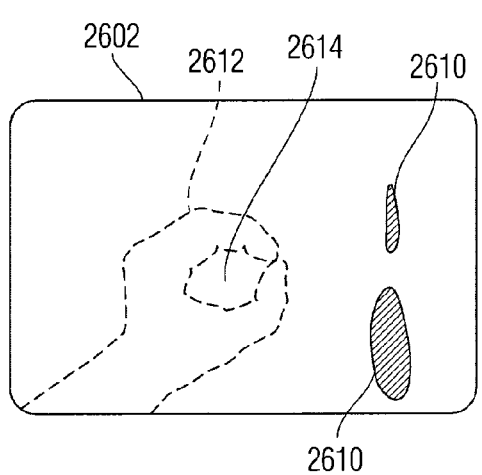

In another embodiment illustrated in FIG. 26c, one or more hands 2600 can be used to form an "identification gesture" that need not touch the sensor panel, or may only partially touch the sensor panel. In the example of FIG. 26c, the user's right hand can contact the sensor panel, resulting in one or more vertical images of touch 2610 as shown in FIG. 26d. In addition, the user's left hand can only hover over the sensor panel 2602, resulting in an image of hover 2612 with a characteristic hole 2614 in it. In some embodiments, image processing logic can receive one or more inputs that cause the image processing logic to enter a certain mode and begin to convert the received images into features, and classify, group, and interpret images 2610 and 2612 as the start of a possible "identification gesture" as soon as images start to appear. In other embodiments, images 2610 and 2612 can be stored until further information is received that identifies the images as an "identification gesture." For example, if the complete "identification gesture" is the images shown in FIG. 26*d*, the composite shape can be recognized as an "identification gesture" only after all images 2610 and 2612 are fully captured. It should be understood that FIGS. 26*a*-26*d* are only exemplary in nature, and that a virtually unlimited number of gestures could be used as identification gestures.

Figure 26F:
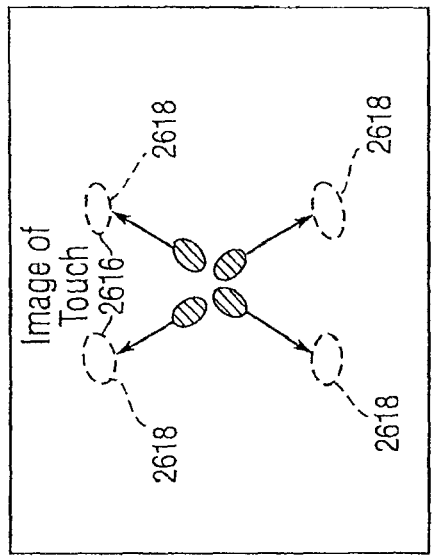
Figure 26H:
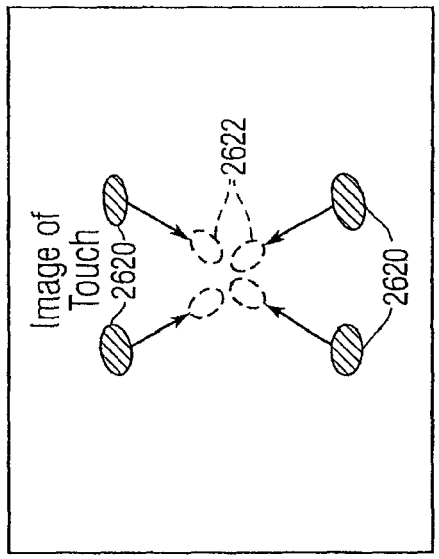
Figure 26E:
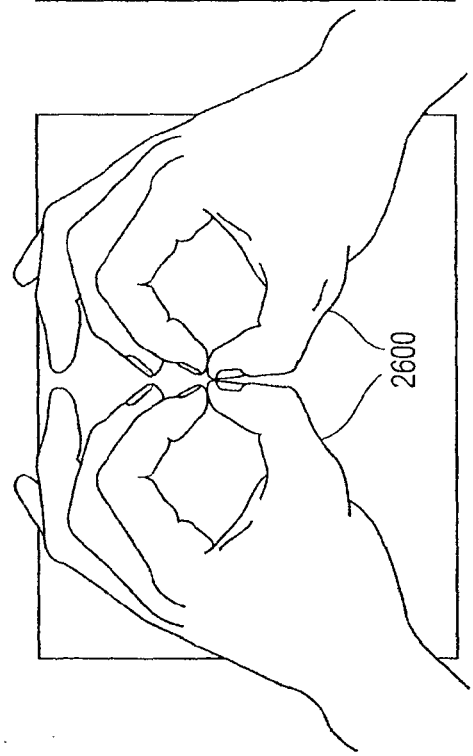
Figure 26G:
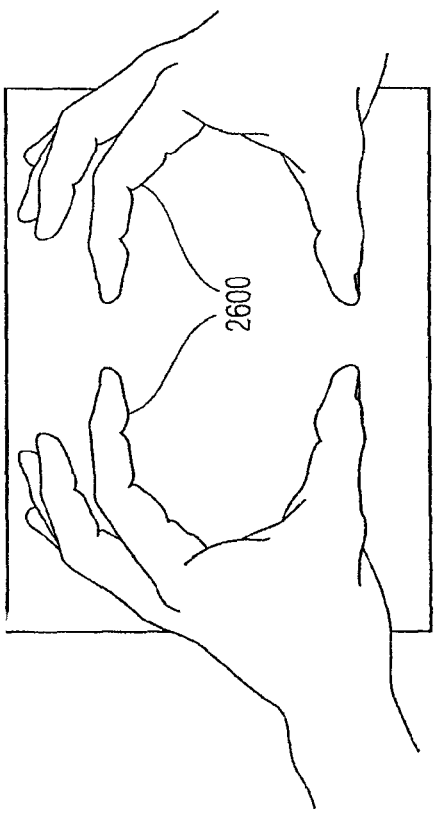

In another embodiment illustrated in FIG. 26*e*, the thumb and another finger of hands 2600 can be placed together near a center of the touch sensor panel, resulting in the image of touch 2616 as shown in FIG. 26*f*, and then spread towards the four corners of the touch sensor panel, generating intermediate images 2618. Recognition of this "unlock gesture" can unlock and object on application. Alternatively, as shown in FIG. 26*g*, the thumb and another finger of hands 2600 can be placed towards the four corners of the touch sensor panel, resulting in the image of touch 2620 as shown in FIG. 26*h*, and then moved towards the center of the touch sensor panel, generating intermediate images 2622. Recognition of this "lock gesture" can lock and object on application.

FIGS. 27*a*-27*k* illustrate an exemplary "hand edge gesture" according to embodiments of this invention. A "hand edge gesture" can be formed by initially placing the edge of either hand (palm edge plus pinky finger edge) over a touch or hover sensitive device, with the thumb pointing upwards away from the sensor panel or alongside the index finger. With the thumb pointing toward the ceiling (or along surface normal vector), the wrist can advantageously have a much wider range of motion for rotation/orientation than in any other hand arrangement (including rotation with five fingertips, or a hand flat on surface). The hand edge gesture, optionally along with various sweeping motions, can be detected and interpreted to perform operations such as quickly orienting an application or control along the elongated axis defined by the detected hand edge, changing to another desktop, sweeping away applications, icons, files, performing undo or redo operations, and the like.

To detect a "hand edge gesture," either a touch sensor panel with some hover detecting capability or a touch sensor panel co-located with a proximity sensor panel can be employed. FIGS. 27*a* and 27*b* illustrate a right hand 2700 beginning a general "hand edge gesture" over one or more UI elements 2710 appearing beneath sensor panel 2702 according to embodiments of this invention. In FIG. 27*b*, the image of actual touch 2704 may not look like a "hand edge gesture" at all, because only the user's "pinky" finger and palm edge may actually make contact with the sensor panel. Images 2704 can together be converted into a single feature as described above.

Figure 27G:
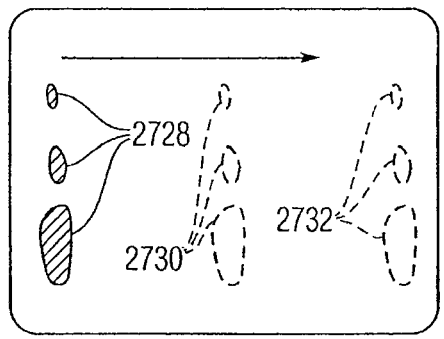
Figure 27H:
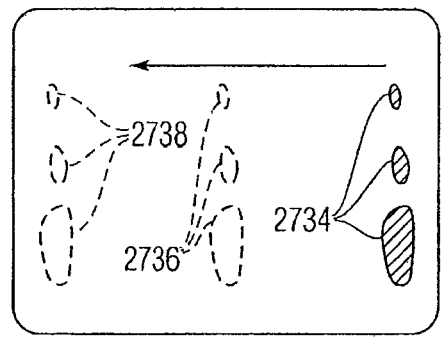
Figure 27I:
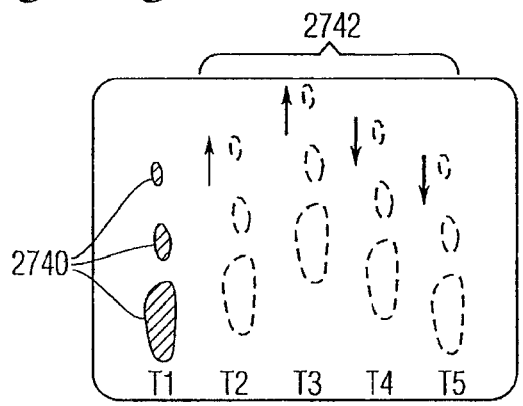
Figure 27J:
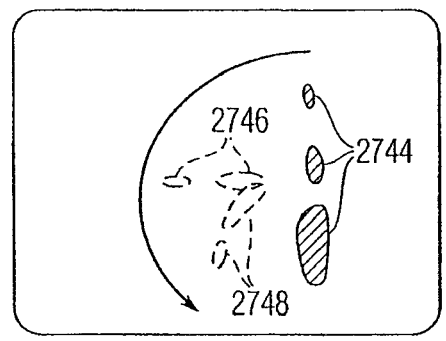
Figure 27K:
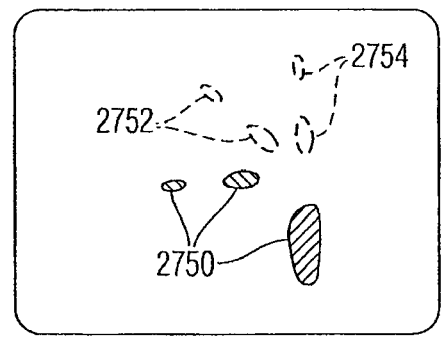

FIG. 27*c* shows image of touch 2704 as the right hand edge is swept towards the user's body. FIG. 27*c* shows intermediate touch images 2706 and 2708, although it should be understood that a number of intermediate touch images 1900 are generated as the right hand edge is swept. FIG. 27*d* shows an alternative in which the right hand is initially placed down in a horizontal position, creating touch image 2710, and then swept away from the user, creating intermediate touch images 2712 and 2714. FIG. 27*e* shows another alternative in which the right hand is initially placed down in a horizontal position, creating touch image 2716, and then moved away from the user while maintaining the horizontal orientation, creating intermediate touch images 2718 and 2720. FIG. 27*f* shows yet another alternative in which the right hand is initially placed down in a horizontal position, creating touch image 2722, and then moved toward the user while maintaining the horizontal orientation, creating intermediate touch images 2724 and 2726. FIG. 27*g* shows yet another alternative in which the right hand is initially placed down in a vertical position, creating touch image 2728, and then moved to the right while maintaining the vertical orientation, creating intermediate touch images 2730 and 2732. FIG. 27*h* shows yet another alternative in which the right hand is initially placed down in a vertical position, creating touch image 2734, and then moved to the left while maintaining the vertical orientation, creating intermediate touch images 2736 and 2738. FIG. 27*i* shows yet another alternative in which the right hand is initially placed down in a vertical position, creating touch image 2740, and then moved up and down in a "sawing" motion while maintaining the vertical orientation, creating intermediate touch images 2742 (shown time-elapsed at times T1-T5 and visually separated for clarity—note that there can be no actual horizontal motion in the gesture). FIG. 27*j* shows yet another alternative in which the right hand is initially placed down in a vertical position, creating touch image 2744, and then only the pinky and one or more of the other non-thumb fingers are partially curled or brought perpendicular to the thumb, creating intermediate touch images 2746 and 2748. FIG. 27*k* shows yet another alternative in which the right hand is initially placed down with the palm in a vertical position and fingers partially curled or perpendicular to the thumb, creating touch image 2750, and then only the pinky and one or more of the other non-thumb fingers are straighten to vertical, creating intermediate touch images 2752 and 2754. In a "flick off" embodiment, the pinky made end up not touching the sensor panel, in which case intermediate image 2754 would not be present.

If the images and corresponding features are tracked over time, the completion of various "hand edge gestures" can be accurately detected. At that point, one or more UI elements appearing on the touch screen at the time the gesture was detected can be associated with the "hand edge gesture." After a particular "hand edge gesture" has been detected and the corresponding UI elements have been associated with the gesture, various actions can be taken with regard to the associated UI elements. For example, the detection of a hand edge gesture, without more, can be used to quickly "orient" an application or control along the elongated axis defined by the orientation of the touch image. A rotational sweep of the touch image from vertical to horizontal, can be used to "sweep away" the UI elements, or dismiss the normal desktop to bring up alternative desktops, switch users, lock the screen, and the like. A sweep from horizontal to vertical, a straightening of fingers to vertical, or a flicking action can be used to reverse the operation, e.g. resume normal desktop/workspace. Sweeping the touch image from left edge to right edge can be used to perform an erase operation (e.g. clear a drawing), switch to a workspace or virtual desktop on the right, or perform a continuous redo (or forward on a timeline). Sweeping the touch image from right edge to left edge can be used to switch to a workspace/virtual desktop on the left or perform a continuous undo (or backup on a timeline). For instance, in a drawing application, these gestures could undo/redo one pivot point at a time on drawn paths, polygons or bezier curves. Sweeping from top to bottom edge or vice versa can similarly clear a drawing, switch workspaces, users, or virtual desktops, or hide an application or UI element, while sweeping from bottom to top can be used to maximize the application or UI element. "Sawing" the gesture up and down can be used to vertically split the window or view.

Figure 28A:
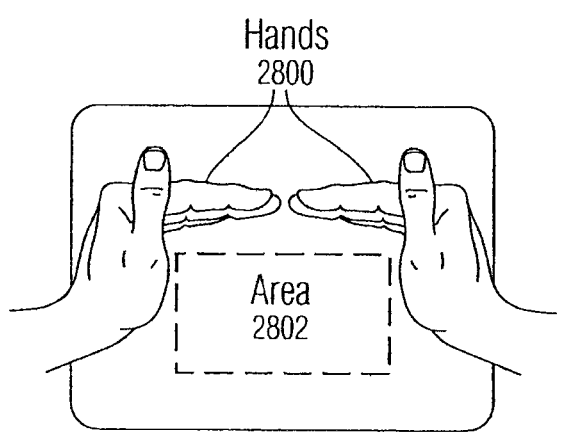
FIGS. 28a-28b illustrate an exemplary "framing gesture" according to one embodiment of this invention.
Figure 28B:
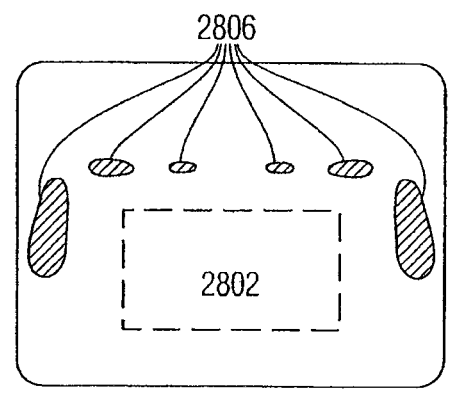

FIGS. 28a-28b illustrate an exemplary "framing gesture" according to embodiments of this invention. A "framing gesture" formed by one or both hands over a touch or hover sensitive device can be detected and interpreted to perform operations requiring definition of a certain area.

FIG. 28a illustrates an exemplary orientation of hands 2800 giving a "framing gesture" over area 2802 according to embodiments of this invention. FIG. 28b shows the image of actual touch 2806, which can be roughly the shape of an upside-down U. After the detected image 2806 has been converted to one or more features and classified and grouped as a "framing gesture," parameters for the feature can be computed, such as an approximate window or area 2802 framed by the "framing gesture," and appropriate action can then be taken. Framed window 2802 can be used to open a detail portal, magnifier, or dialog, or place a photo, for example.

In any of these exemplary identification gestures, the images can be converted to features, which can then be classified, grouped and interpreted as an identification gesture. Each identification gesture can then be associated with a particular user and UI element for which access is sought, and depending on whether access rights have been satisfied, the user may or may not be granted access to the UI element.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for receiving a confirming gesture formed on or about a sensor panel, comprising:
   detecting one or more images at a first time at the sensor panel;
   determining that the one or more images at the first time are arranged in a pattern corresponding to a predetermined OK gesture;
   determining a centering parameter from the one or more images;
   associating the OK gesture with a user interface (UI) element coincident with the centering parameter, the UI element accepting a confirming input; and
   providing the confirming input to the UI element.

2. The method of claim 1, further comprising determining that the one or more images at the first time are arranged in a pattern corresponding to a predetermined OK gesture by:
   identifying one or more palm edge and pinky features; and
   identifying a thumb and finger feature.

3. A method for receiving an identification gesture formed on or about a sensor panel, comprising:
   detecting one or more images at the sensor panel;
   determining that the one or more images represent an attempted identification gesture;
   associating the attempted identification gesture with a first user interface (UI) element in a UI, the UI including the first UI element and a second UI element;
   determining whether movement of the one or more images is arranged in space and time in a pattern and sequence corresponding to a user authorized to access the first UI element;
   in accordance with a determination that the movement of the one or more images is arranged in space and time in the pattern and the sequence corresponding to the user authorized to access the first UI element, granting access to the first UI element, but not the second UI element; and
   in accordance with a determination that the movement of the one or more images is not arranged in space and time in the pattern and the sequence corresponding to the user authorized to access the first UI element, denying access to the first UI element.

4. A non-transitory computer-readable medium comprising program code for receiving a confirming gesture formed on or about a sensor panel, the program code for causing performance of a method comprising:
   detecting one or more images at a first time at the sensor panel;
   determining that the one or more images at the first time are arranged in a pattern corresponding to a predetermined OK gesture;
   determining a centering parameter from the one or more images;
   associating the OK gesture with a user interface (UI) element coincident with the centering parameter, the UI element accepting a confirming input; and
   providing the confirming input to the UI element.

5. The computer-readable medium of claim 4, the method further comprising determining that the one or more images at the first time are arranged in a pattern corresponding to a predetermined OK gesture by:
   identifying one or more palm edge and pinky features; and
   identifying a thumb and finger feature.

6. A non-transitory computer-readable medium comprising program code for receiving a shape gesture formed on or about a sensor panel, the program code for causing performance of a method comprising:
   detecting one or more images at the sensor panel;
   determining that the one or more images are arranged in a pattern corresponding to a predetermined triangle shape gesture;
   associating the triangle shape gesture with a user interface (UI) element;
   determining that the UI element is within a triangle formed by the triangle shape gesture; and
   performing an action comprising zooming the UI element.

7. A non-transitory computer-readable medium comprising program code for receiving a shape gesture formed on or about a sensor panel, the program code for causing performance of a method comprising:
   detecting one or more images at the sensor panel;
   determining that the one or more images are arranged in a pattern corresponding to a predetermined V shape gesture;
   associating the V shape gesture with a user interface (UI) element;
   determining that the V shape gesture comprises an upward movement; and
   performing an action comprising translating the UI element in accordance with the upward movement.

8. A non-transitory computer-readable medium comprising program code for receiving a shape gesture formed on or about a sensor panel, the program code for causing performance of a method comprising:
   detecting one or more images at the sensor panel;
   determining that the one or more images are arranged in a pattern corresponding to a predetermined inverted V shape gesture;
   associating the inverted V shape gesture with a user interface (UI) element;
   determining that the inverted V shape gesture comprises a downward movement; and
   performing an action comprising translating the UI element in accordance with the downward movement.

9. A non-transitory computer-readable medium comprising program code for receiving a shape gesture formed on or about a sensor panel, the program code for causing performance of a method comprising:
   detecting one or more images at the sensor panel;
   determining that the one or more images are arranged in a pattern corresponding to a predetermined wing shape gesture;
   associating the wing shape gesture with a user interface (UI) element; and
   performing an action comprising sending the UI element to a recipient.

10. A non-transitory computer-readable medium comprising program code for receiving an identification gesture formed on or about a sensor panel, the program code for causing performance of a method comprising:
   detecting one or more images at the sensor panel;
   determining that the one or more images represent an attempted identification gesture;
   associating the attempted identification gesture with a first user interface (UI) element in a UI, the UI including the first UI element and a second UI element;
   determining whether movement of the one or more images is arranged in space and time in a pattern and sequence corresponding to a user authorized to access the first UI element;
   in accordance with a determination that the movement of the one or more images is arranged in space and time in the pattern and the sequence corresponding to the user authorized to access the first UI element, granting access to the first UI element, but not the second UI element and
   in accordance with a determination that the movement of the one or more images is not arranged in space and time in the pattern and the sequence corresponding to the user authorized to access the first UI element, denying access to the first UI element.

11. A method for receiving a shape gesture formed on or about a sensor panel, comprising:
   detecting one or more images at the sensor panel;
   determining that the one or more images are arranged in a pattern corresponding to a predetermined triangle shape gesture;
   associating the triangle shape gesture with a user interface (UI) element;
   determining that the UI element is within a triangle formed by the triangle shape gesture; and
   performing an action comprising zooming the UI element.

12. A method for receiving a shape gesture formed on or about a sensor panel, comprising:
   detecting one or more images at the sensor panel;
   determining that the one or more images are arranged in a pattern corresponding to a predetermined V shape gesture;
   associating the V shape gesture with a user interface (UI) element;
   determining that the V shape gesture comprises an upward movement; and
   performing an action comprising translating the UI element in accordance with the upward movement.

13. A method for receiving a shape gesture formed on or about a sensor panel, comprising:
   detecting one or more images at the sensor panel;
   determining that the one or more images are arranged in a pattern corresponding to a predetermined inverted V shape gesture;
   associating the inverted V shape gesture with a user interface (UI) element;
   determining that the inverted V shape gesture comprises a downward movement; and
   performing an action comprising translating the UI element in accordance with the downward movement.

14. A method for receiving a shape gesture formed on or about a sensor panel, comprising:
   detecting one or more images at the sensor panel;
   determining that the one or more images are arranged in a pattern corresponding to a predetermined wing shape gesture;
   associating the wing shape gesture with a user interface (UI) element; and
   performing an action comprising sending the UI element to a recipient.

15. The method of claim 1, wherein detecting the one or more images at the first time at the sensor panel comprises concurrently detecting the one or more images at the first time at the sensor panel.

16. The method of claim 1, wherein determining that the one or more images at the first time are arranged in the pattern corresponding to the predetermined OK gesture is independent of a movement indicated by the one or more images.

17. The method of claim 1, wherein the one or more images correspond to a hand with a curled thumb and a curled index finger touching at a tip portion of each, and extended middle, ring and pinky fingers.

18. The computer-readable medium of claim 4, wherein detecting the one or more images at the first time at the sensor panel comprises concurrently detecting the one or more images at the first time at the sensor panel.

19. The computer-readable medium of claim 4, wherein determining that the one or more images at the first time are arranged in the pattern corresponding to the predetermined OK gesture is independent of a movement indicated by the one or more images.

20. The computer-readable medium of claim 4, wherein the one or more images correspond to a hand with a curled thumb and a curled index finger touching at a tip portion of each, and extended middle, ring and pinky fingers.

21. An electronic device comprising:
   one or more processors;
   a sensor panel; and
   a non-transitory computer-readable medium comprising program code for receiving a confirming gesture formed on or about the sensor panel, the program code causing the one or more processors to perform a method comprising:
   detecting one or more images at a first time at the sensor panel;
   determining that the one or more images at the first time are arranged in a pattern corresponding to a predetermined OK gesture;
   determining a centering parameter from the one or more images;
   associating the OK gesture with a user interface (UI) element coincident with the centering parameter, the UI element accepting a confirming input; and
   providing the confirming input to the UI element.

22. An electronic device comprising:
   one or more processors;
   a sensor panel; and
   a non-transitory computer-readable medium comprising program code for receiving an identification gesture formed on or about the sensor panel, the program code causing the one or more processors to perform a method comprising:
   detecting one or more images at the sensor panel;

determining that the one or more images represent an attempted identification gesture;

associating the attempted identification gesture with a first user interface (UI) element in a UI, the UI including the first UI element and a second UI element;

determining whether movement of the one or more images is arranged in space and time in a pattern and sequence corresponding to a user authorized to access the first UI element;

in accordance with a determination that the movement of the one or more images is arranged in space and time in the pattern and the sequence corresponding to the user authorized to access the first UI element, granting access to the first UI element, but not the second UI element and in accordance with a determination that the movement of the one or more images is not arranged in space and time in the pattern and the sequence corresponding to the user authorized to access the first UI element, denying access to the first UI element.

23. An electronic device comprising:

one or more processors;

a sensor panel; and a non-transitory computer-readable medium comprising program code for receiving a shape gesture formed on or about the sensor panel, the program code causing the one or more processors to perform a method comprising:

detecting one or more images at the sensor panel;

determining that the one or more images are arranged in a pattern corresponding to a predetermined triangle shape gesture;

associating the triangle shape gesture with a user interface (UI) element;

determining that the UI element is within a triangle formed by the triangle shape gesture; and performing an action comprising zooming the UI element.

24. An electronic device comprising:

one or more processors;

a sensor panel; and a non-transitory computer-readable medium comprising program code for receiving a shape gesture formed on or about the sensor panel, the program code causing the one or more processors to perform a method comprising:

detecting one or more images at the sensor panel;

determining that the one or more images are arranged in a pattern corresponding to a predetermined V shape gesture;

associating the V shape gesture with a user interface (UI) element;

determining that the V shape gesture comprises an upward movement; and performing an action comprising translating the UI element in accordance with the upward movement.

25. An electronic device comprising:

one or more processors;

a sensor panel; and a non-transitory computer-readable medium comprising program code for receiving a shape gesture formed on or about the sensor panel, the program code causing the one or more processors to perform a method comprising:

detecting one or more images at the sensor panel;

determining that the one or more images are arranged in a pattern corresponding to a predetermined inverted V shape gesture;

associating the inverted V shape gesture with a user interface (UI) element;

determining that the inverted V shape gesture comprises a downward movement; and performing an action comprising translating the UI element in accordance with the downward movement.

26. An electronic device comprising:

one or more processors;

a sensor panel; and a non-transitory computer-readable medium comprising program code for receiving a shape gesture formed on or about the sensor panel, the program code causing the one or more processors to perform a method comprising:

detecting one or more images at the sensor panel;

determining that the one or more images are arranged in a pattern corresponding to a predetermined wing shape gesture;

associating the wing shape gesture with a user interface (UI) element; and performing an action comprising sending the UI element to a recipient.

* * * * *